US011962104B2

(12) United States Patent
Teruki et al.

(10) Patent No.: US 11,962,104 B2
(45) Date of Patent: Apr. 16, 2024

(54) CONNECTOR AND CONNECTOR ASSEMBLY

(71) Applicant: Molex, LLC, Lisle, IL (US)

(72) Inventors: Satoru Teruki, Yamato (JP); Sho Kitazawa, Yamato (JP); Manabu Yamanaka, Yamato (JP)

(73) Assignee: Molex, LLC, Lisle, IL (US)

( * ) Notice: Subject to any disclaimer, the term of this patent is extended or adjusted under 35 U.S.C. 154(b) by 101 days.

(21) Appl. No.: 17/425,360

(22) PCT Filed: Feb. 14, 2020

(86) PCT No.: PCT/US2020/018408
§ 371 (c)(1),
(2) Date: Jul. 23, 2021

(87) PCT Pub. No.: WO2020/168273
PCT Pub. Date: Aug. 20, 2020

(65) Prior Publication Data
US 2022/0094088 A1 Mar. 24, 2022

Related U.S. Application Data

(60) Provisional application No. 62/805,597, filed on Feb. 14, 2019.

(30) Foreign Application Priority Data

Jun. 11, 2019 (JP) ................................ 2019-108631
Dec. 19, 2019 (JP) ................................ 2019-229625

(51) Int. Cl.
*H01R 12/71* (2011.01)
*H01R 13/629* (2006.01)
(Continued)

(52) U.S. Cl.
CPC ......... *H01R 12/716* (2013.01); *H01R 13/629* (2013.01); *H01R 13/6582* (2013.01); *H01R 13/6585* (2013.01)

(58) Field of Classification Search
CPC ............... H01R 12/716; H01R 13/629; H01R 13/6582; H01R 13/6585; H01R 12/73; H01R 13/639; H01R 13/113
See application file for complete search history.

(56) References Cited

U.S. PATENT DOCUMENTS 7,168,986 B1 * 1/2007 Peng .................... H01R 12/716 439/607.04
8,292,630 B1 * 10/2012 Bobuk .................. H01R 12/73 439/74
(Continued)

FOREIGN PATENT DOCUMENTS

CN 106935995 A 7/2017
CN 109103629 A 12/2018
(Continued)

OTHER PUBLICATIONS

International Search Report and Written Opinion received for PCT Application No. PCT/US2020/018408, dated Jun. 15, 2020, 11 Pages.

*Primary Examiner* — Abdullah A Riyami
*Assistant Examiner* — Nelson R. Burgos-Guntin

(57) ABSTRACT

A first connector body includes a recess having a substantially rectangular shape in a planar view filled with a plurality of first connection units arranged in close contact in the longitudinal direction of the first connector body, wherein each first connection unit includes a first terminal and a first shield having a rectangular cylindrical shape with
(Continued)

a substantially rectangular cross-section surrounding the periphery of the first terminal and extending in the mating direction.

19 Claims, 33 Drawing Sheets

(51) Int. Cl.
*H01R 13/6582* (2011.01)
*H01R 13/6585* (2011.01)

(56) References Cited

U.S. PATENT DOCUMENTS

| | | | | |
|---|---|---|---|---|
| 2013/0012039 | A1* | 1/2013 | Nose | H01R 12/716 439/74 |
| 2013/0210246 | A1 | 8/2013 | Davis et al. | |
| 2015/0079816 | A1 | 3/2015 | Suzuki | |
| 2018/0115098 | A1* | 4/2018 | Little | H01R 13/6582 |
| 2018/0183189 | A1* | 6/2018 | Chuang | H01R 13/41 |
| 2018/0342838 | A1 | 11/2018 | Ozeki | |
| 2019/0214772 | A1* | 7/2019 | Kodama | H01R 12/716 |

FOREIGN PATENT DOCUMENTS

| | | | |
|---|---|---|---|
| JP | H0619283 | U | 3/1994 |
| JP | H0629047 | U | 4/1994 |
| JP | 2010092811 | A | 4/2010 |
| JP | 2013239278 | A | 11/2013 |
| JP | 2016009619 | A | 1/2016 |
| KR | 101496720 | B1 | 2/2015 |
| KR | 101531867 | B1 | 6/2015 |
| KR | 20160089216 | A | 7/2016 |

* cited by examiner

CONNECTOR AND CONNECTOR ASSEMBLY

RELATED APPLICATIONS

This application is a national phase of International Application No. PCT/US2020/018408, filed Feb. 14, 2020, which claims priority to Japanese Application No: 2019-229625 filed on Dec. 19, 2019, which claims priority to Japanese Application No: 2019-108631 filed on Jun. 11, 2019, which further claims priority to U.S. Provisional Application No. 62/805,597, filed on Feb. 14, 2019, which are incorporated herein by reference in its entireties.

TECHNICAL FIELD

The present disclosure relates to a connector and a connector assembly.

BACKGROUND ART

A receptacle connector that can mate with a plug housing provided with an array of a plurality of plug modules connected to a terminal of each wire has been proposed previously (for example, see Patent Document 1).

FIG. 33 is a perspective view illustrating a conventional connector.

In the drawing, 811 is a housing of a receptacle connector, which is a connector mounted to the surface of a circuit board (not illustrated). A plurality (four in the example illustrated in the drawing) of conductive contacts 861 are attached to the bottom surface part of the housing 811 by press-fitting or insert molding. Each conductive contact 861 is a substantially cylindrical member and is provided so as to project upward from the bottom surface part of the housing 811. In addition, a substantially cylindrical ground contact 851 is attached to the bottom surface of the housing 811 by insert molding or the like so as to concentrically surround each conductive contact 861.

Further, a solder tail 864 of the conductive contact 861 and a solder tail 854 of the ground contact 851 project from the front edge of the bottom surface part of the housing 811. Note that the solder tail 854 of each ground contact 851 is a left/right pair and respectively projects from both sides of the solder tail 864 of the corresponding conductive contact 861. The solder tails 864 of the conductive contacts 861 and the solder tails 854 of the ground contacts 851 are connected by soldering to conductive wires and a ground wire exposed to the surface of the circuit board (not illustrated).

In addition, a shield member 871 made from a metal plate is attached to the housing 811. A solder tail 874 of the shield member 871 projects from the front edge of the bottom surface part of the housing 811, and the solder tail 874 is connected by soldering to a ground wire exposed to the surface of the circuit board (not illustrated).

When a plug housing (not illustrated) provided with an array of plug modules connected to the terminal of each wire and the receptacle connector are mated, the conductive contact and the ground contact of each plug module are connected to the corresponding conductive contact 861 and ground contact 851 of the receptacle connector. As a result, each wire becomes electrically conductive with the conductive wires and the ground wire of the circuit board, which makes it possible to transmit signals.

Patent Document 1: Japanese Unexamined Patent Application Publication No. 2010-092811

SUMMARY

However, this conventional connector cannot sufficiently handle decreases in member size or signal multipolarization in electronic devices of recent years. For electronic devices such as laptop computers, tablets, smart phones, digital cameras, music players, game devices, and navigation devices, there has been a demand for a reduction in the size and profile of the case and for a corresponding reduction in the size and profile of each part, and there has also been a demand for increased signal speed and multipolarization in order to handle increasing amounts of communication data or higher communication speeds and data processing speeds. However, with the conventional connector described above, the dimensions of the housing 811 are large, and the conductive contacts 861 and the ground contacts 851 are large, so it is not possible to sufficiently meet the demands for a reduction in the size and profile of the connector. Further, in order for various signals to be increased in speed, the number of conductive contacts 861 and ground contacts 851 may be required to be greater than four (multipolar), however, in the conventional contact described above, because each conductive contact 861 and each ground contact 851 are large, it can be easily imagined that the conventional connector would become very large if the conductive contacts 861 and the ground contacts 851 were to be increased in number (multipolarized).

Here, an object of the present disclosure is to solve the problems of the conventional connector described above and to provide a reliable connector and connector assembly capable of filling connection units with high space efficiency, enabling a plurality of signal lines to be connected while maintaining a small size and low profile, and achieving a high terminal shielding effect.

Therefore, the first connector of the present disclosure is a first connector having a first connector body and a plurality of first connection units filling the first connector body, the first connector being mounted on a first substrate and mating with a second connector; wherein the first connector body includes a recess into which a second connector body of the second connector is inserted and which is filled with a plurality of the first connection units arranged in close contact in a longitudinal direction of the first connector body; each first connection unit includes a first terminal and a first shield positioned on at least three sides of a periphery of the first terminal and extending in a mating direction; the first shield is a first intermediate shield member which is shared with a mutually adjacent first shield in the longitudinal direction of the first connector body and extends in a width direction of the first connector body; and the first intermediate shield member includes a pair of tail parts positioned on both ends thereof and connected to a connection site to a ground line of the first substrate, and the first terminal of each first connection unit is positioned between the pair of tail parts in the width direction of the first connector body.

In another first connector, the first shield surrounds four sides of a periphery of the first terminal.

In yet another first terminal, the first connection units are disposed so as to form a plurality of rows arranged in the longitudinal direction of the first connector body.

In yet another first connector, a spacing between the first terminals of mutually adjacent first connection units in the longitudinal direction of the first connector body is shorter than a spacing between the first terminals of mutually adjacent first connection units in the width direction of the first connector.

A second connector of the present disclosure is a second connector having a second connector body and a plurality of second connection units filling the second connector body, the second connector mating with a first connector; wherein the second connector body is filled with a plurality of the second connection units arranged in close contact in a longitudinal direction of the second connector body and is inserted into a recess of the first connector; each second connection unit includes a second terminal and a second shield positioned on at least two sides of a periphery of the second terminal; and the second shield includes a second shield member including an opening and having a flat plate-like second cover part orthogonal to a mating direction and a side surface shield part connected to a side edge of the second cover part and extending in the mating direction, wherein mutually adjacent second shield members in the longitudinal direction of the second connector body do not come into contact with one another.

In another second connector, the second connection units are disposed so as to form a plurality of rows arranged in the longitudinal direction of the second connector body.

In yet another second connector, each second connection unit includes a second terminal housing recess for housing the second terminal, and the side surface shield part is attached to a side of the second terminal housing recess.

In yet another second connector, the second terminal is disposed near the second cover part, and an impedance can be adjusted by adjusting a distance between the second terminal and the second cover part.

The connector assembly of the present disclosure includes: a first connector having a first connector body and a plurality of first connection units filling the first connector; and a second connector having a second connector body and a plurality of second connection units filling the second connector body, the second connector mating with the first connector; wherein the first connector body includes a recess into which the second connector body is inserted and which is filled with a plurality of the first connection units arranged in close contact in a longitudinal direction of the first connector body; each first connection unit includes a first terminal and a first shield positioned on at least three sides of a periphery of the first terminal and extending in a mating direction; the first shield is a first intermediate shield member which is shared with a mutually adjacent first shield in the longitudinal direction of the first connector body and extends in a width direction of the first connector body; the second connector body is filled with a plurality of the second connection units arranged in close contact in a longitudinal direction of the second connector body and is inserted into the recess of the first connector body; each second connection unit includes a second terminal and a second shield positioned on at least two sides of a periphery of the second terminal; and the second shield includes a second shield member including an opening into which the first terminal is inserted and having a flat plate-like second cover part orthogonal to a mating direction and a side surface shield part connected to a side edge of the second cover part and extending in the mating direction, wherein the first intermediate shield member is inserted between mutually adjacent shield members in the longitudinal direction of the second connector body.

According to the present disclosure, it is possible to load connection units with high space efficiency, to enable a plurality of signal lines to be connected while maintaining a small size and low profile, and to achieve a high terminal shielding effect, which enhances reliability.

BRIEF DESCRIPTION OF DRAWINGS

FIG. 12A is a top view, FIG. 12B is a side view, FIG. 12C is a bottom view, and FIG. 12D is a rear view.

FIG. 15A is a top view, FIG. 15B is a side view, FIG. 15C is a bottom view, and FIG. 15D is a rear view.

FIG. 17A is a perspective view illustrating the arrangement of the first intermediate shield member in the longitudinal direction, and FIG. 17B is a perspective view illustrating the arrangement of the first intermediate shield member in the width direction.

FIG. 21A is a top view, FIG. 21B is a side view, FIG. 21C is a bottom view, and FIG. 21D is a rear view.

FIG. 22A is a perspective view illustrating the arrangement of the first intermediate shield member in the longitudinal direction, and FIG. 22B is a perspective view illustrating the arrangement of the first intermediate shield member in the width direction.

FIG. 24A is a top view, FIG. 24B is a side view, FIG. 24C is a bottom view, and FIG. 24D is a rear view.

FIG. 29A is a top view, FIG. 29B is a side view, FIG. 29C is a bottom view, and FIG. 29D is a rear view.

FIGS. 31A through 32C are cross-sectional view illustrating the operation of mating the first connector and the second connector according to Embodiment 5, and is a cross-sectional view from the longitudinal direction of the first housing and the second housing, where FIGS. 31A to 32C are views illustrating each stage of the operation of mating in a state in which the mating surfaces are not parallel due to misalignment occurring in the width direction of the first housing and the second housing.

FIG. 32A is a plan view and FIG. 32B is a cross-sectional view along arrow B-B in FIG. 32A.

DETAILED DESCRIPTION OF PREFERRED EMBODIMENTS

An embodiment will be described in detail below with reference to the drawings.

Figure 1:
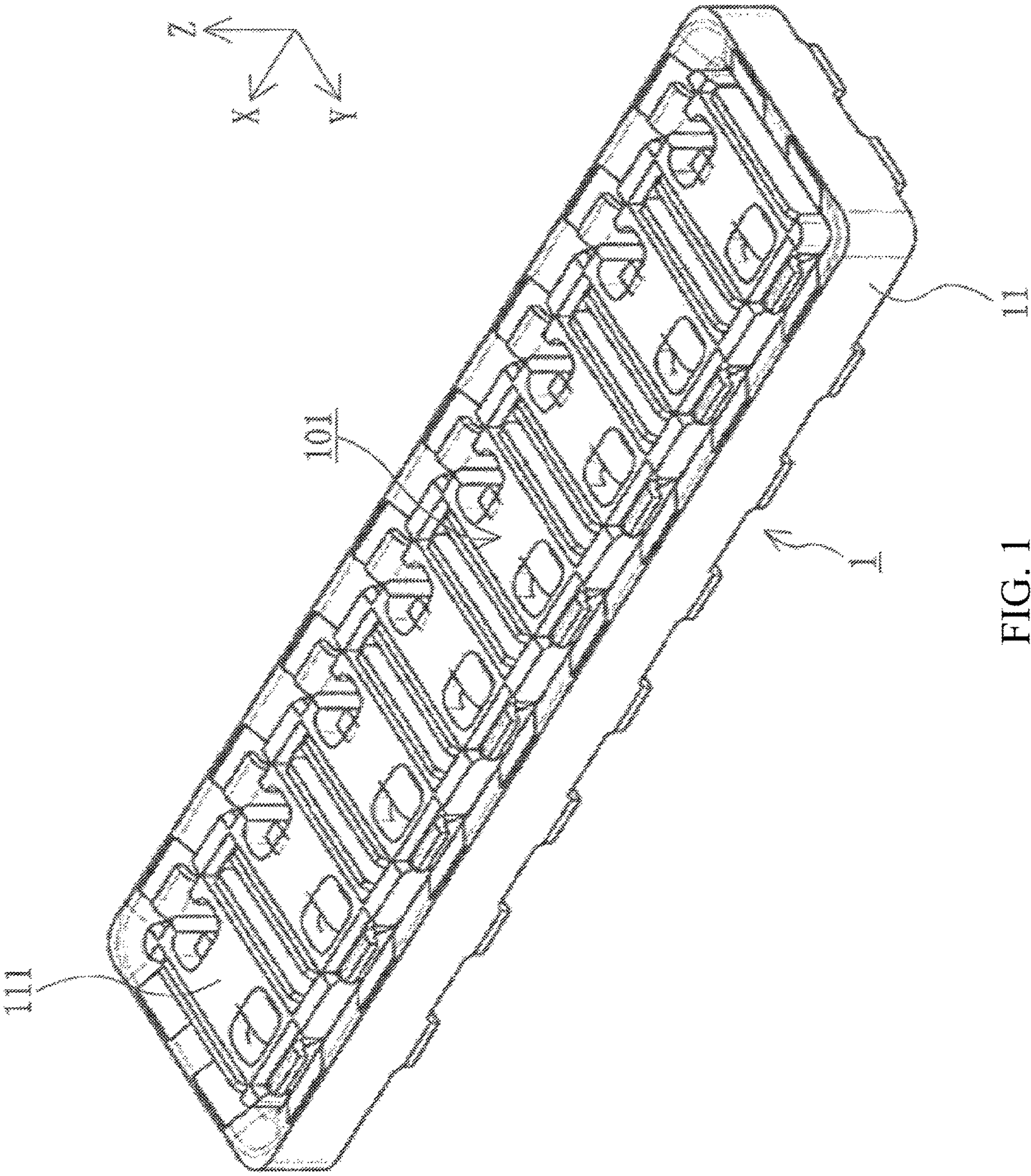
FIG. 1 is a perspective view of the state in which a first connector and a second connector according to Embodiment 1 are mated.
Figure 2:
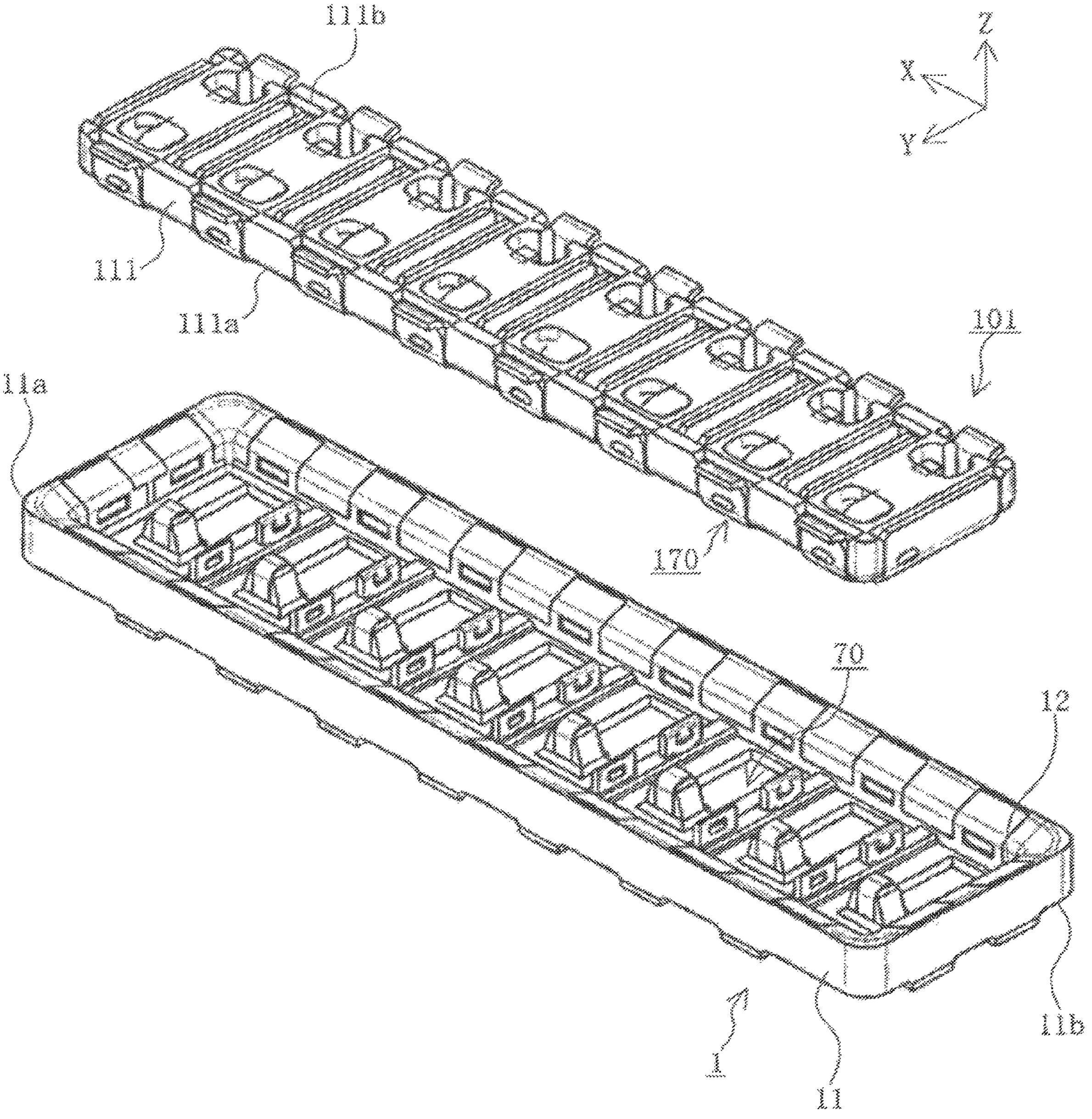
FIG. 2 is a perspective view of the first connector and the second connector according to Embodiment 1 prior to mating.
Figure 3:
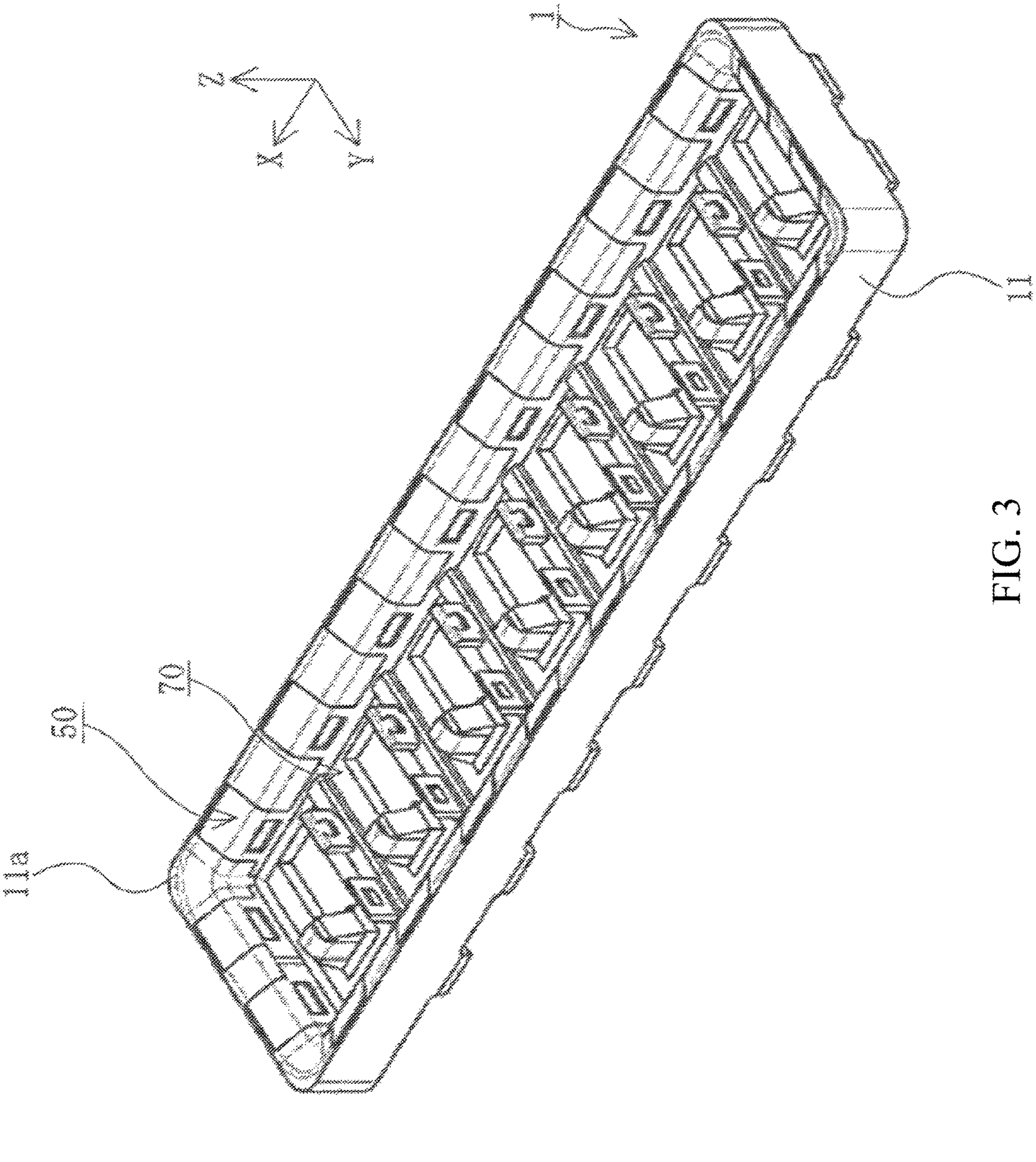
FIG. 3 is a perspective view of the first connector according to Embodiment 1.
Figure 4:
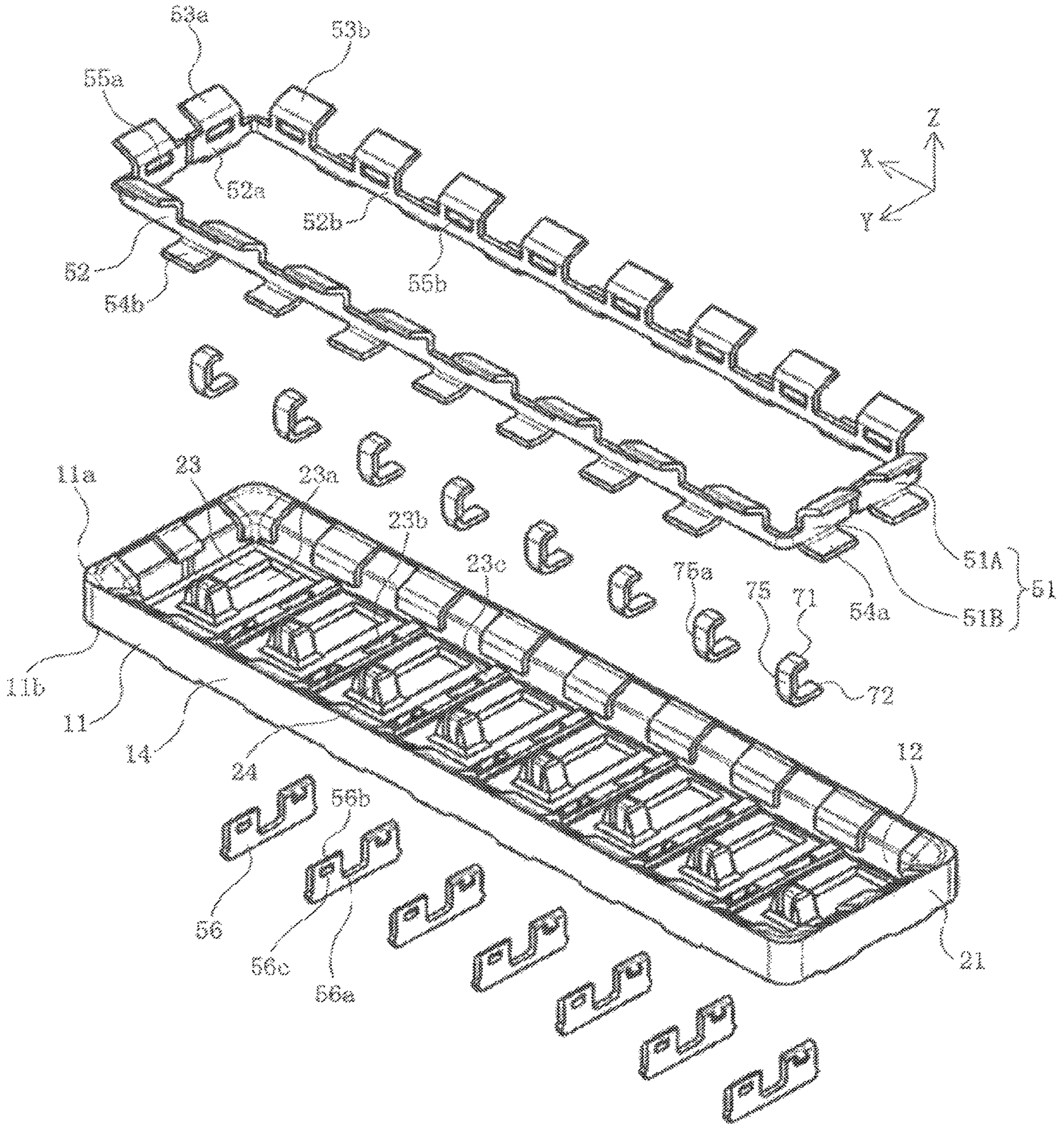
FIG. 4 is an exploded view of the first connector according to Embodiment 1.

FIG. 1 is a perspective view of a state in which a first connector and a second connector according to Embodiment 1 are mated. FIG. 2 is a perspective view of the first connector and the second connector according to Embodiment 1 prior to mating. FIG. 3 is a perspective view of the first connector according to Embodiment 1. FIG. 4 is an exploded view of the first connector according to Embodiment 1.

In the figure, 1 is a connector of the present embodiment and is the first connector serving as one of a pair of board to board connectors serving as a connector assembly. The first connector 1 is a surface mount type connector mounted on the surface of a first substrate (not illustrated) serving as a mounting member and is mated to a second connector 101 serving as a counterpart connector. Furthermore, the second connector 101 is the other of the pair of board to board connectors and is a surface mount type connector mounted on the surface of a second substrate (not illustrated) serving as a mounting member.

Note that while the first connector 1 and the second connector 101 are ideally used for electrically connecting the first substrate and the second substrate serving as substrates, the connectors can also be used to electrically connect other members. Examples of the first substrate and the second substrate include printed circuit boards, flexible flat cables (FFC), flexible printed circuit boards (FPC), etc. used in electronic equipment, etc., but may be any type of substrate.

Furthermore, expressions indicating directions such as up, down, left, right, front, and back used to describe the operations and configurations of the parts of the first connector 1 and the second connector 101 in the present embodiment are not absolute but rather relative directions, and though appropriate when the parts of the first connector 1 and the second connector 101 are in the positions illustrated in the figures, these directions should be interpreted differently when these positions change in order to correspond to said change.

Furthermore, the first connector 1 has a first housing 11 as a first connector body integrally formed of an insulating material such as synthetic resin. As illustrated in the drawings, the first housing 11 has a substantially rectangular thick plate shape, which is a substantially rectangular parallelepiped, wherein a first recess 12 that has a substantially rectangular shape with an enclosed perimeter and into which the second housing 111 of the second connector 101 is inserted is formed on the side with which the second connector 101 engages—that is, the mating surface 11*a* side (Z-axis positive direction side).

In addition, first side wall parts 14 serving as side wall parts defining both sides of the first recess 12 are formed on both sides (Y-axis positive direction side and negative direction side) of the first recess 12. Further, the first side wall parts project upward (Z-axis positive direction) from a bottom plate 23 defining the bottom surface of the first recess and extend in the longitudinal direction (X-axis positive direction) of the first housing 11. In addition, both longitudinal direction ends of the first side wall parts 14 are connected to both ends of the first end wall part 21. The first end wall part 21 projects upward from the bottom plate 23 and extends in the width direction (Y-axis direction) of the first housing 11. Further, in a state in which the first connector 1 and the second connector 101 are mated, a second housing 111 is inserted into the first recess 12.

The bottom surface of the first recess 12 is roughly covered by the bottom plate 23, but the bottom plate 23 is formed with first high-frequency terminal support parts 24 serving as terminal support parts projecting upward, bottom plate openings 23*a* passing through the bottom plate 23 in the plate thickness direction thereof (Z-axis direction), and intermediate support parts 23*c* extending in the width direction of the first housing 11. The first high-frequency terminal support parts 24 are of a plurality of units (eight in the example illustrated in the drawings), which are disposed so as to be arranged in one row in the longitudinal direction of the first housing 11. In addition, the same number of bottom plate openings 23*a* are formed as the first high-frequency terminal support parts, and each of the bottom plate openings 23*a* is disposed adjacent to the corresponding first high-frequency terminal support part 24 in the width direction of the first housing 11. Further, the intermediate support parts 23*c* are disposed between the mutually adjacent first high-frequency terminal support parts 24. Moreover, two intermediate support openings 23*b* passing through the bottom plate 23 in the plate thickness direction (Z-axis direction) are formed in each intermediate support part 23*c*.

Note that the numbers of the first high-frequency terminal support parts 24, the bottom plate openings 23*a*, the intermediate support parts 23*c*, and the intermediate support openings 23*b* may be changed appropriately as necessary.

A first high-frequency terminal 71 serving as a first terminal is attached to each first high-frequency terminal support part 24, and a first shield member 51 for electromagnetically shielding the periphery of the first high-frequency terminal 71 is attached to the first side wall part 14 and the first end wall part 21.

The first high-frequency terminal 71 is a member integrally formed by carrying out processes such as punching and bending a conductive metal plate and includes a first connecting part 75 as well as a first tail part 72 connected to the first connecting part 75. In addition, the first high-frequency terminal 71 is integrated with the first housing 11 by overmolding or insert molding. That is, the first housing 11 is molded by filling the cavity of a mold, in which the first high-frequency terminal 71 has been set beforehand, with an insulating material such as synthetic resin. As a result, the first connecting part 75 is integrally attached to the first housing 11, so that at least a portion is embedded in the first housing 11. Furthermore, the first high-frequency terminal 71 is not necessarily integrated with the first housing 11 by overmolding or insert molding and may be attached to the first housing 11 by press fitting, or the like. Herein, for convenience of description, a case of integration with the first housing 11 by overmolding or insert molding will be described.

The first connecting part 75 is a substantially U-shaped member when viewed from the side, wherein the portion extending in the forward and backward direction (X-axis direction) is connected to both the upper and lower ends of the portion extending in the vertical direction (Z-axis direction), and at least a portion of the surface facing outward in the width direction of the first housing 11 in the portion extending in the vertical direction is exposed to the side surface facing outward in the width direction of the first housing 11 of the first high-frequency terminal support part 24 so as to function as a first contact part 75*a* as a contact part. The first contact part 75*a* sits roughly along the same plane as a side surface of the first high-frequency terminal support part 24, and is a portion that comes into contact with a second high-frequency terminal 171 (described below) provided on the second connector 101. In addition, the first tail part 72 extends in the width direction of the first housing 11 from the tip of the portion extending in the forward and backward direction on the lower side of the first connecting part 75 and is exposed within the bottom plate opening 23*a* adjacent to the first high-frequency terminal support part 24, and is connected by soldering or the like to a connection pad coupled to a conductive trace of the first substrate. Note that the conductive trace is typically a signal line, and conveys a high frequency signal.

In addition, the first shielding member 51 is a member integrally formed by carrying out processes such as punching and bending a conductive metal plate, and includes a first right shielding part 51A and a first left shielding part 51B corresponding respectively to the right and left halves of the first recess 12. However, the first right shielding part 51A and the first left shielding part 51B have mutually symmetrical shapes relative to the X-Z plane passing through a center in the width direction of the first recess 12. Herein, the first right shielding part 51A and the first left shielding part 51B are described as a first shielding member 51.

In a planar view, the first shielding member 51 has a substantially U-shaped first side plate part 52. The first side plate part 52 includes a first end wall shield part 52*a* attached to the first end wall part 21, and a first side wall shield part 52*b* attached to the first side wall part 14. In addition, a first end wall cover part 53*a* serving as a mating surface cover part is integrally connected to the top end of the first end wall shield part 52*a*, and a first side wall cover part 53*b* serving as a mating surface cover part is integrally connected to the top end of the first side wall shield part 52*b*. The first end wall cover part 53*a* and the first side wall cover part 53*b* are bent to connect to the top ends of the first end wall shield part 52*a* and the first side wall shield part 52*b*, and are respectively made to cover at least a portion of the faces on the mating surface 11*a* sides of the first end wall part 21 and the first side wall part 14.

In addition, the first shielding member 51 is integrated with the first housing 11 by overmolding or insert molding. In other words, the first housing 11 is molded by filling the cavity of a mold, in which the first shielding member 51 has been set beforehand, with an insulating material such as synthetic resin. As a result, the first shielding member 51 is integrally attached to the first housing 11, so that at least a portion is embedded in the first housing 11. Note that the first shielding member 51 is not necessarily integrated with the first housing 11 by overmolding or insert molding and may be attached to the first housing 11 by press fitting, or the like. Herein, for convenience of description, a case of integration with the first housing 11 by overmolding or insert molding will be described.

In addition, a first end wall tail part 54*a* and a first side wall tail part 54*b* serving as tail parts are connected with a bend of approximately 90 degrees to the bottom ends of the first end wall shield part 52*a* and the first side wall shield part 52*b*. The first end wall tail part 54*a* extends outward in the longitudinal direction of the first housing 11 and is connected by soldering or the like to a connection pad coupled to a conductive trace of the first substrate. In addition, the first side wall tail part 54*b* extends outward in the width direction of the first housing 11 and is connected by soldering or the like to a connection pad coupled to the conductive trace of the first substrate. Note that the conductive trace is a ground line, which is a ground line disposed alongside the signal line that conveys a high frequency signal functioning to electrically shield the signal line.

Further, the inner surfaces of the first end wall shield part 52*a* and the first side wall shield part 52*b* are formed so that a first end wall shield recess 55*a* and a first end wall shield recess 55*b* serving as engaging recesses are recessed therein. The first end wall shield recess 55*a* and the first side wall shield recess 55*b* are portions which, when the first connector 1 and the second connector 101 are mated, engage with a second intermediate wall shield protrusion 155*a* and a second side wall shield protrusion 155*b* serving as engaging protrusions formed on a second shielding member 151 (described below) of the second connector 101.

In addition, a first intermediate shield member 56 serving as a shield plate extending in the thickness direction (Z-axis direction) and the width direction of the first housing 11 formed by processing such as punching of a conductive metal plate is housed and held in the intermediate support part 23*c*. The first intermediate shield member 56 is an elongated band-shaped plate material which forms a first high-frequency shield 50 in cooperation with the first shield member 51, and includes a base part 56*a* extending in the width direction of the first housing 11, a pair of engaging protrusions 56*b* projecting upward from the upper end of the base part 56a, and a first intermediate shield recess 56c serving as an engaging recess formed on a side surface of the engaging protrusion 56b.

When the first intermediate shield member 56 is then inserted or press-fitted into a groove (not illustrated) formed on the lower surface side of the intermediate support part 23 from the lower surface side of the bottom plate 23—that is, from the mounting surface 11b side—the engaging protrusion 56b projects upward from the upper surface of the intermediate support part 23c through the intermediate support opening 23b. As a result, the first intermediate shield member 56 is housed and held in the intermediate support part 23c. Note that although the first intermediate shield member 56 is not necessarily attached to the first housing 11 by insertion or press fitting and may be integrated with the first housing 11 by overmolding or insert molding, a case in which the first intermediate shield member 56 is inserted or press-fitted into the intermediate support part 23c and held will be described here for the sake of explanatory convenience. Moreover, in the example shown in the figures, the first intermediate shield member 56 does not directly contact the first shield member 51. However, when the first connector 1 and the second connector 101 are mated together, the first intermediate member 56 and the first shield member 51 conduct electricity and reach the same electric potential through contact with the second shield member 151 of the second connector 101. Note that the first intermediate shield member 56 and the first shield member 51 can make direct contact as necessary.

In this manner, the first intermediate shield member 56 extending in the width direction of the first housing 11 is disposed between mutually adjacent first high-frequency terminal support parts 24 disposed so as to be aligned in a row in the longitudinal direction of the first housing 11, so a first high-frequency shield 50 serving as a first shield to surround the periphery of one first high-frequency terminal 71 and to provide an electromagnetic shield in the mating direction (Z-axis direction) is formed on the periphery of each first high-frequency terminal support part 24. A first high-frequency connection unit 70 serving as a first connection unit is formed by one first high-frequency terminal 71 and first high-frequency shield 50. The first high-frequency connection unit 70 can exhibit a shielding effect equivalent to a conventional coaxial type connector while having a small size and low profile, can transmit high-frequency signals, and has a substantially rectangular external shape in a planar view, so a plurality of the first high-frequency connection units 70 can be disposed without gaps in the first housing 11 having a substantially rectangular external shape in a planar view. Accordingly, a plurality (eight in the example illustrated in the drawings) of the first high-frequency connection units 70 can be disposed in close contact so as to be aligned in one row in the longitudinal direction of the first housing 11. Note that in the example illustrated in the drawings, eight of the first high-frequency connection units 70 are disposed in the longitudinal direction of the first housing 11, but more or fewer than eight of the first high-frequency connection units 70 may be arranged as necessary.

Further, the first shield member 51 is a member formed integrally by carrying out processes such as punching and bending a metal plate, and in a state attached to the first housing 11, the first end wall shield part 52a and the first side wall shield 52b part cover more than half of the inside surface of the first end wall part 21 and the first side wall part 14, while the first end wall cover part 53a and the first side wall cover part 53b cover at least a portion of the surfaces on the mating surface 11a side of the first end wall part 21 and the first side wall part 14, allowing the first shield member 51 to function as a reinforcing fitting for reinforcing the entire first connector 1. In addition, since the first end wall tail part 54a and the first side wall tail part 54b connected to the bottom ends of the first end wall shield part 52a and the first side wall shield part 52b are connected by soldering or the like to connection pads coupled to the ground line of the first substrate, the first shield member 51 is difficult to deform, and the first connector 1 is effectively reinforced.

Next, the configuration of the second connector 101 will be described.

Figure 5:
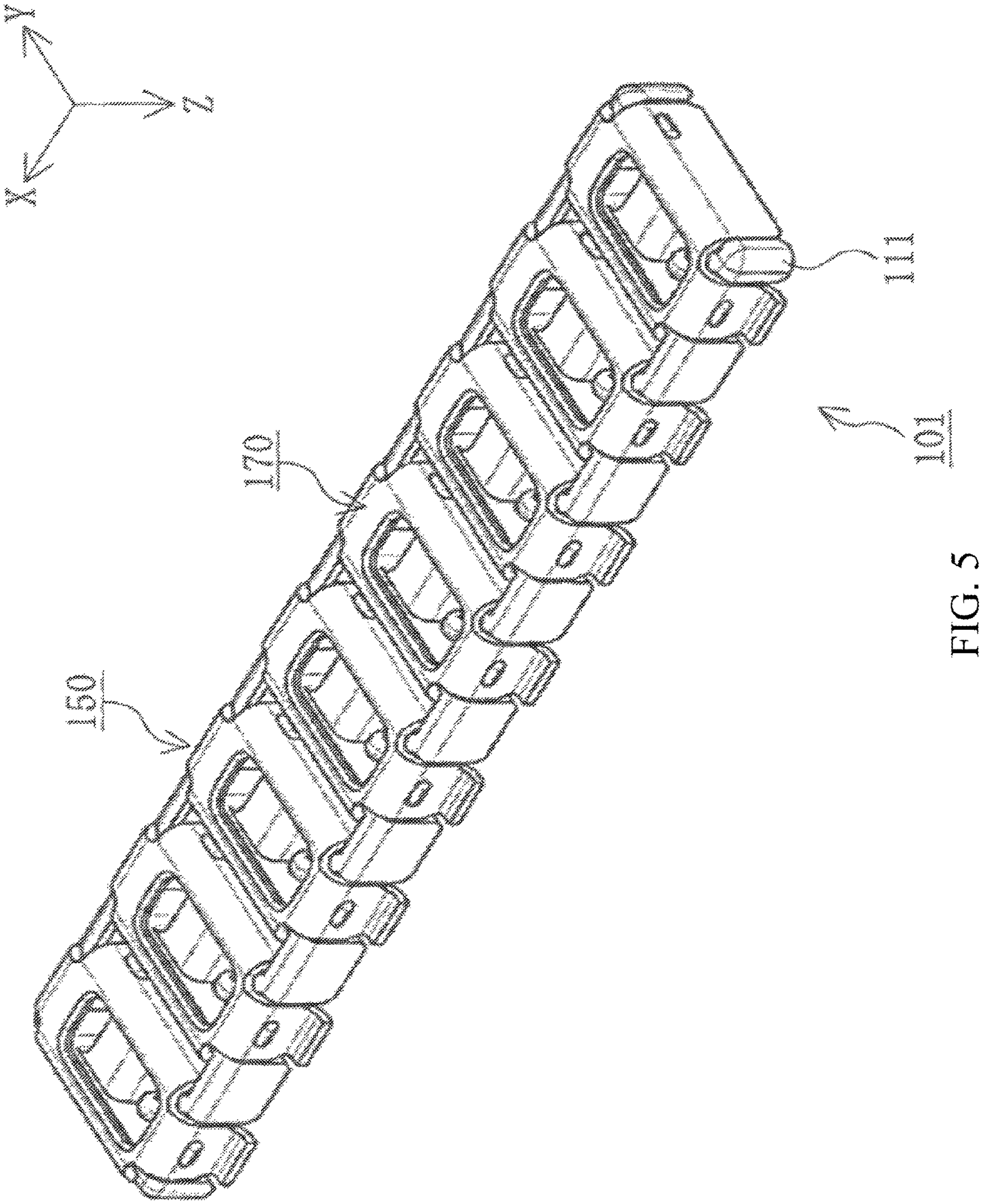
FIG. 5 is a perspective view of the second connector according to Embodiment 1.
Figure 6:
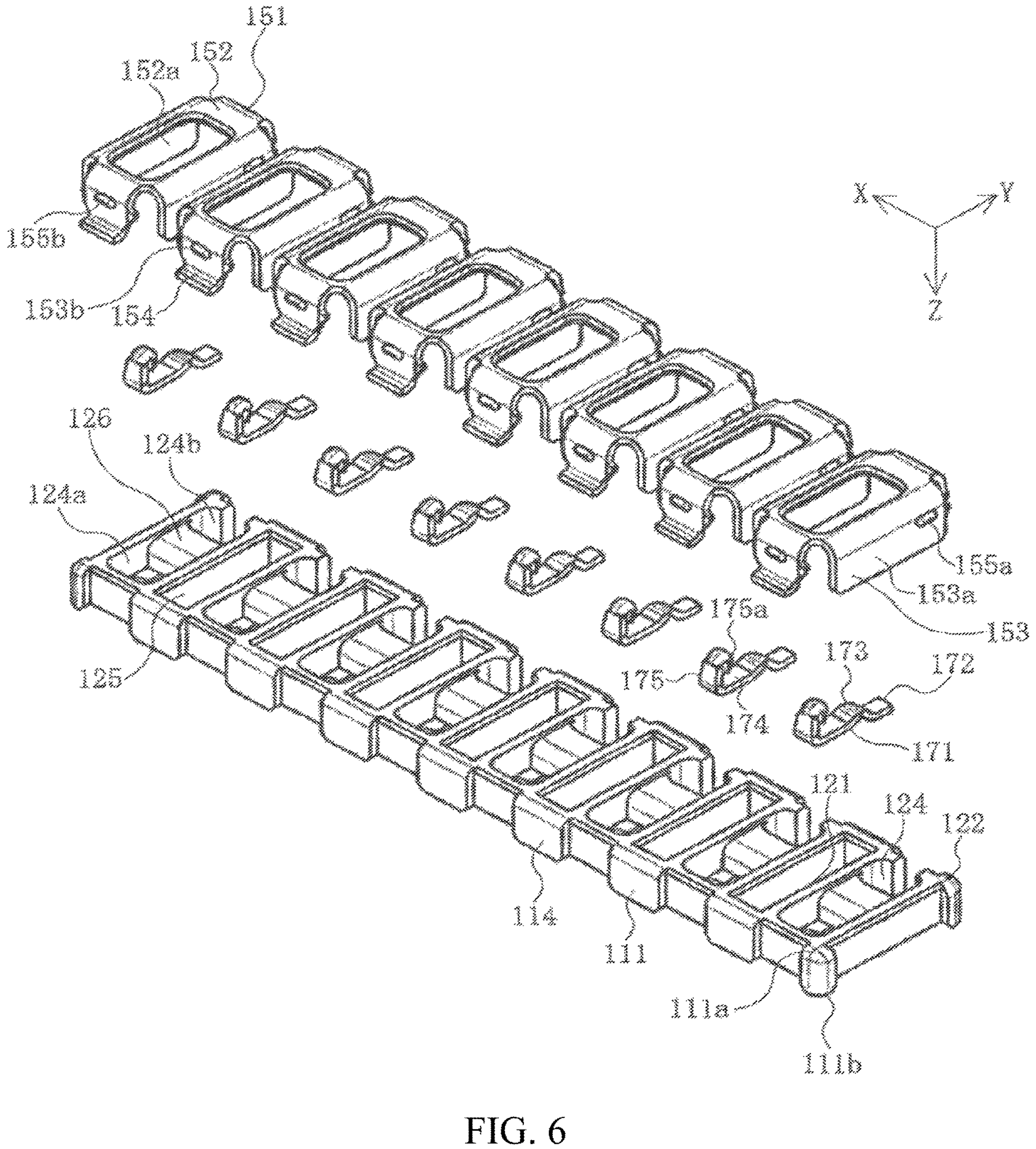
FIG. 6 is an exploded view of the second connector according to Embodiment 1.

FIG. 5 is a perspective view of the second connector according to Embodiment 1. FIG. 6 is an exploded view of the second connector according to Embodiment 1.

The second connector 101 as a counterpart connector according to the present embodiment has the second housing 111 as a second connector body that is a counterpart connector body integrally formed of an insulating material such as synthetic resin. As illustrated in the figure, this second housing 111 is a substantially rectangular body with the shape of a substantially rectangular thick plate.

Further, the second housing 111 includes a second side wall part 114 serving as a side wall part extending in the longitudinal direction of the second housing (X-axis direction) defining both sides of a second projection 122, and a second intermediate wall part 121 extending in the width direction of the second housing (Y-axis direction) and having both ends connected to the second side wall part 114. In addition, a plurality (eight in the example illustrated in the drawings) of second projections 122 serving as second high-frequency connection unit support parts are disposed on the second housing 111. In a state in which the first connector 1 and the second connector 101 are mated, the second projections 122 function as insertion protrusions to be inserted into the first recess 12 of the first connector 1.

The second projections 122 are disposed so as to be aligned in one row in the longitudinal direction of the second housing 111, and intermediate recesses 125 are formed between mutually adjacent projections 122. Each intermediate recess 125 has a substantially rectangular shape in a planar view in which both sides in the longitudinal direction of the second housing 111 are defined by the second intermediate wall part 121 and both sides in the width direction of the second housing 111 are defined by the second side wall part 114, and serves as a through-hole passing through the second housing 111 from the mating surface 111a to the mounting surface 111b in the plate thickness direction thereof (Z-axis direction).

In addition, each second projection 122 includes one second high-frequency terminal housing recess serving as a second terminal housing recess. The second high-frequency terminal housing recess 124 has a substantially rectangular shape in a planar view in which both sides in the longitudinal direction of the second housing 111 are defined by the second intermediate wall part 121 and both sides in the width direction of the second housing 111 are defined by the second side wall part 114, and serves as a through-hole passing through the second housing 111 from the mating surface 111a to the mounting surface 111b in the plate thickness direction thereof (Z-axis direction). In addition, the second high-frequency terminal housing recess 124 and the intermediate recess 125 are partitioned by the second intermediate wall part 121.

Note that a beam-shaped second high-frequency terminal support part 126 serving as a second terminal support part extending in the longitudinal direction of the second housing 111 and having both ends connected to the second intermediate wall part 121 is disposed in each second high-frequency terminal housing recess 124. In addition, the inside of each second high-frequency terminal housing recess 124 is divided by the second high-frequency terminal support part 126 into a contact part side recess 124*a* and a tail part side recess 124*b*. Note that in the example illustrated in the drawings, the portion of the second side wall part 114 corresponding to the tail part side recess 124*b* is partially missing, and the tail part side recess 124*b* is opened at the end in the width direction of the second housing 111. However, the present disclosure is not limited to this configuration, and the second side wall part 114 may be continuous so that the tail part side recess 124*b* is closed at the end in the width direction of the second housing 111.

In addition, a second high-frequency terminal 171 serving as a second terminal is attached to each of the second high-frequency terminal support parts 126, and a second shield member 151 forming a second high-frequency shield 150 as a second shield having a rectangular cylindrical shape with a substantially rectangular cross-section surrounding the periphery of the second high-frequency terminal 171 and extending in the mating direction around is attached to the periphery of each of the second high-frequency terminal housing recesses 124.

Each of the second high-frequency terminals 171 is a member integrally formed by carrying out processes such as punching and bending a conductive metal plate, and includes a second held part 173 being held by the second high-frequency terminal supporting part 126, a second tail part 172 connected to one end of the second held part 173, a second connecting part 174 connected to the other end of the second held part 173, a second contact arm 175 connected to the end of the second connecting part 174, and a second contact part 175*a* that is formed on the end of the second contact part 175, or in other words on the free end, and is a contact part.

In addition, the second high-frequency terminal 171 is integrated with the second housing 111 through overmolding or insert molding. In other words, the second housing 111 is molded by filling the cavity of a mold, in which the second high-frequency terminal 171 has been set beforehand, with an insulating material such as synthetic resin. As a result, the second high-frequency terminal 171 is integrally attached to the second high-frequency terminal supporting part 126, so that at least the second held part 173 is embedded in the second high-frequency terminal supporting part 126. Furthermore, the second high-frequency terminal 171 is not necessarily integrated with the second housing 111 by overmolding or insert molding and may be attached to the second housing 111 by press fitting, or the like, wherein, for convenience of description, the case of the integration with the second housing 111 by overmolding or insert molding will be described.

The second held part 173 is a member generally extending in the width direction of the second housing 111, and is bent so as to expand upward (Z-axis negative direction), thereby being embedded and held in the second high-frequency terminal support part 126. In addition, the second tail part 172 extends outward in the width direction of the second housing 111 from one end of the second held part 173 so as to be exposed inside the tail part side recess 124*b*, and is connected by soldering or the like to a connection pad coupled to a conductive trace of the second substrate. Note that the conductive trace is typically a signal line, and conveys a high frequency signal.

Further, the second connection part 174 extends outward in the width direction of the second housing 111 from the other end of the second held part 173 so as to be exposed inside the contact part side recess 124*a*. In addition, the second contact arm 175 extends upward from the end of the second connection part 174 inside the contact part side recess 124*a*, and is bent at approximately 180 degrees to form a U-shape near the top end thereof, forming a second contact part 175*a* that bulges inward in the width direction of the second housing 111.

Furthermore, the second high-frequency terminal 171 is integrally formed by forming a metal plate and therefore has a certain degree of elasticity. In addition, as is clear from the shape, the second connecting part 174, the second contact arm 175, and the second contact part 175*a* can be elastically deformed. Accordingly, when the first high-frequency terminal support part 24 of the first connector 1 to which the first high-frequency terminal 71 is inserted into the contact part side recess 124*a*, the second contact part 175*a* in contact with the first contact part 75*a* of the first high-frequency terminal 71 is elastically displaced outward in the width direction of the second housing 111.

In addition, the second shield member 151 a member that is integrally formed by carrying out processes such as punching and bending a conductive metal plate, and has a second cover part 152 having a substantially square shape in a planar view. The second cover part 152 is a flat plate shaped member having a substantially rectangular profile in a planar view, and a cover opening 152*a* with a substantially rectangular shape is formed in the center thereof. In addition, a second intermediate wall shield part 153*a* attached to the second intermediate wall part 121 and a second side wall shield part 153*b* attached to the second side wall part 114 are integrally connected to the four side edges of the second cover part 152 as a side surface shield part 153 attached to the side of the second high-frequency terminal housing recess 124. The second cover part 152 covers over half of the surfaces on the mating surface 111*a* side of the second side wall part 114 and the second intermediate wall part 121, and the second intermediate wall shield part 153*a* and the second side wall shield part 153*b* are connected with a bend of approximately 90 degrees at each side edge of the second cover part 152 so as to cover over half of the outside surfaces of the second intermediate wall part 121 and the second side wall part 114.

In addition, the second shield member 151 is attached to the second housing 111 by press fitting or the like. Note that although the second shield member 151 is not necessarily attached to the second housing 111 by press fitting or the like and may be integrated with the second housing 111 by overmolding or insert molding, a case in which the second shield member 151 is attached to the second housing 111 by press fitting or the like will be described here for the sake of explanatory convenience.

In addition, a second side wall tail part 154 serving as a tail part is connected with a bend of approximately 90 degrees to the bottom end of the second side wall shield part 153*b*. In addition, the second side wall tail part 154 extends outward in the width direction of the second housing 111 and is connected by soldering or the like to a connection pad coupled to the conductive trace of the second substrate. In addition, the bottom end of the second intermediate wall shield part 153*a* is also connected by soldering or the like to a connection pad connected to a conductive trace of the second substrate. Note that the conductive trace is a ground line, which is a ground line disposed alongside the signal line that conveys a high frequency signal functioning to electrically shield the signal line. In this manner, when the second shield member 151 is grounded near the second high-frequency terminal 171 so as to surround the second high-frequency terminal 171, the shield properties are enhanced, and even better SI (signal-to-interference) characteristics can be achieved. In addition, in the example illustrated in the drawings, a tail part is not connected to the bottom end of the second intermediate wall shield part 153*b*, but a tail part similar to the second side wall tail part 154 may be connected as necessary.

Further, the outer surfaces of the second intermediate wall shield part 153*a* and the second side wall shield part 153*b* are formed so that a second intermediate wall shield protrusion 155*a* and a second side wall shield protrusion 155*b* bulge as engaging protrusions. When the first connector 1 and the second connector 101 are mated, the second side wall shield protrusion 155*b* fits into and engages with the first side wall shield recess 55*b* serving as an engaging recess formed in the first shield member 51 of the first connector 1. In addition, one of the second intermediate wall shield protrusions 155*a* positioned on both ends in the longitudinal direction of the second housing 111 fits into and engages with the first end wall shield recess 55*a* of the first shield member 51, and the other second intermediate shield protrusion 155*a* fits into and engages with the first intermediate shield recess 56*c* of the first intermediate shield member 56 inserted between opposing second intermediate wall shield parts 153*a*. Note that mutually adjacent shield members 151 in the longitudinal direction of the second housing do not come into contact with one another.

In this manner, the second shield member 151 is attached to the periphery of each second high-frequency terminal housing recess 124 housing a second high-frequency terminal 171, so a second high-frequency connection unit serving as a second connection unit provided with one second high-frequency terminal 171 and a second high-frequency shield 150 providing an electromagnetic shield having a rectangular cylindrical shape with a substantially rectangular cross-section surrounding the periphery thereof and extending in the mating direction (Z-axis direction) is formed on each projection 122. The second high-frequency connection unit 170 can exhibit a shielding effect equivalent to a conventional coaxial type connector while having a small size and low profile, can transmit high-frequency signals, and has a substantially rectangular external shape in a planar view, so a plurality of the second high-frequency connection units 170 can be disposed without gaps in the second housing 111 having a substantially rectangular external shape in a planar view. Accordingly, as in the example illustrated in the drawings, a plurality (eight in the example illustrated in the drawings) of the second high-frequency connection units 170 can be disposed in close contact so as to be aligned in one row in the longitudinal direction of the second housing 111. Note that in the example illustrated in the drawings, eight of the second high-frequency connection units 170 are disposed in the longitudinal direction of the second housing 111, but more or fewer than eight of the second high-frequency connection units 170 may be arranged as necessary.

Further, the second shield member 151 is a member formed integrally by carrying out processes such as punching and bending a metal plate, and in a state attached to the second housing 111, the second cover part 152 covers more than half of the surfaces on the mating surface 111*a* side of the second side wall part 114 and the second intermediate wall part 121, while the second intermediate shield part 153*a* and the second side wall shield part 153*b* cover more than half of the outside surfaces of the second intermediate wall part 121 and the second side wall part 114, allowing the second shield member 151 to function as a reinforcing fitting for reinforcing the entire second projection 122 and the second connector 101. In addition, since the second end wall tail part 154 connected to the bottom end of the second side wall shield part 153*b* is connected by soldering or the like to a connection pad coupled to the ground line of the second substrate, the second shield member 151 is difficult to deform, and the second projection 122 and the second connector 122 are effectively reinforced.

The operation for mating the first connector 1 and the second connector 101 having the abovementioned configuration will be described next.

Figure 7:
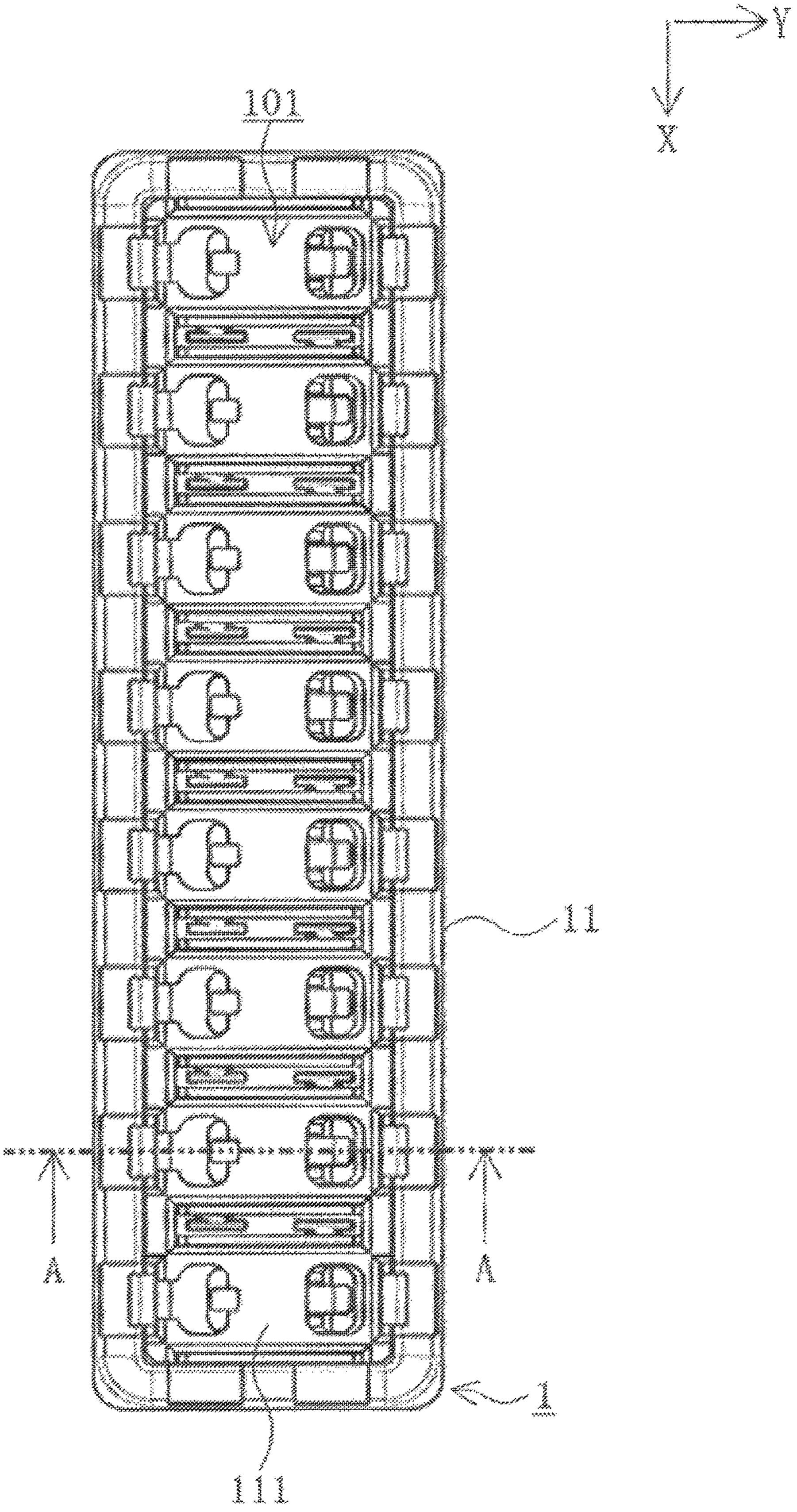
FIG. 7 is a top view of a state in which the first connector and the second connector according to Embodiment 1 are mated.
Figure 8:
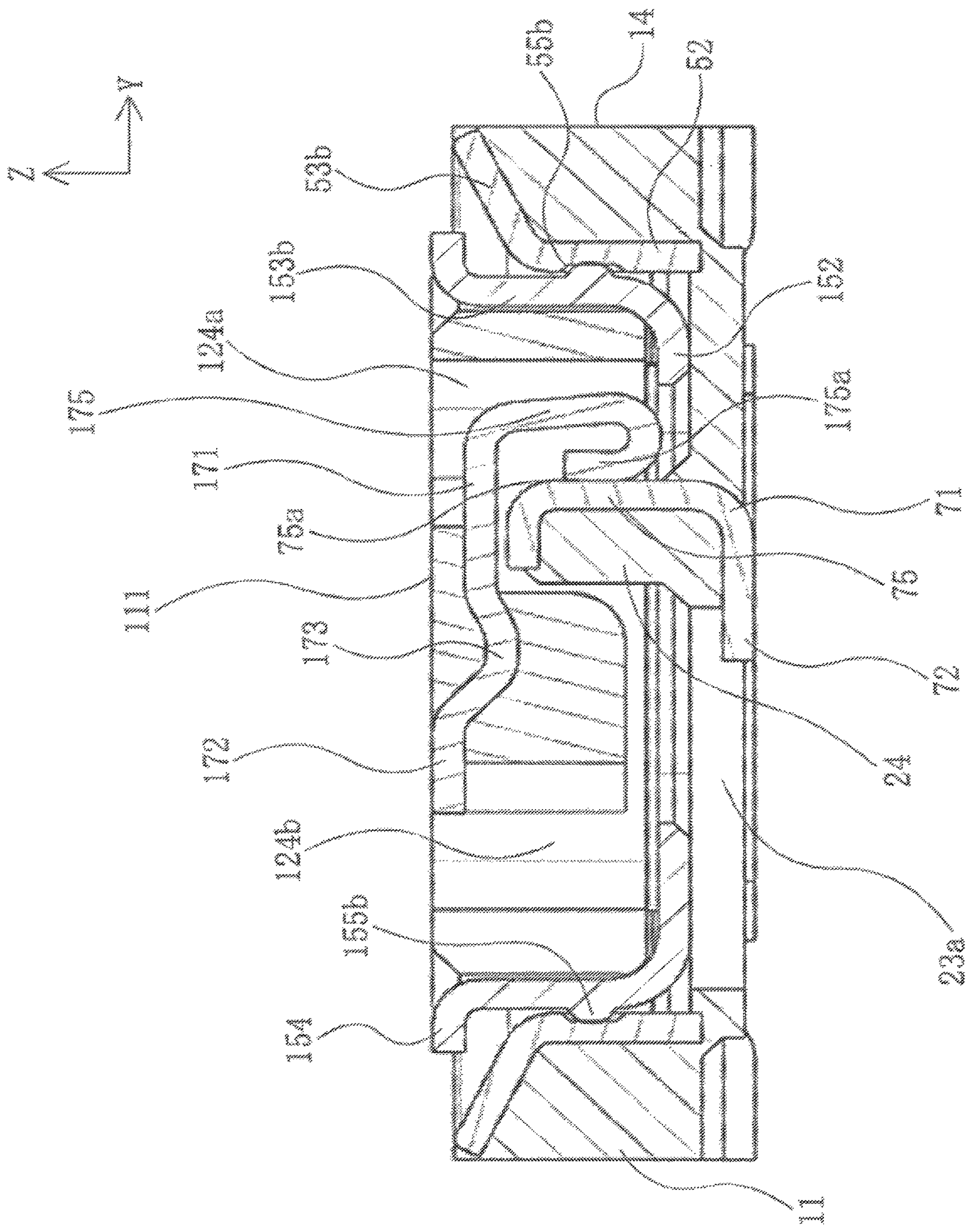
FIG. 8 is a cross-sectional view of a state in which the first connector and the second connector according to Embodiment 1 are mated, and is a cross-sectional view along along arrow A-A in FIG. 7.

FIG. 7 is a top view of a state in which the first connector and the second connector according to Embodiment 1 are mated. FIG. 8 is a cross-sectional view of a state in which the first connector and the second connector according to Embodiment 1 are mated, and is a cross-sectional view along along arrow A-A in FIG. 7.

Here, the first connector 1 is surface-mounted to the first substrate by connecting the first tail part 72 of the first high-frequency terminal 71 as well as the first end wall tail part 54*a* and the first side wall tail part 54*b* of the first shield member 51 by soldering or the like to a connection pads coupled to a conductive trace of the first substrate (not illustrated). In addition, the conductive trace coupled to the connection pad to which the first tail part 72 of the first high-frequency terminal 71 is connected is a signal line such as an antenna line connected to an antenna, which transmits high-frequency signals. The conductive trace coupled to the connection pad to which the first end wall tail part 54*a* and the first side wall tail part 54*b* of the first shield member 51 are connected is a ground line disposed along the signal line transmitting high-frequency signals, and is a ground line functioning as an electromagnetic shield for the signal line.

Similarly, the second connector 101 is surface-mounted to the second substrate by connecting the second tail part 172 of the second high-frequency terminal 171 and the second side wall tail part 154 of the second shield member 151 by soldering or the like to connection pads coupled to a conductive trace of the second substrate (not illustrated). In addition, the conductive trace coupled to the connection pad to which the second tail part 172 of the second high-frequency terminal 171 is connected is a signal line such as an antenna line connected to an antenna, which transmits high-frequency signals. The conductive trace coupled to the connection pad to which the second side wall tail part 154 of the second shield member 151 is connected is a ground line disposed along the signal line transmitting high-frequency signals, and is a ground line functioning as an electromagnetic shield for the signal line.

First, as illustrated in FIG. 2, an operator places the mating surface 11*a* of the first housing 11 of the first connector in a state facing the mating surface 111*a* of the second housing 111 of the second connector 101, and aligns the positions of the second projections 122 of the second connector 101 with the position of the corresponding first recess 12 of the first connector 1, thereby completing the alignment of the first connector 1 and the second connector 101.

In this state, when the first connector 1 and/or the second connector 101 are moved in a direction approaching one another—that is, in the mating direction—the second projections 122 of the second connector 101 are inserted into the first recess 12 of the first connector 1. As a result, as illustrated in FIGS. 1 and 7, the first high-frequency terminal

71 and the second high-frequency terminal 171 reach a conductive state upon completion of the mating of the first connector 1 and the second connector 101.

Specifically, each first high-frequency terminal support part 24 is inserted into the contact part side recess 124*a* of the corresponding second high-frequency terminal housing recess 124, and the first contact part 75*a* of the first high-frequency terminal 71 and the second contact part 175*a* of the second high-frequency terminal 171 come into contact, resulting in conduction between the conductive trace coupled to the connection pad on the first substrate to which the first tail part 72 of the first high-frequency terminal 71 is connected and the conductive trace coupled to the connection pad on the second substrate to which the second tail part 172 of the second high-frequency terminal 171 is connected. Consequently, the first high-frequency terminal 71 and the second high-frequency terminal 171 which correspond to each other come into contact only at a single location, or a so-called state of a single contact point, rather than contacting at multiple locations, or a so-called state of multiple contact points, resulting in no unintentional stub or divided circuit being formed in a signal transmission line from the first tail part 72 of the first high-frequency terminal 71 to the second tail part 172 of the second high-frequency terminal 171, thereby stabilizing the impedance of the transmission line. Accordingly, good SI characteristics can be achieved even when using the transmission line to transmit high-frequency signals.

Further, the second projections 122 are inserted in the first recess 12, and the second side wall shield protrusions 155*b* of the first shield member 151 engage with and come into contact with the first side wall shield recesses 55*b* of the first shield member 51. In addition, one of the second intermediate wall shield protrusions 155*a* positioned on both ends in the longitudinal direction of the second housing 111 engages and comes into contact with the first end wall shield recess 55*a* of the first shield member 51, and the other second intermediate shield protrusion 155*a* engages and comes into contact with the first intermediate shield recess 56*c* of the first intermediate shield member 56 inserted between opposing second intermediate wall shield parts 153*a*. As a result, the conductive trace coupled to the connection pad on the first substrate to which the first end wall tail part 54*a* and the first side wall tail part 54*b* of the first shield member 51 are connected becomes conductive with the conductive trace coupled to the connection pad on the second substrate to which the second side wall tail part 154 of the second shield member 151 is connected. Accordingly, the ground line of the first substrate, the ground line of the second substrate, the first shield member 51, the first intermediate shield member 56, and the second shield member 151 are equipotential, and the shield properties are enhanced. Note that when used for the transmission of high-frequency signals (for example, a frequency of 6 GHz or higher), it is most preferable for the second side wall shield protrusion 155*b* to come into contact with the first side wall shield recess 55*b* and for the second intermediate wall shield protrusion 155*a* to come into contact with the first end wall shield recess 55*a* and the first intermediate shield recess 56*c*, however, it is not absolutely necessary for the second side wall shield protrusion 155*b* and the first side wall shield recess 55*b* to come into contact.

Further, the second side wall shield protrusion 155*b* of the second shield member 151 engages with the first side wall shield protrusion 55*b* of the first shield member 51, and the second intermediate shield protrusion 155*a* of the second shield member 151 engages with the first end wall shield recess 55*a* of the first shield member 51 and the first intermediate shield recess 56*c* of the first intermediate shield member 56. This results in a state in which the first shield member 51 is locked with the second shield member 151 and the first intermediate shield member 56 is locked with the second shield member 151, which prevents the disconnection of the mated state of the first connector 1 and the second connector 101.

Further, the second contact part 175*a* of the second high-frequency terminal 171 is formed so as to bulge inward in the width direction of the second housing 111 from the top end of the second contact arm 175. Therefore, as illustrated in FIG. 8, the distance between the second contact arm 175 and the second cover part 152 of the second shield member 151 is reduced. The impedance of the signal transmission line in the second connector 101 can be adjusted based on the length of this distance. Accordingly, the impedance of the signal transmission line in the second connector 101 can be adjusted by adjusting the shape—that is, the degree of bulging—of the second contact part 175*a*.

In this manner, once the mating of the first connector 1 and the second connector 101 is complete, a state in which each second high-frequency connection unit 170 is inserted into the corresponding first high-frequency connection unit 70 is achieved, and the first high-frequency terminal 71 of each first high-frequency connection unit 70 makes contact and becomes conductive with the second high-frequency terminal 171 of the corresponding second high-frequency connection unit 170 at a single contact point. In addition, the second high-frequency shield 150 having a rectangular cylindrical shape with a substantially rectangular cross section consisting of the second shielding member 151 of the second high-frequency connection unit 170 is inserted into the first high-frequency shield 50 having a rectangular cylindrical shape with a substantially rectangular cross section consisting of the first side plate part 52 of the first shielding member 51 of the first high-frequency connection unit 70 and the first center shielding member 56. Therefore, the first high-frequency terminals 71 and the second high-frequency terminals 171 connected to each other are in a state of redundancy based on an electromagnetic shield with the periphery thereof extending in the mating direction and having a rectangular cylindrical shape with a substantially rectangular cross section, and good SI characteristics can be obtained even when using the transmission line for transmitting high frequency signals.

Note that, herein, the first high-frequency terminal 71 and the second high-frequency terminal 171 were described as being connected to a signal line for transmitting a high frequency signal. However, this signal line is not absolutely limited thereto, and may be used for transmitting a signal of any sort of frequency.

Next, a second embodiment will be described. Note that the description of elements having the same structures as those of Embodiment 1 will be omitted by being denoted by the same reference numerals. Furthermore, a description of operations and effects that are the same as those of Embodiment 1 will be omitted.

Figure 9:
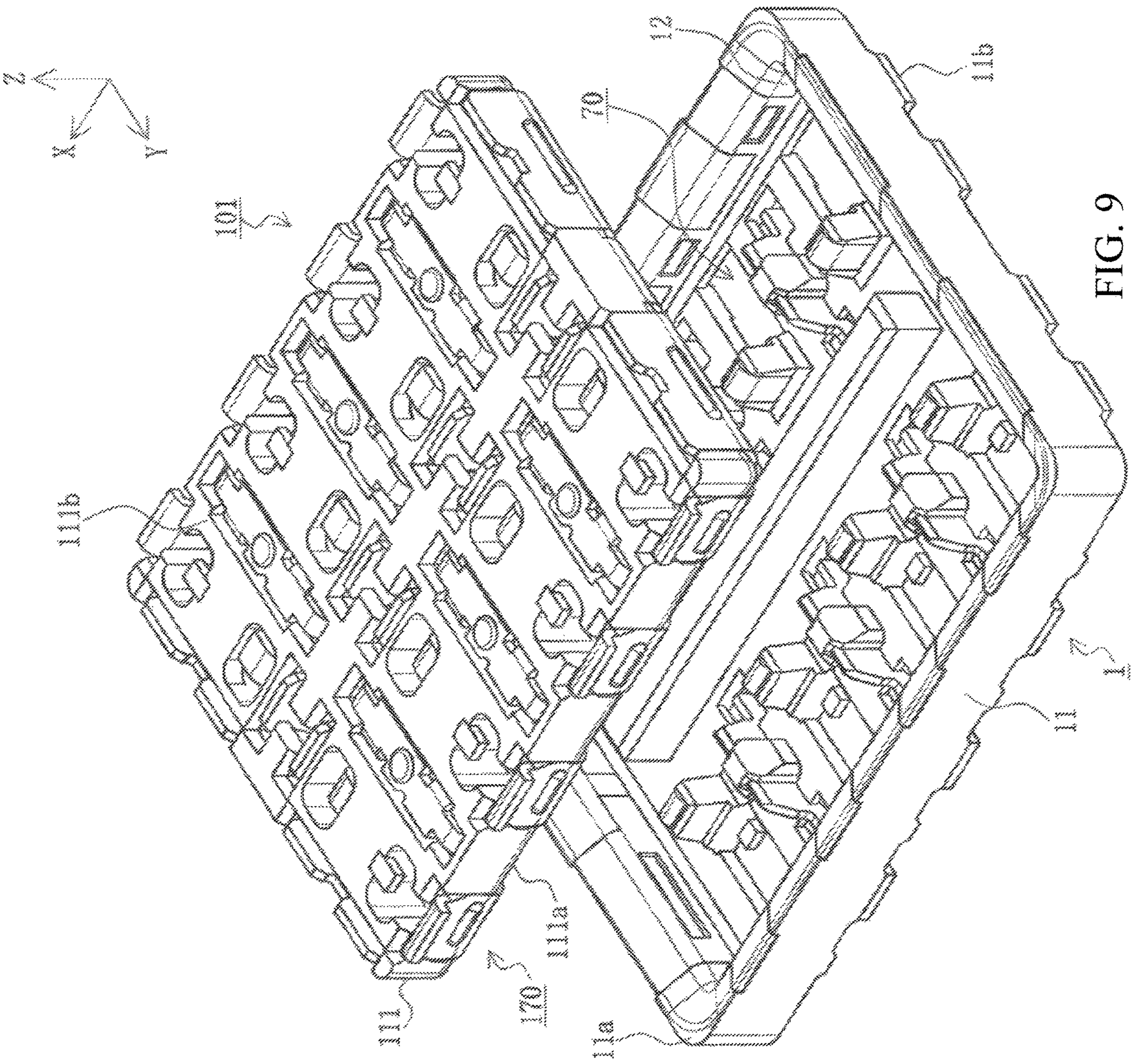
FIG. 9 is a perspective view of the first connector and the second connector according to Embodiment 2 prior to mating.
Figure 10:
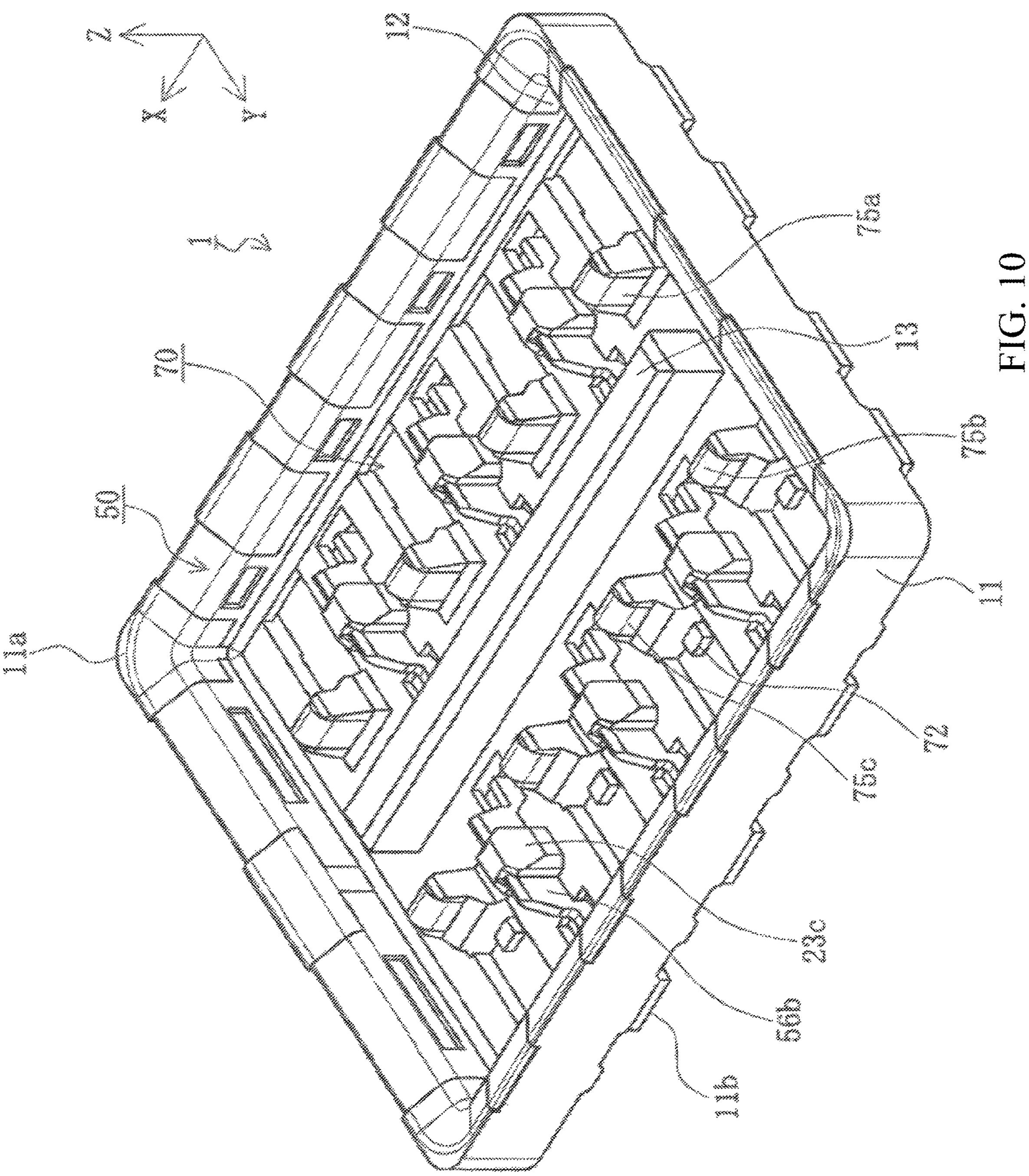
FIG. 10 is a perspective view of the first connector according to Embodiment 2.
Figure 11:
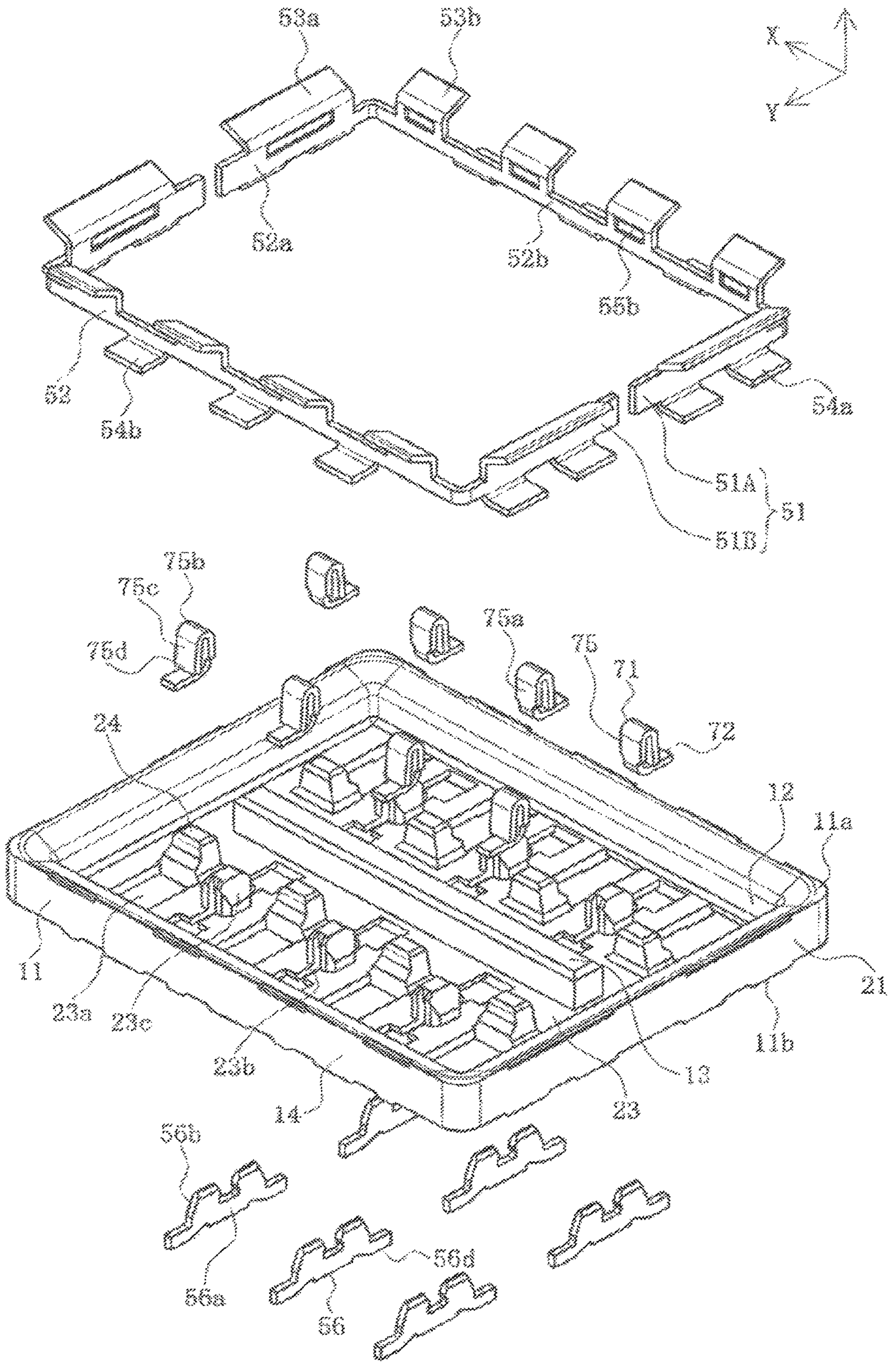
FIG. 11 is an exploded view of the first connector according to Embodiment 2.
Figure 12A:
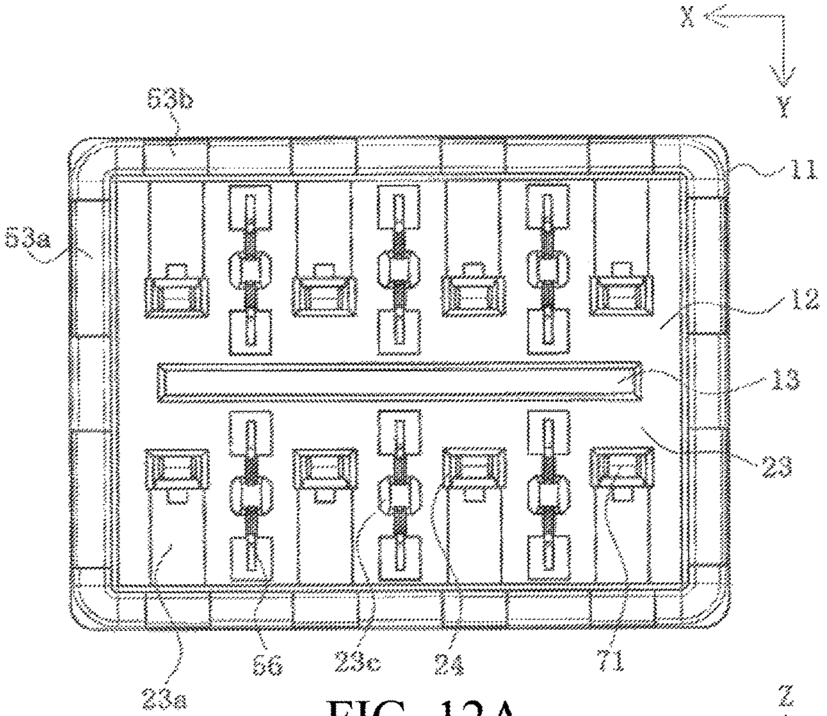
FIGS. 12A through 12D include four views of the first connector according to Embodiment 2, where
Figure 12D:
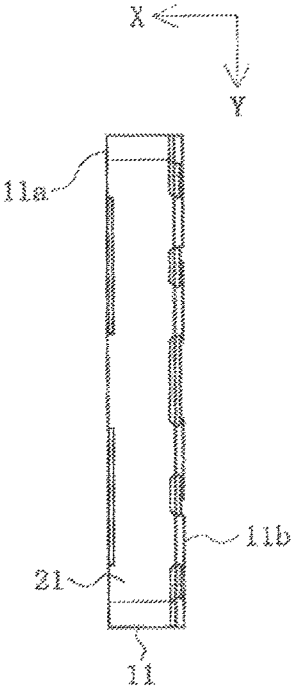
Figure 12B:
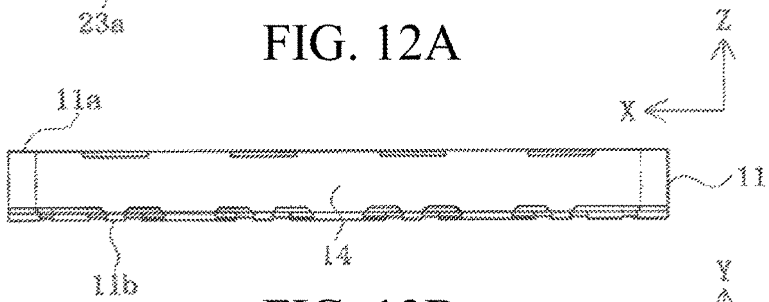
Figure 12C:
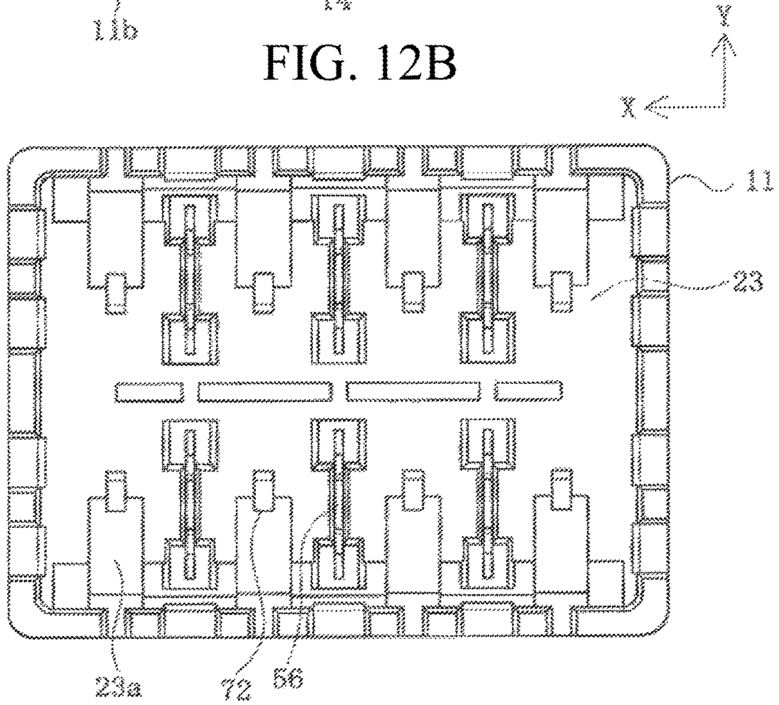

FIG. 9 is a perspective view of a first connector and a second connector according to Embodiment 2 prior to mating. FIG. 10 is a perspective view of the first connector according to Embodiment 2. FIG. 11 is an exploded view of the first connector according to Embodiment 2. FIG. 12 includes four views of the first connector according to Embodiment 2. Note that in FIG. 12, FIG. 12A is a top view, FIG. 12B is a side view, FIG. 12C is a bottom view, and FIG. 12D is a rear view.

In Embodiment 1 described above, a plurality of first high-frequency connection units 70 provided in the first connector 1 are disposed so as to be aligned in one row in the longitudinal direction (X-axis direction) of the first housing 11, and a plurality of second high-frequency connection units 170 provided in the second connector 101 are also disposed so as to be aligned in one row in the longitudinal direction (X-axis direction) of the second housing 111. However, in this embodiment, a plurality of first high-frequency connection units 70 are disposed so as to be arranged in a plurality of rows (for example, two rows) in the longitudinal direction of the first housing 11, and the second high-frequency connection units 170 are also disposed so as to be arranged in a plurality of rows (for example, two rows) in the longitudinal direction of the second housing 111. Note that the number of rows of the first high-frequency connection units 70 and the number of rows of the second high-frequency connection units 170 are not limited to two rows, and any number of rows may be used as long as there are a plurality of rows, but a case of two rows will be described here for the sake of explanatory convenience.

In addition, in this embodiment, the first recess 12 of the first housing 11 is divided in two in the width direction (Y-axis direction) of the first housing 11 by a central partition 13 serving as a partition extending in the longitudinal direction of the first housing 11. Further, the central partition 13 is a member such as a wall which projects upward (Z-axis positive direction) from a bottom plate 23 in the center of the width direction of the first recess 12 and extends in the longitudinal direction of the first housing 11. Note that both ends in the longitudinal direction of the central partition 13 are separated from the first wall part without being connected to the first end wall part 21.

In addition, a plurality (eight in the example illustrated in the drawings) of first high-frequency terminal support parts 24 serving as first terminal support parts are disposed so as to be aligned in one row each in the longitudinal direction of the first housing 11 in the first recess 12 on both sides of the central partition 13. That is, in the example illustrated in the drawings, two rows of four first high-frequency terminal support parts 24 are formed. Each bottom plate opening **23*a* is disposed adjacent to the corresponding first high-frequency terminal support part 24 on the opposite side of the central partition 13. In addition, the intermediate support parts 23*c* are disposed between the mutually adjacent first high-frequency terminal support parts in each row of the first high-frequency terminal support parts 24. The intermediate support part 23*c* in this embodiment is formed so that the dimension in the width direction of the first housing 11 is smaller but the dimension in the thickness direction (Z-axis direction) of the first housing 11 is larger than the intermediate support part 23*c* in Embodiment 1. In addition, the intermediate support opening 23*b* in this embodiment is larger than the intermediate support opening 23*b* in Embodiment 1 and is formed so as to extend from both side surfaces in the width direction of the first housing 11 in the intermediate support part 23*c* to the bottom plate 23** on the outside.

In this embodiment, the first intermediate shield member 56 includes a base part **56*a* extending in the width direction of the first housing 11, a pair of engaging protrusions 56*b* extending upward from the top end of the base part 56*a*, and a pair of tail parts 56*d* extending in the width direction of the first housing from both ends of the base part 56*a*. In addition, the bottom ends of the tail parts 56*d*** are connected by soldering or the like to connection pads coupled to a conductive trace of the first substrate. Note that the conductive trace is a ground line, which is a ground line disposed alongside the signal line that conveys a high frequency signal functioning to electrically shield the signal line.

Whereas the first connection part 75 of the first high-frequency terminal 71 in Embodiment 1 has a substantially U-shaped side surface shape, the first connection part 75 of the first high-frequency terminal 71 in Embodiment 2 has a substantially square shape. That is, the first connection part 75 in this embodiment includes a curved part **75*b* that curves approximately 180 degrees and is connected to the top end of the portion extending in the vertical direction, and a support reinforcing part 75*c* extending downward (Z-axis negative direction) from the curved part 75*b*. As illustrated in FIG. 10, in a state in which the first high-frequency terminal 71 is attached to the first high-frequency terminal support part 24, the support reinforcing part 75*c* is embedded in the first high-frequency terminal support part 24 in on the opposite side of the first contact part 75*a* near the lower end 75*d* thereof. As a result, the strengths of the first connection part 75 and the first high-frequency terminal support part 24 are enhanced. Note that the lower end 75*d* of the support reinforcing part 75*c* is near the first tail part 72 but separated from the first tail part 72. As a result, a divided circuit is not formed on the signal transmission line from the first tail part 72 to the first contact part 75*a***, so the impedance of the transmission line is stable.

Note that in comparison to the first connector 1 in Embodiment 1 described above, the first connector 1 in this embodiment has different dimensional ratios in each direction and different shapes of each of the parts, but it has substantially the same structure in the other aspects described above, so descriptions thereof will be omitted.

In the first connector 1 of this embodiment, the first intermediate shield member 56 extending in the width direction of the first housing 11 is disposed between mutually adjacent first high-frequency terminal support parts 24 disposed so as to be arranged in two rows in the longitudinal direction of the first housing 11, so a first high-frequency shield 50 serving as a first shield to surround the periphery of one first high-frequency terminal 71 and to provide an electromagnetic shield having a rectangular cylindrical shape with a substantially rectangular cross-section extending in the mating direction (Z-axis direction) is formed on the periphery of each first high-frequency terminal support part 24. Note that since no member functioning as a shield member is disposed on the central partition 13, the first high-frequency shield 50 has a rectangular cylindrical shape with a substantially rectangular cross-section with exactly one surface missing, but when the mating of the first connector 1 and the second connector 101 is complete, the second high-frequency shield 150 having a rectangular cylindrical shape with a substantially rectangular cross-section is in a state inserted into the first high-frequency shield 50, so the four sides on the periphery of each first high-frequency terminal support part 24 are substantially surrounded by the electromagnetic shield having a rectangular cylindrical shape with a substantially rectangular cross-section. Accordingly, good SI characteristics can be achieved even when using the transmission line to transmit high-frequency signals.

In addition, as illustrated in FIG. 12A, the spacing (pitch) between mutually adjacent first high-frequency terminals 71 in the longitudinal direction of the first housing 11 is set to be shorter than the spacing between mutually adjacent first high-frequency terminals 71 in the width direction of the first housing 11 because the first intermediate shield member 56 serving as a shield plate is disposed therebetween. Further, since the pair of tail parts **56*d* positioned at both ends of the first intermediate shield member 56 extending in the width direction of the first housing 11 are connected by soldering or the like to a connection pad connected to a ground line, the position of the first high-frequency terminal 71 is between the pair of tail parts 56** at the connection to the ground line in the width direction of the first housing.

Accordingly, the first high-frequency terminal 71 is effectively shielded by the first intermediate shield member 56.

Note that the pitch between mutually adjacent first high-frequency terminals 71 in the longitudinal direction of the first housing 11 is preferably shorter than ¼ the wavelength of a transmitted high-frequency signal. For example, when the frequency of the high-frequency signal is from 40 to 70 GHz, the pitch is preferably approximately 1.1 mm. In addition, the dimensions in the longitudinal direction, the width direction, and the thickness direction of the first housing 11 are approximately 5.0 mm, 4.0 mm, and 0.6 mm, for example, but may be changed as necessary.

Next, the configuration of the second connector 101 will be described.

Figure 13:
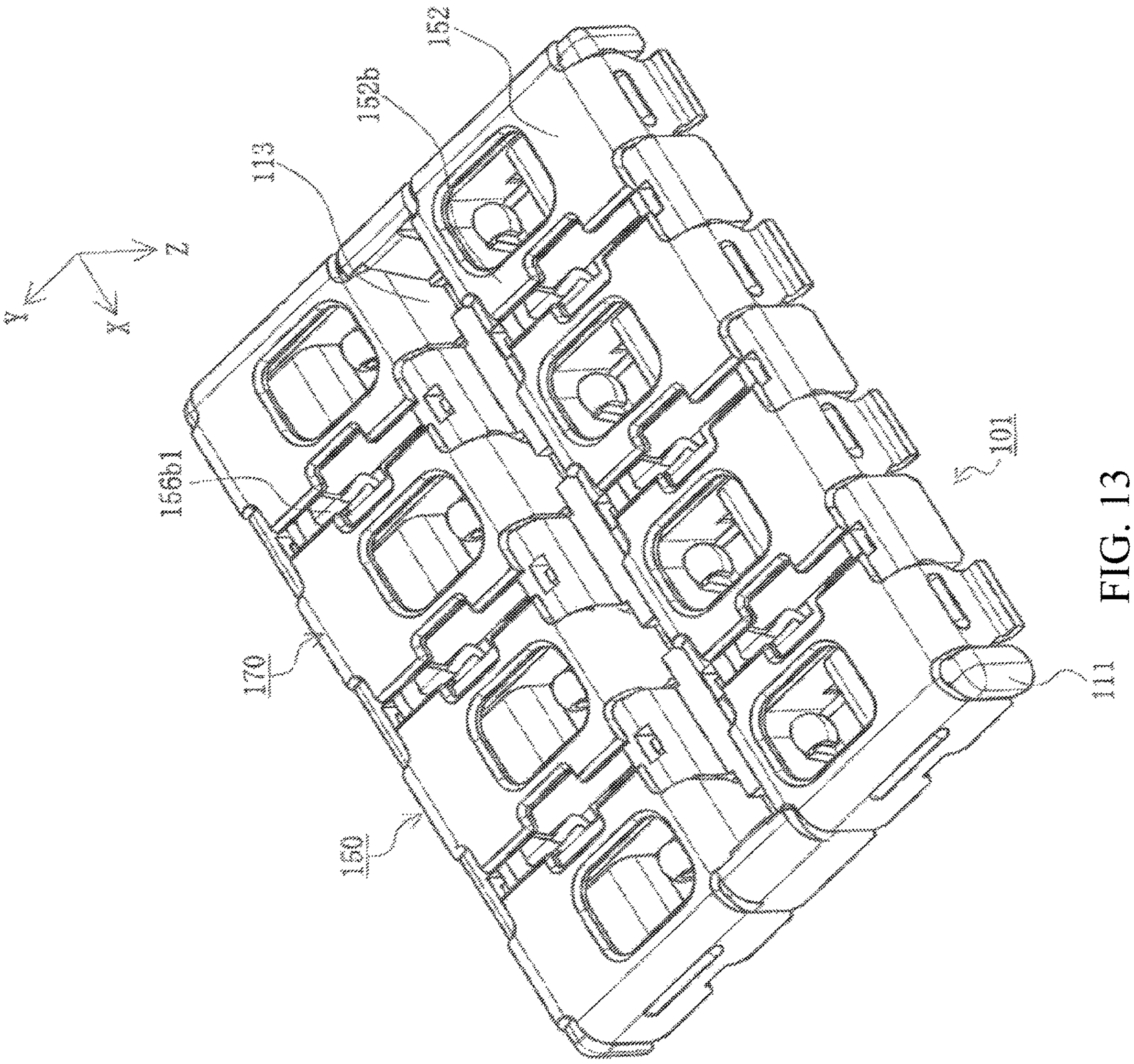
FIG. 13 is a perspective view of the second connector according to Embodiment 2.
Figure 14:
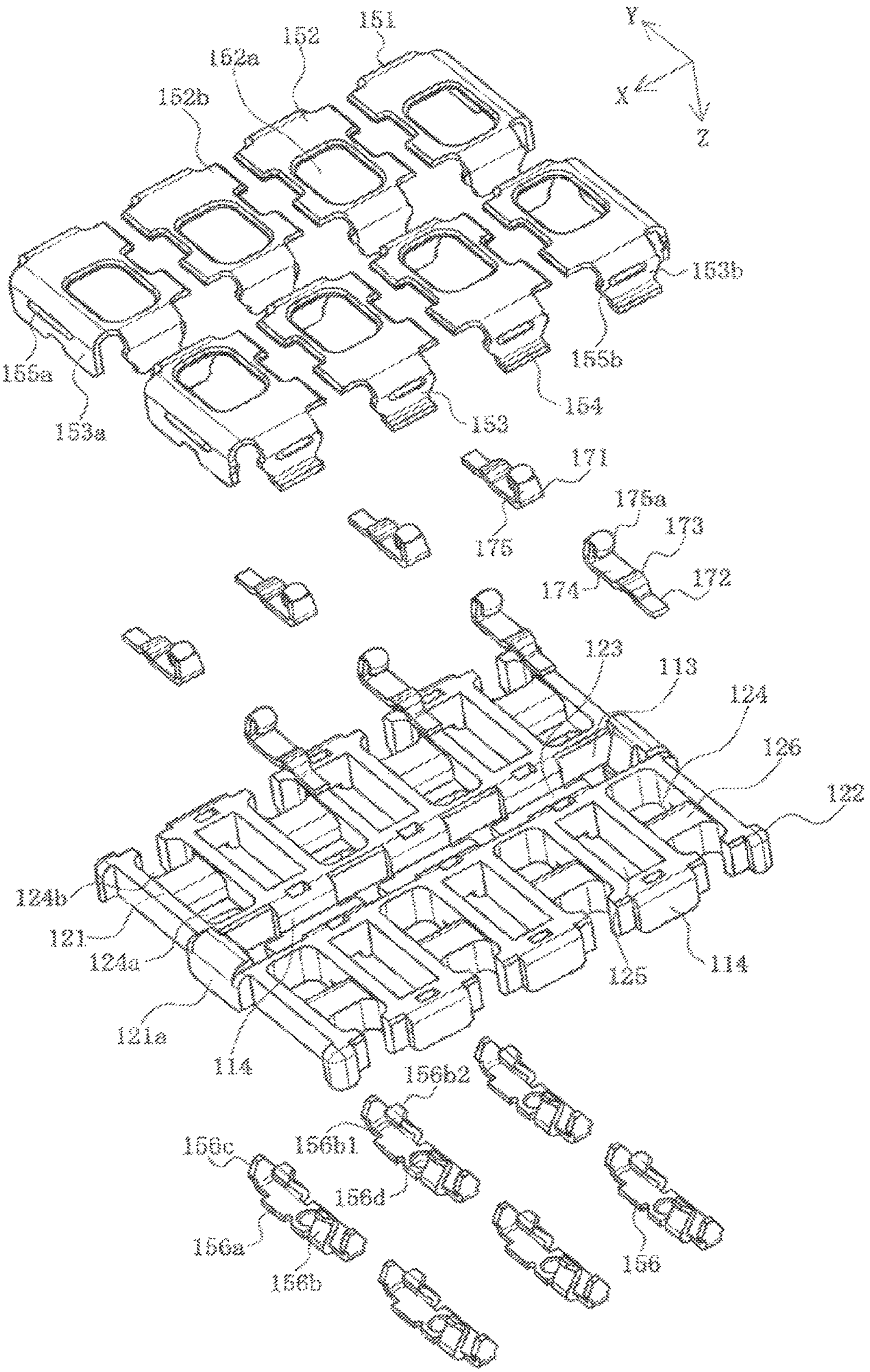
FIG. 14 is an exploded view of the second connector according to Embodiment 2.
Figure 15A:
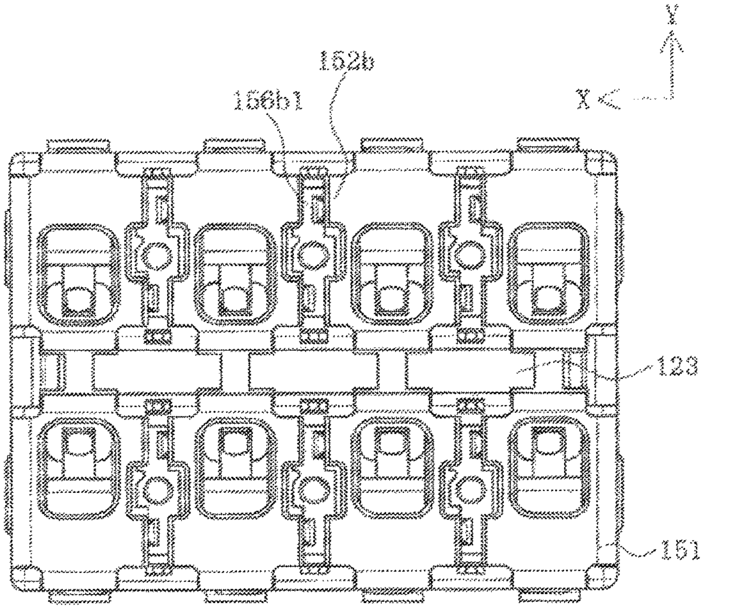
FIGS. 15A through 15D include includes four views of the second connector according to Embodiment 2, where
Figure 15D:
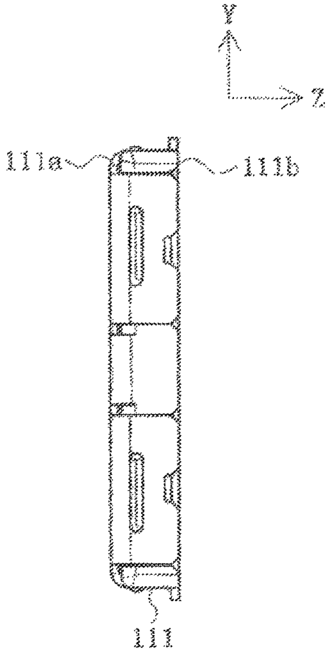
Figure 15B:
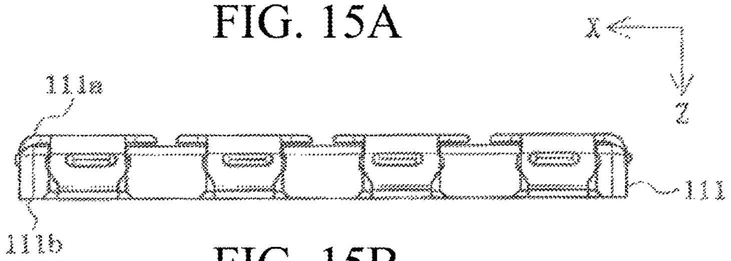
Figure 15C:
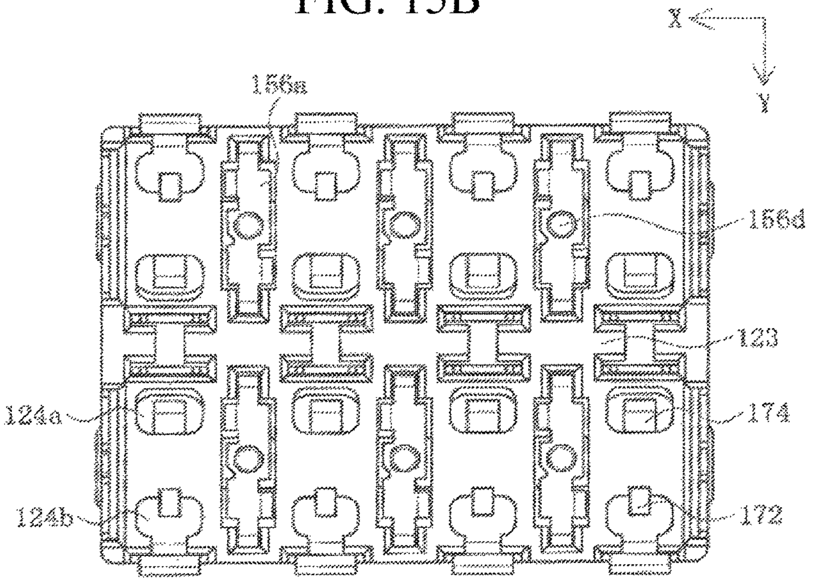

FIG. 13 is a perspective view of a second connector according to Embodiment 2. FIG. 14 is an exploded view of the second connector according to Embodiment 2. FIG. 15 includes four views of the first connector according to Embodiment 2. Note that in FIG. 15, FIG. 15A is a top view, FIG. 15B is a side view, FIG. 15C is a bottom view, and FIG. 15D is a rear view.

In this embodiment, the second projections 122 are disposed so as to be arranged in two rows in the longitudinal direction of the second housing 111, and a central partition recess 113 is formed between the rows, while a central bottom plate 123 connecting the rows is formed on the bottom of the central partition recess 113. When the first connector 1 and the second connector 101 are mated, the central partition 13 of the first housing 11 is inserted into the central partition recess 113. In addition, in each row, as in Embodiment 1 described above, an intermediate recess 125 is formed between mutually adjacent second projections 122, and the second high-frequency terminal housing recess 124 and the intermediate recess 125 of each second projection are separated by a second intermediate wall part 121. Note that the second intermediate wall parts 121 positioned on both sides in the longitudinal direction of the second housing 111 in each row are connected by an intermediate wall connection part 121*a* to the second intermediate wall part 121 positioned on both sides in the longitudinal direction of the second housing 111 in the other row.

Further, in the second high-frequency terminal housing recess 124, the contact part side recess 124*a* is positioned near the central partition 13, and the tail part side recess 124*b* is disposed so as to be positioned on the opposite side of the central partition 13.

In addition, the second shield member 151 includes a second cover part 152 having a substantially rectangular cover opening 152*a* formed in the center thereof. A second wall shield part 153*b* attached to the second side wall part 114 is integrally connected to the second cover part 152 of all of the second shield members 151. However, the second intermediate wall shield part 153*a* attached to the second intermediate wall part is connected only to the second cover part 152 of the second shield member 151 positioned at both ends in the longitudinal direction of the second housing 111 in each row of the second projections 122, and is also attached only to the side edges on both end sides of the second cover part 152 in the longitudinal direction of the second housing 111 and attached only to the second intermediate wall part 121 positioned at both ends in the longitudinal direction of the second housing 111. Accordingly, the second intermediate wall shield part 153*a* is not attached to the second intermediate wall part 121 between mutually adjacent second projects in each row, and there is no second intermediate wall shield part 153*a* present in each intermediate recess 125. Note that in the second cover part 152 of each second shield member 151, a canopy part 152*b* projecting toward the other second shield member 151 is formed on a side edge on the side of the other second shield member 151 adjacent in the longitudinal direction of the second housing 111.

In this embodiment, a second intermediate shield member 156 serving as a shield member is disposed in each intermediate recess 125. The second intermediate shield member 156 is a plate member formed by performing processing such as punching on a conductive metal plate, and includes a strip-like base part 156*a* extending in the width direction of the second housing 111, a pair of engaging arms 156*b* extending upward from the side edges of the base part 156*a*, a pair of mounting parts 156*c* extending upward from both ends of the base part 156*a*, and soldering parts 156*d* bulging downward from the lower surface of the base part 156*a*. The mounting parts 156*c* are attached to the second housing 111 by press fitting or the like, and the base part 156*a* covers over half of the lower surface of the intermediate recess 125. In addition, the bottom ends of the soldering parts 156*d* are connected by soldering or the like to connection pads coupled to a conductive trace of the second substrate. Note that the conductive trace is a ground line, which is a ground line disposed alongside the signal line that conveys a high frequency signal functioning to electrically shield the signal line.

Further, the engaging arm 156*b* is an elastic member bent so that the shape is substantially Z-shaped in a side view, and the base end is connected to one of the side edges of the base part 156*a*. A contact protrusion 156*b*1 projecting toward the other side edge of the base part 156*a* is formed near the free end, and a tip 156*b*2 serving as the free end faces diagonally upward on the one side edge side. In addition, one of the engaging arms 156*b* is connected to one side edge of the base part 156*a* near one end in the width direction of the second housing 111, and the other engaging arm 156*b* is connected to the other side edge of the base part 156*a* near the other end in the width direction of the second housing 111. Further, each engaging arm 156*b* is connected to the base part 156*a* such that the tip 156*b*2 is directly below the canopy part 152*b* of the second shield member 151 in a state in which the second shield member 151 and the second intermediate shield member 156 are attached to the second housing 111. Accordingly, as illustrated in FIG. 15A, when viewed from the mating surface 111*a* side, the tip 156*b*2 is covered by the canopy part 152*b* and becomes invisible.

Note that although the second intermediate shield member 156 is not necessarily attached to the second housing 111 by press fitting or the like and may be integrated with the second housing 111 by overmolding or insert molding, a case in which the second shield member 151 is attached to the second housing 111 by press fitting or the like will be described here for the sake of explanatory convenience.

Note that in comparison to the second connector 101 in Embodiment 1 described above, the second connector 101 in this embodiment has different dimensional ratios in each direction and different shapes of each of the parts, however, the connector has substantially the same structure in the other aspects described above, so descriptions thereof will be omitted.

In the second connector 101 of this embodiment, the second intermediate shield member 156 extending in the width direction of the second housing 111 is disposed between mutually adjacent second high-frequency terminal housing recesses 124 disposed so as to be arranged in two rows in the longitudinal direction of the second housing 111, so a second high-frequency shield 150 configured to surround the periphery of one second high-frequency terminal 171 and to provide an electromagnetic shield having a rectangular cylindrical shape with a substantially rectangular cross-section extending in the mating direction (Z-axis direction) is formed on the periphery of each second high-frequency terminal housing recesses 124. Note that since the second intermediate shield member 156 is not a flat plate-shaped member extending in the Y-Z direction, the second high-frequency shield 150 has a precisely rectangular cylindrical shape with a substantially rectangular cross-section with one or two surfaces missing, however, when the mating of the first connector 1 and the second connector 101 is complete, the plate-shaped first intermediate shield member 156 is in a state inserted between the pair of mounting parts 156*c* of the second intermediate shield member 156, and therefore the periphery of each second high-frequency terminal 171 is substantially surrounded by the electromagnetic shield having a rectangular cylindrical shape with a substantially rectangular cross-section. Accordingly, good SI characteristics can be achieved even when using the transmission line to transmit high-frequency signals.

Note that when the frequency of the high-frequency signal is from 40 to 70 GHz, for example, the pitch of the second high-frequency terminal 171 is preferably approximately 1.1 mm. In addition, the dimensions in the longitudinal direction, the width direction, and the thickness direction of the second housing 111 are approximately 4.3 mm, 3.5 mm, and 0.5 mm, for example, but may be changed as necessary.

The operation for mating the first connector 1 and the second connector 101 having the abovementioned configuration will be described next.

As illustrated in FIG. 9, in a state in which the alignment of the first connector 1 and the second connector 101 is complete, when an operator moves the first connector 1 and/or the second connector 101 in a direction approaching one another—that is, in the mating direction—the second projections of the second connector 101 are inserted into the first recess 12 of the first connector 1 to complete the mating of the first connector 1 and the second connector 101.

Incidentally, since both the first connector 1 and the second connector 101 are small, low-profile connectors with very small dimensions and are surface-mounted to the much larger first substrate and second substrate, it is difficult for the operator to view the orientations and positional relationships of the first connector 1 and the second connector 101. Therefore, the first connector 1 and the second connector 101 could be mated while the mating surface 11*a* of the first connector 1 and the mating surface 111*a* of the second connector 111 are in contact and slide in a state in which the first connector 1 and the second connector 101 are misaligned with one another in the X- or Y-axis direction or are inclined with respect to one another. Even in such a case, in this embodiment, the first connector 1 and the second connector 101 can be mated smoothly without causing any damage or breakage.

For example, when the mating surface 111*a* of the second connector 101 is misaligned in the X-axis direction and makes contact in an inclined state with the mating surface 11*a* of the first connector 1, one end in the X-axis direction (longitudinal direction) of the second housing 111 slides while in contact with the mating surface 11*a* of the first connector 1. Specifically, the upper surface of the intermediate wall connection part 121*a* of the second housing 111 slides while in contact with the upper surface of the central partition 13 of the first housing 11. Accordingly, the shield member, which is a metal member, does not make contact with the first high-frequency terminal support part 24 or the first high-frequency terminal 71 attached to the first high-frequency terminal support part 24, or the intermediate support part 23*c* or the first intermediate shield member 56 attached to the intermediate support part 23*c*, so the second shield member 151 does not cause damage.

When the mating of the first connector and the second connector 101 is complete, the central partition 13 of the first housing 11 is inserted into and housed in the central partition recess 113 of the second housing 111. In addition, the first intermediate shield member 56 attached to the first housing 11 is inserted into the central recess 125 of the second housing 111 and is connected to the second intermediate shield member 156 inside the intermediate recess 125. Specifically, the engaging protrusion 56*b* of the first intermediate shield member 56 is pressed into the contact protrusion 156*b*1 of the engaging arm 156*b* of the second intermediate shield member 156, and the contact protrusion 156*b*1 is elastically displaced, so the engaging protrusion 56*b* and the contact protrusion 156*b*1 reliably maintain contact due to the elastic repulsive force thereof. In addition, since the tip 156*b*2 of the engaging arm 156*b* is covered by the canopy part 152*b* of the second shield member 151, when the engaging protrusion 56*b* is inserted into the intermediate recess 125, it never comes into contact with the tip 156*b*2, and the engaging arm 156*b* does not buckle.

In this manner, when the mating of the first connector 1 and the second connector 101 is complete, one of the second side wall shield parts 153*b* of the second shield member 151 is inserted into the missing surface of the first high-frequency shield 50 having a rectangular cylindrical shape with a substantially rectangular cross-section formed by the first side plate part 52 of the first shield member 51 and the first intermediate shield member 56. Therefore, the periphery of each first high-frequency terminal support part 24 is substantially surrounded by an electromagnetic shield having a rectangular cylindrical shape with a substantially rectangular cross-section. Further, the second side wall tail part 154 is bent approximately 90 degrees to the lower end of the second side wall shield part 153*b* on the outside in the width direction of the second connector 101 and extends outward in the width direction of the second connector 101, and the second side wall tail part 154 and the lower end of the second side wall shield 153*b* on the inside in the width direction of the second connector 101 are connected by soldering or the like to connection pads coupled to the conductive trace of the second substrate. In addition, the first intermediate shield member 56 is inserted to the missing one or two surfaces of the second intermediate wall shield part 153*a* and the second side wall shield part 153*b* of the second shield member 151, and comes into contact with the second intermediate shield member 156. As a result, the first intermediate shield member 56 is grounded with respect to the second substrate by the soldering part 156*a* of the second intermediate shield member 156. This yields a state in which the periphery of each second high-frequency terminal 171 is substantially surrounded by an electromagnetic shield having a rectangular cylindrical shape with a substantially rectangular cross-section. Accordingly, the perimeters of the first high-frequency terminals 71 and the second high-frequency terminals 171 connected to one another are in state surrounded by an electromagnetic shield having a rectangular cylindrical shape with a substantially rectangular cross-section extending in the mating direction, so good SI characteristics can be achieved even when the transmission line is used to transmit high-frequency signals.

Note that since the configurations, operations, and effects of the first connector 1 and the second connector 101 in this embodiment are in other respects the same as in Embodiment 1, descriptions thereof will be omitted.

As described above, in this embodiment, the first connector 1 includes the first housing 11 and the plurality of first high-frequency connection units 70 filling the first housing 11, and the first connector 1 is mounted on the first substrate and mated with the second connector 101. The first housing 11 includes a first recess 12 into which the second housing 111 of the second connector 101 is inserted, which is a first recess 12 having a substantially rectangular shape in a planar view filled with the plurality of first high-frequency connection units 70 in a closely aligned state in the longitudinal direction of the first housing 11. Each first high-frequency connection unit 70 includes a first high-frequency shield 50 having a rectangular cylindrical shape with a substantially rectangular cross-section surrounding the periphery of the first high-frequency terminal 71 and extending in the mating direction. The first high-frequency shield 50 includes a first intermediate shield member 56 that is shared with a mutually adjacent first high-frequency shield 50 in the longitudinal direction of the first housing 11, and the first intermediate shield member 56 extends in the width direction of the first housing 111. The first intermediate shield member 56 includes a pair of tail parts **56*d* positioned at both ends thereof, and the tail parts 56*d* are connected to the connections to the ground line of the first substrate. The first high-frequency terminal 71 of each first high-frequency connection unit 70 is positioned between the pair of tail parts 56*d* in the width direction of the first housing 11**.

As a result, it is possible to load the first high-frequency connection units 70 with high space efficiency, to enable a plurality of signal lines to be connected while maintaining a small size and low profile, and to achieve a high shielding effect for the first high-frequency terminal 71, which enhances reliability.

In addition, the first high-frequency shield 50 surrounds the four sides of the periphery of the first high-frequency terminal 71. Further, the first high-frequency connection units 70 are disposed so as to form a plurality of rows arranged in the longitudinal direction of the first housing 11. In addition, the spacing between the first high-frequency terminals 71 of mutually adjacent first high-frequency connection units 70 in the longitudinal direction of the first housing 11 is shorter than the spacing between the first high-frequency terminals 71 of mutually adjacent first high-frequency connection units 70 in the width direction of the first housing 11.

Further, in this embodiment, the second connector 101 includes the second housing 111 and the plurality of second high-frequency connection units 170 filling the second housing 111, and the second connector 101 is mated with the first connector 1. The second housing 111 has a substantially rectangular shape in a planar view, and the plurality of second high-frequency connection units 170 are loaded in a closely aligned state in the longitudinal direction of the second housing 111 and inserted into the first recess 12 of the first connector 1. Each second high-frequency connection unit 170 includes a second high-frequency terminal 171 and a second high-frequency shield 150 having a rectangular cylindrical shape with a substantially rectangular cross-section surrounding the periphery of the second high-frequency terminal 171 and extending in the mating direction. The second high-frequency shield 150 includes a second shield member 151 having a flat plate-shaped second cover part 152 which includes a substantially rectangular cover opening **152*a* and is orthogonal to the mating direction with a substantially rectangular shape in a planar view, and a side surface shield part 153 connected to the side edge of the second cover part 152 and extending in the mating direction. Mutually adjacent shield members 151 in the longitudinal direction of the second housing 111** do not come into contact with one another.

Further, the second high-frequency connection units 170 are disposed so as to form a plurality of rows arranged in the longitudinal direction of the second housing 111. Further, each second high-frequency connection unit 170 includes a second high-frequency terminal housing recess 124 for housing the second high-frequency terminal 171, and the side surface shield part 153 is attached to the side of the second high-frequency terminal housing recess 124. In addition, the second high-frequency terminal 171 is disposed near the second cover part 152, and the impedance can be adjusted by adjusting the distance between the second high-frequency terminal 171 and the second cover part 152.

Further, in this embodiment, the connector assembly includes: the first connector 1 having the first housing 11 and the plurality of first high-frequency connection units 70 loaded into the first housing 11, and the second connector 101 which has the second housing 111 and the plurality of second high-frequency connection units 170 loaded into the housing 111 and mates with the first connector 1. The first housing 11 includes a first recess 12 into which the second housing 111 is inserted, which is a first recess 12 having a substantially rectangular shape in a planar view filled with the plurality of first high-frequency connection units 70 in a closely aligned state in the longitudinal direction of the first housing 11. Each first high-frequency connection unit 70 includes a first high-frequency shield 50 having a rectangular cylindrical shape with a substantially rectangular cross-section surrounding the periphery of the first high-frequency terminal 71 and extending in the mating direction. The first high-frequency shield 50 includes a first intermediate shield member 56 that is shared with a mutually adjacent first high-frequency shield 50 in the longitudinal direction of the first housing 11, and the first intermediate shield member 56 extends in the width direction of the first housing 111. The second housing 111 has a substantially rectangular shape in a planar view, and the plurality of second high-frequency connection units 170 are loaded in a closely aligned state in the longitudinal direction of the second housing 111 and inserted into the first recess 12 of the first housing 11. Each second high-frequency connection unit 170 includes a second high-frequency terminal 171 and a second high-frequency shield 150 having a rectangular cylindrical shape with a substantially rectangular cross-section surrounding the periphery of the second high-frequency terminal 71 and extending in the mating direction. The second high-frequency shield 150 includes a second shield member 151 having a flat plate-shaped second cover part 152 which includes a substantially rectangular cover opening **152*a* into which the first high-frequency terminal 71 is inserted and is orthogonal to the mating direction with a substantially rectangular shape in a planar view, and a side surface shield part 153 connected to the side edge of the second cover part 152 and extending in the mating direction. The first intermediate shield member 56 is inserted between mutually adjacent shield members 151 in the longitudinal direction of the second housing 111**.

Next, a third embodiment will be described. It should be noted that the description of elements having the same structure as the first and second embodiments will be omitted by denoting these elements using the same reference numerals. Furthermore, descriptions of operations and effects that are the same as those of the first and second embodiments will also be omitted.

Figure 16:
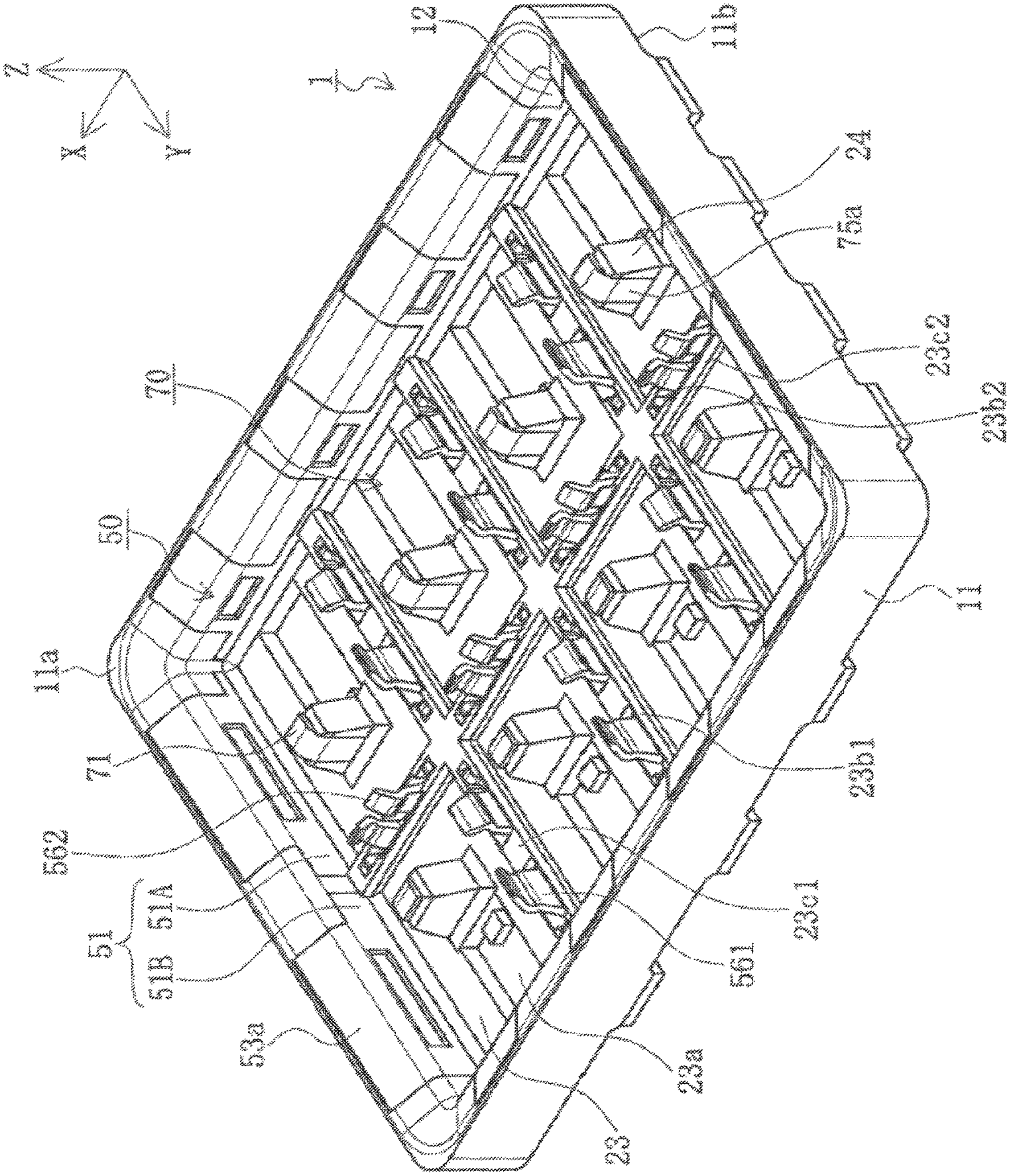
FIG. 16 is a perspective view of the first connector according to Embodiment 3.
Figure 17A:
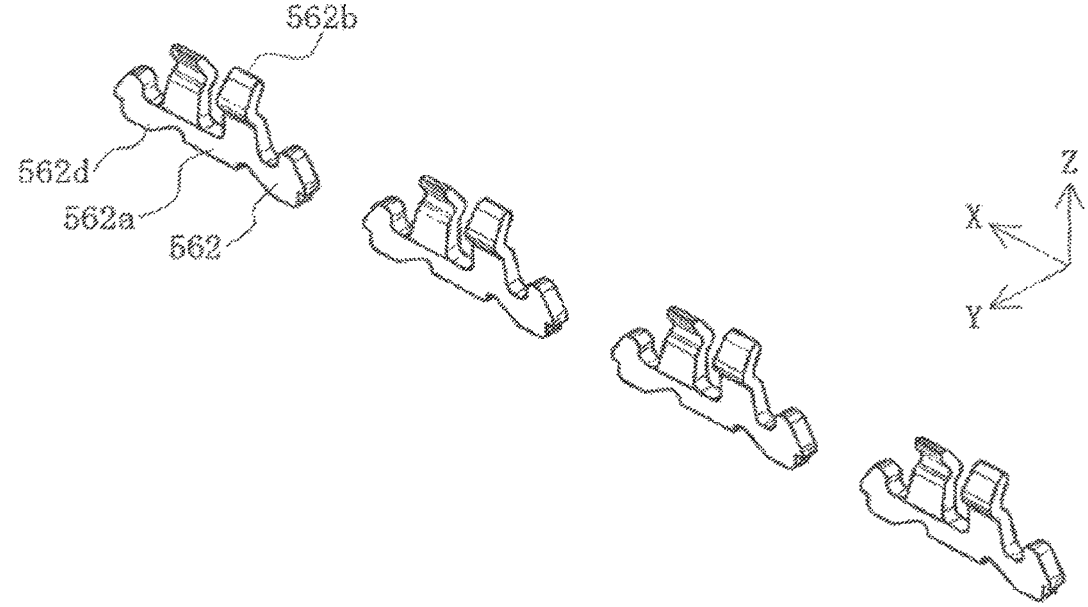
FIGS. 17A and 17B are perspective views illustrating an arrangement of a first intermediate shield member according to Embodiment 3, where
Figure 17B:
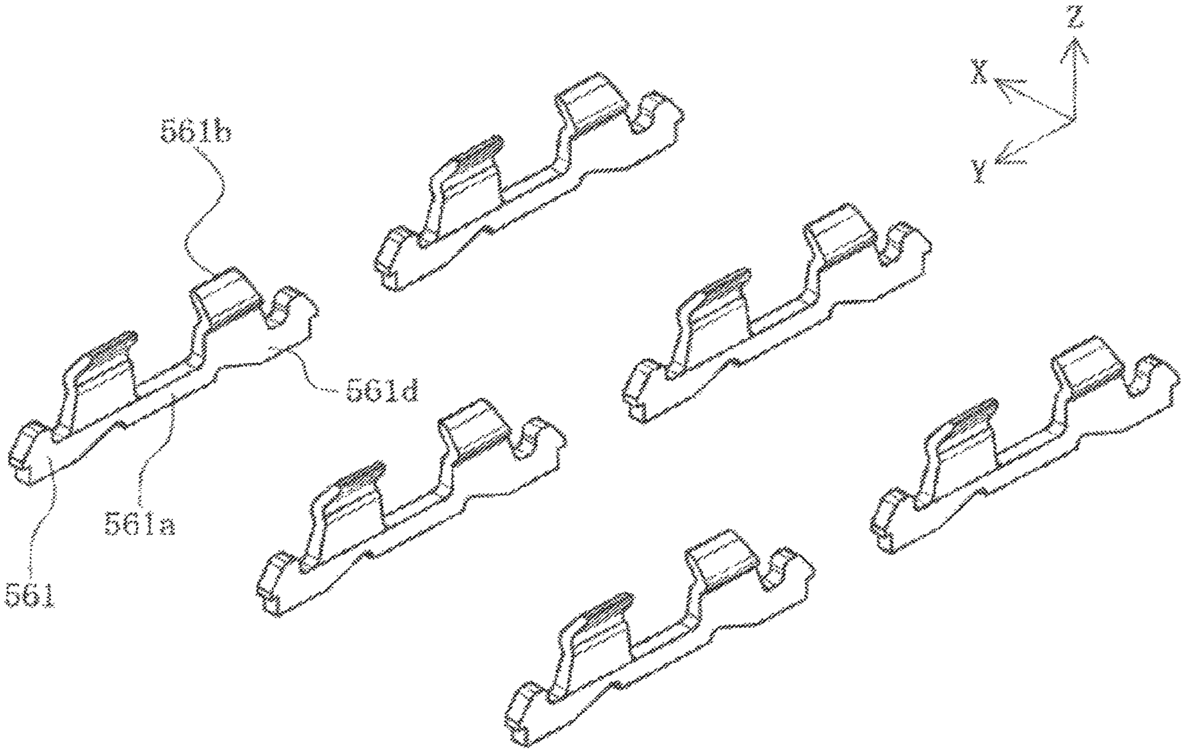
Figure 18:
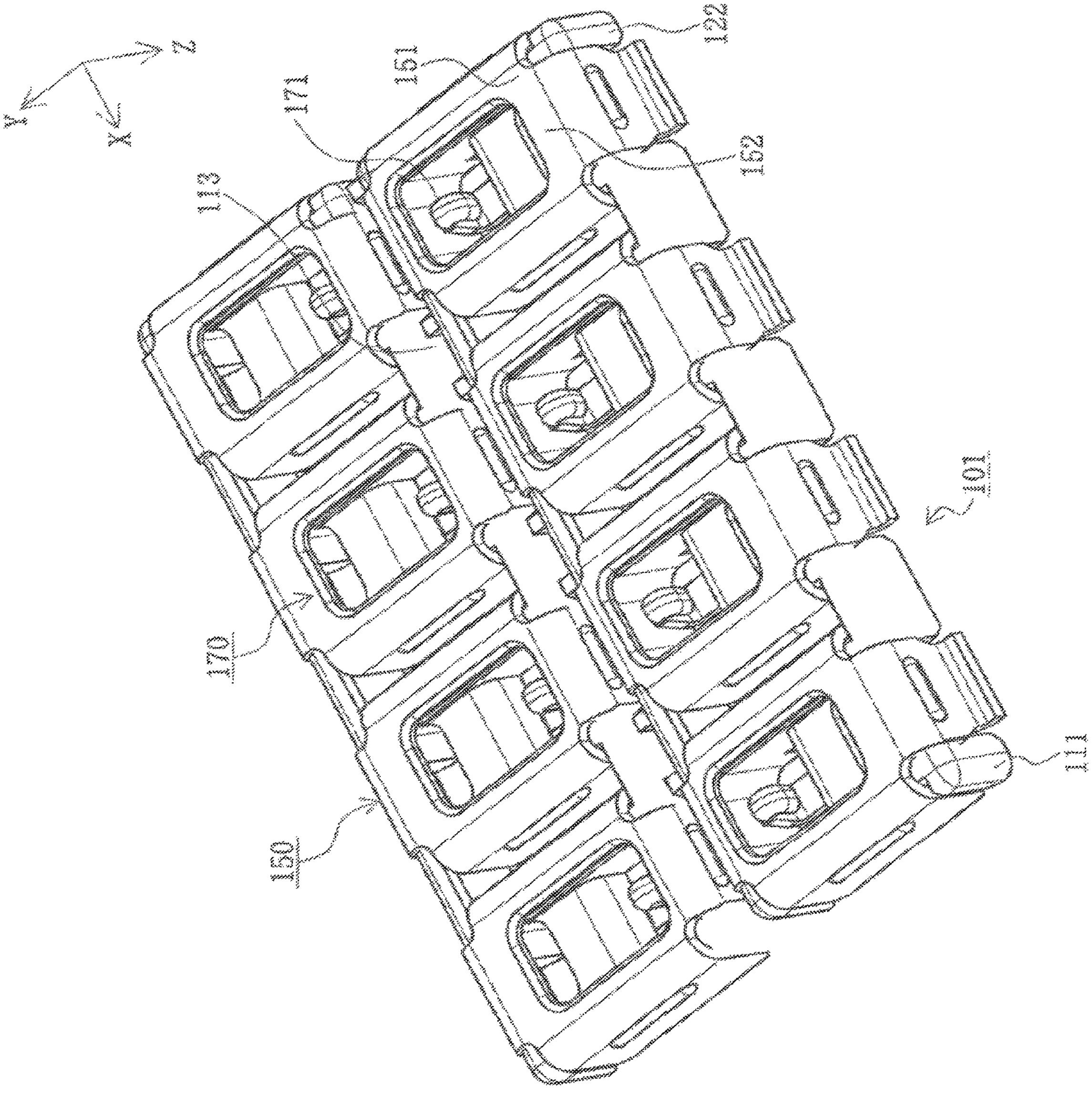
FIG. 18 is a perspective view of the second connector according to Embodiment 3.
Figure 19:
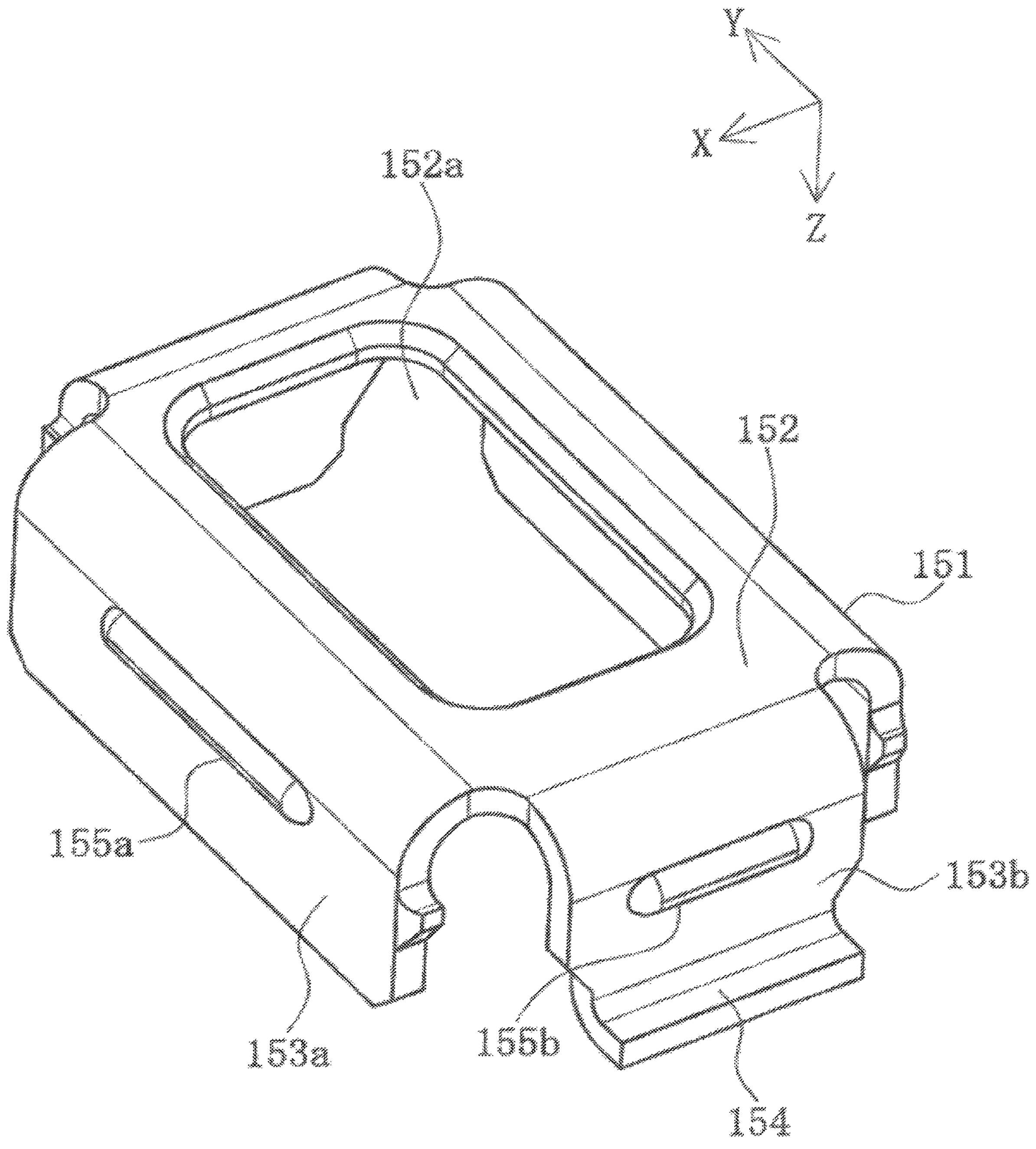
FIG. 19 is a perspective view of the second shield member according to Embodiment 3.

FIG. 16 is a perspective view of a first connector according to Embodiment 3. FIG. 17 is a perspective view illustrating the arrangement of a first intermediate shield member according to Embodiment 3. FIG. 18 is a perspective view of a second connector according to Embodiment 3. FIG. 19 is a perspective view of a second shield member according to Embodiment 3. Note that in FIG. 17, FIG. 17A is a perspective view illustrating the arrangement of the first intermediate shield member in the longitudinal direction, and FIG. 17B is a perspective view illustrating the arrangement of the first intermediate shield member in the width direction.

In this embodiment, as in Embodiment 2, a plurality of first high-frequency connection units 70 are disposed so as to be arranged in two rows in the longitudinal direction of the first housing 11, and the second high-frequency connection units 170 are also disposed so as to be arranged in two rows in the longitudinal direction of the second housing 111.

In addition, in this embodiment, the first recess 12 of the first housing 11 does not include the central partition 13 of Embodiment 2 described above, and is divided in two in the width direction of the first housing 11 by a longitudinal direction intermediate support part 23*c*2 serving as an intermediate support part formed on the bottom plate 23 and extending in the longitudinal direction of the first housing 11. Further, each portion resulting from dividing the first recess 12 in two is divided for each first high-frequency connection unit 70 in the longitudinal direction of the first housing 11 by a width direction intermediate support part 23*c*1 serving as an intermediate support part formed on the bottom plate 23 and extending in the width direction of the first housing 11. That is, in each row of the first high-frequency connection units 70, the width direction intermediate support part 23*c*1 is disposed between the first high-frequency terminal support parts 24 of mutually adjacent first high-frequency connection units 70. Further, a longitudinal direction intermediate support opening 23*b*2 and a width direction intermediate support opening 23*b*2 passing through the plate thickness direction of the bottom plate 23 are respectively formed in the longitudinal direction intermediate support part 23*c*2 and the width direction intermediate support part 23*c*1. Note that when the longitudinal direction intermediate support part 23*c*2 and the width direction intermediate support part 23*c*1 are described collectively along with the longitudinal direction intermediate support opening 23*b*2 and the width direction intermediate support opening 23*b*1, they are respectively described as the intermediate support part 23*c* and the intermediate support opening 23*b*.

In addition, a first longitudinal direction intermediate shield member 562 and a first width direction intermediate shield member 561, which serve as shield plates formed by processing such as punching or bending conductive metal plates and extending in the thickness direction and the width direction of the first housing 11, are housed and held in the longitudinal direction intermediate support part 23*c*2 and the width direction intermediate support part 23*c*1, respectively. The first longitudinal direction intermediate shield member 562 is a plate member which forms the first high-frequency shield 50 having a rectangular cylindrical shape with a substantially rectangular cross-section in cooperation with the firs shield member 51, and includes a base part 562*a* extending in the longitudinal direction of the first housing 11, a pair of engaging protrusions 562*b* extending upward from the upper end of the base part 562*a*, and a pair of tail parts 562*d* extending in the longitudinal direction of the first housing 11 from both ends of the base part 562*a*. In addition, the first width direction intermediate shield member 561 is a plate member which forms the first high-frequency shield 50 having a rectangular cylindrical shape with a substantially rectangular cross-section in cooperation with the first shield member 51, and includes a base part 561*a* extending in the width direction of the first housing 11, a pair of engaging protrusions 561*b* extending upward from the upper end of the base part 561*a*, and a pair of tail parts 561*d* extending in the width direction of the first housing 11 from both ends of the base part 561*a*. Further, the lower ends of the tail part 562*d* of the first longitudinal direction intermediate shield member 562 and the tail part 561*d* of the first width direction intermediate shield member 561 are connected by soldering or the like to connection pads coupled to a conductive trace of the first substrate. Note that the conductive trace is a ground line, which is a ground line disposed alongside the signal line that conveys a high frequency signal functioning to electrically shield the signal line. In addition, when the first longitudinal direction intermediate shield member 562 and the first width direction intermediate shield member 561 are described collectively, they are described as the first intermediate shield member 56.

Note that in comparison to the first connector 1 in Embodiments 1 and 2 described above, the first connector 1 in this embodiment has different dimensional ratios in each direction and different shapes of each of the parts, but it has substantially the same structure in the other aspects described above, so descriptions thereof will be omitted.

In this embodiment, in the second shield member 151 of the second connector 101, as in Embodiment 1 described above, the second intermediate wall shield part 153*a* attached to the second intermediate wall part 121 and the second side wall shield part 153*b* attached to the second side wall part 114 are connected integrally to the four side edges of the second cover part 152. Further, the second side wall tail part 154 is bent approximately 90 degrees to the lower end of the second side wall shield part 153*b* on the outside in the width direction of the second connector 101 and extends outward in the width direction of the second connector 101, and the second side wall tail part 154 and the lower end of the second side wall shield 153*b* on the inside in the width direction of the second connector 101 are connected by soldering or the like to connection pads coupled to the conductive trace of the second substrate. In addition, the bottom end of the second intermediate wall shield part 153*a* is also connected by soldering or the like to connection pad coupled to a conductive trace of the second substrate. In this manner, when the second shield member 151 is grounded near the second high-frequency terminal 171 so as to surround the second high-frequency terminal 171, the shield properties are enhanced, and even better SI characteristics can be achieved.

Note that in comparison to the second connector 101 in Embodiments 1 and 2 described above, the second connector 101 in this embodiment has different dimensional ratios in each direction and different shapes of each of the parts, however, the connector has substantially the same structure in the other aspects described above, so descriptions thereof will be omitted.

In addition, when the first connector 1 and the second connector 101 are mated, the engaging protrusion 562*b* of the first longitudinal direction intermediate shield member 562 is inserted between the second side wall shield parts 153 of mutually adjacent second cover parts 152 in the width direction of the second housing 111 so as to come into contact and become conductive with the second side wall shield parts 153*b*, and the engaging protrusion 561*b* of the first width direction intermediate shield member 561 are inserted between the second intermediate wall shield parts 153*a* of mutually adjacent second cover parts 152 in the longitudinal direction of the second housing 111 so as to come into contact and become conductive with the second intermediate wall shield parts 153*a*. Therefore, the first high-frequency terminals 71 and the second high-frequency terminals 171 connected to each other are in a state of redundancy based on an electromagnetic shield with the periphery thereof extending in the mating direction and having a rectangular cylindrical shape with a substantially rectangular cross section, and good SI characteristics can be obtained even when using the transmission line for transmitting high frequency signals.

Note that since the configurations, operations, and effects of the first connector 1 and the second connector 101 in this embodiment are in other respects the same as in Embodiments 1 and 2, descriptions thereof will be omitted.

Next, a fourth embodiment will be described. It should be noted that elements having the same structure as those of the first through third embodiments are denoted by the same reference numerals, and descriptions thereof are omitted. Furthermore, likewise, descriptions will be omitted for operations and effects that are the same as those of the aforementioned first through third embodiments.

Figure 20:
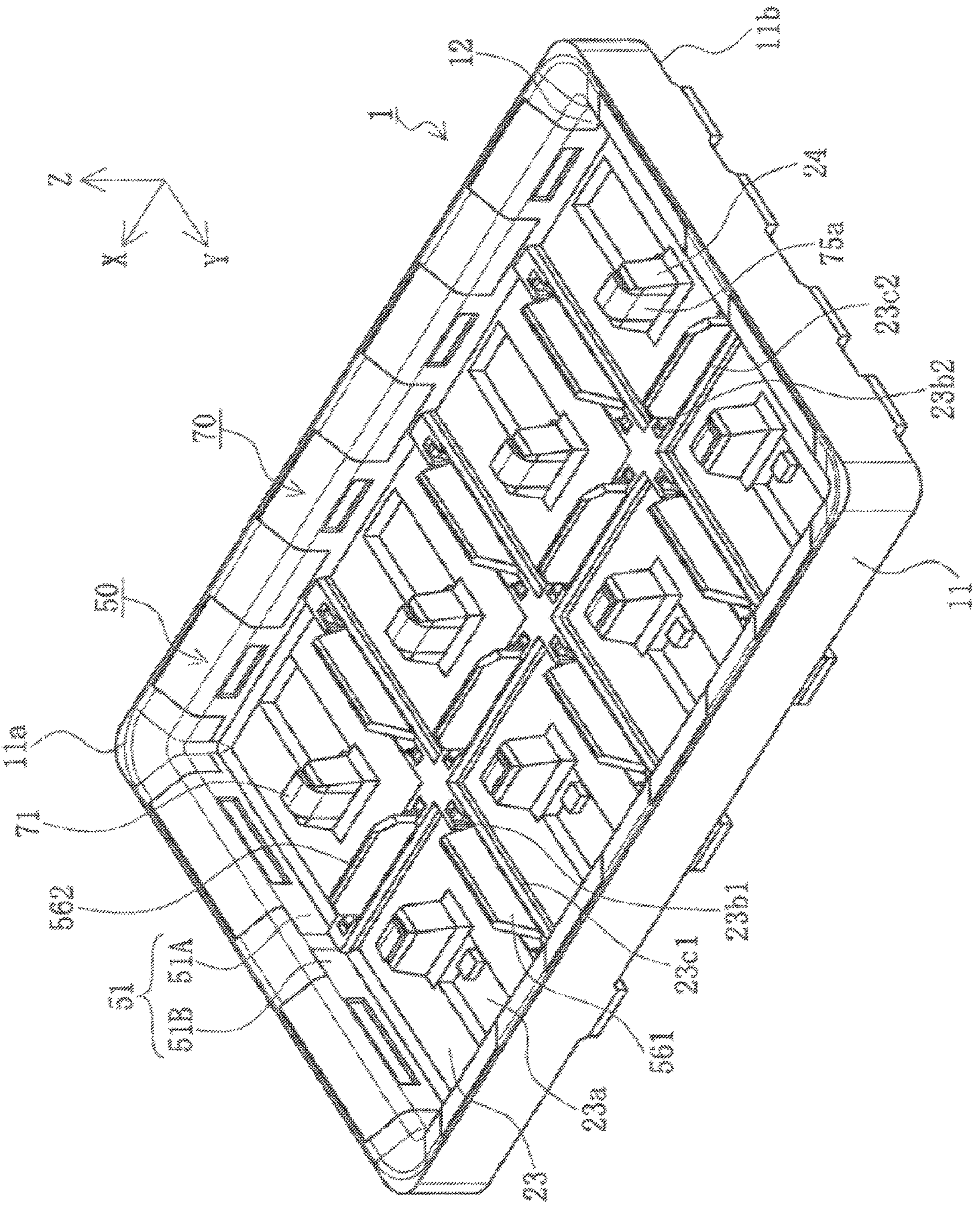
FIG. 20 is a perspective view of the first connector according to Embodiment 4.
Figure 21A:
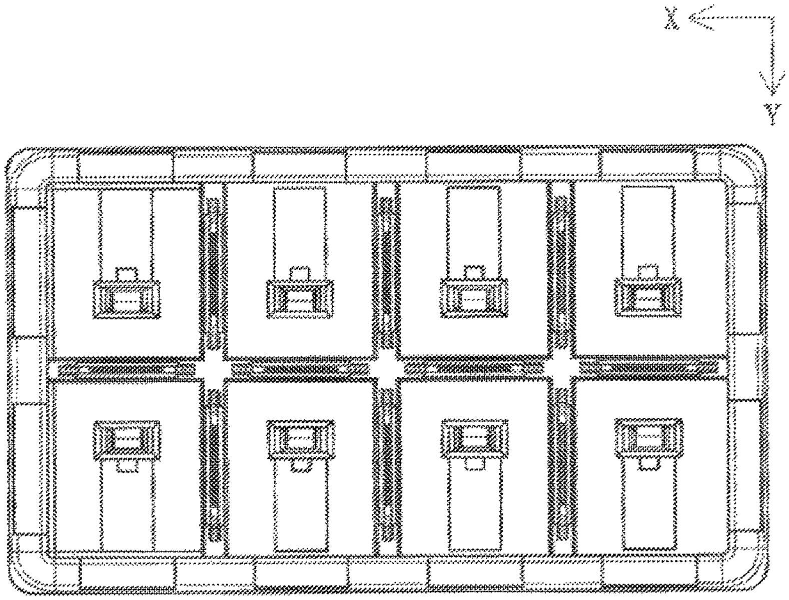
FIGS. 21A through 21D include four views of the first connector according to Embodiment 4, where
Figure 21D:
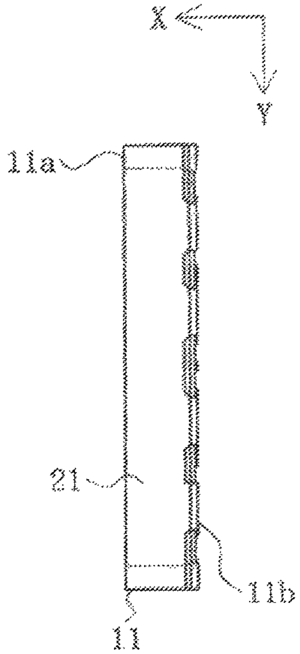
Figure 21B:
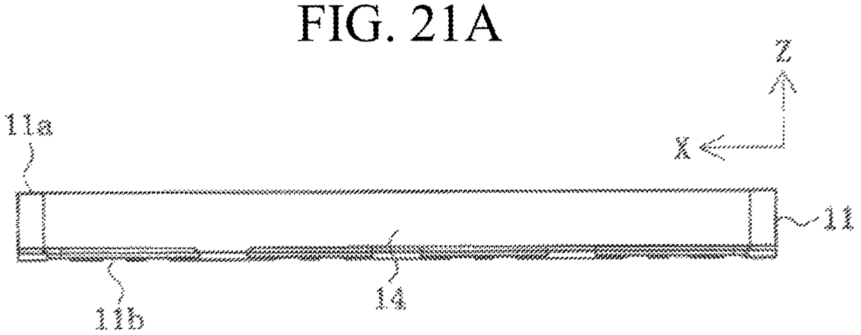
Figure 21C:
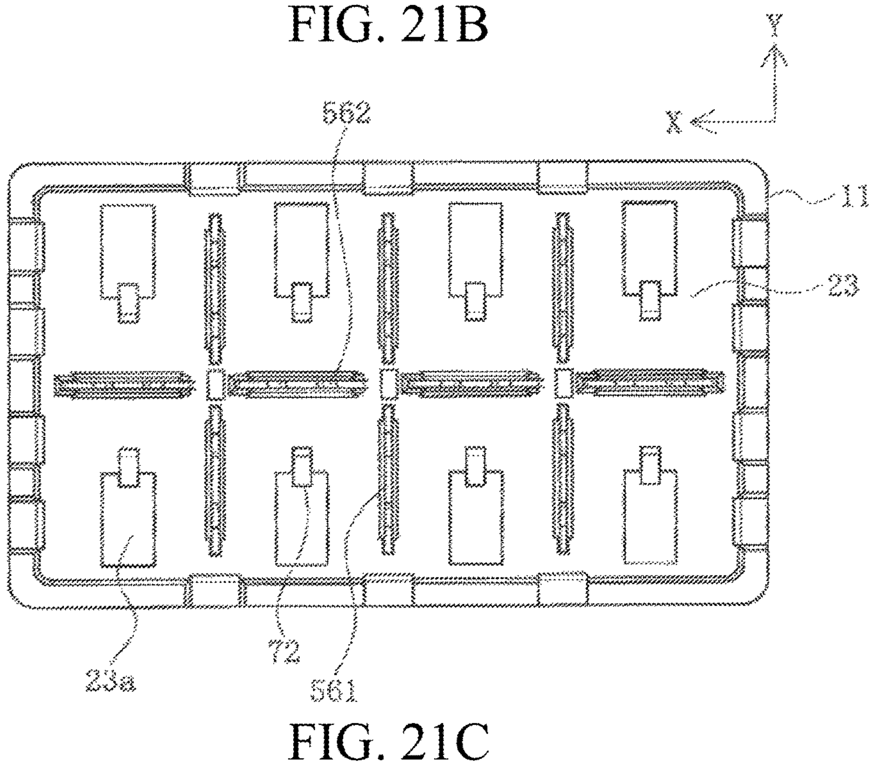
Figure 22A:
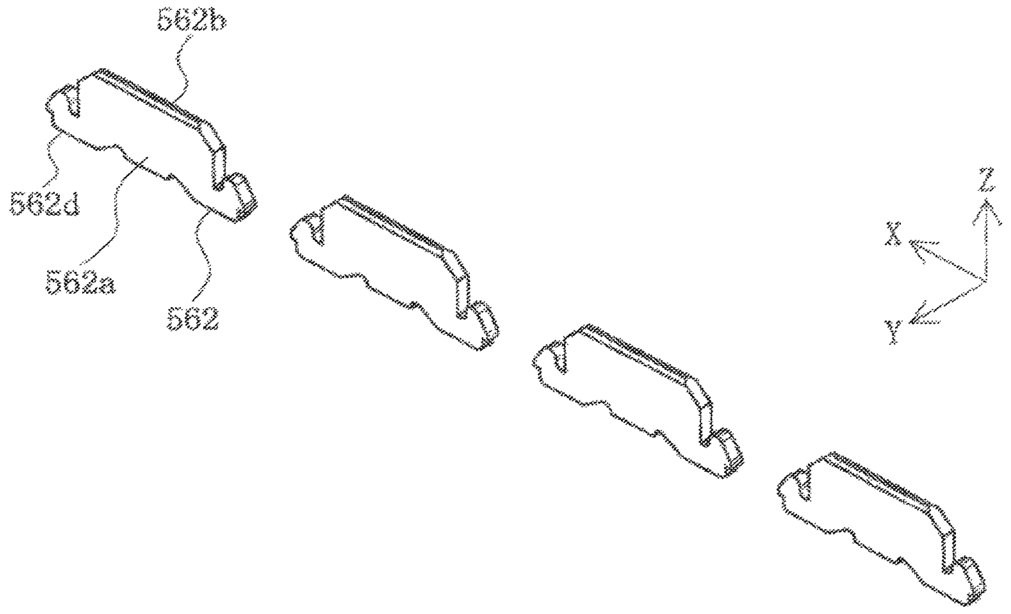
FIGS. 22A and 22B are perspective views illustrating an arrangement of a first intermediate shield member according to Embodiment 4, where
Figure 22B:
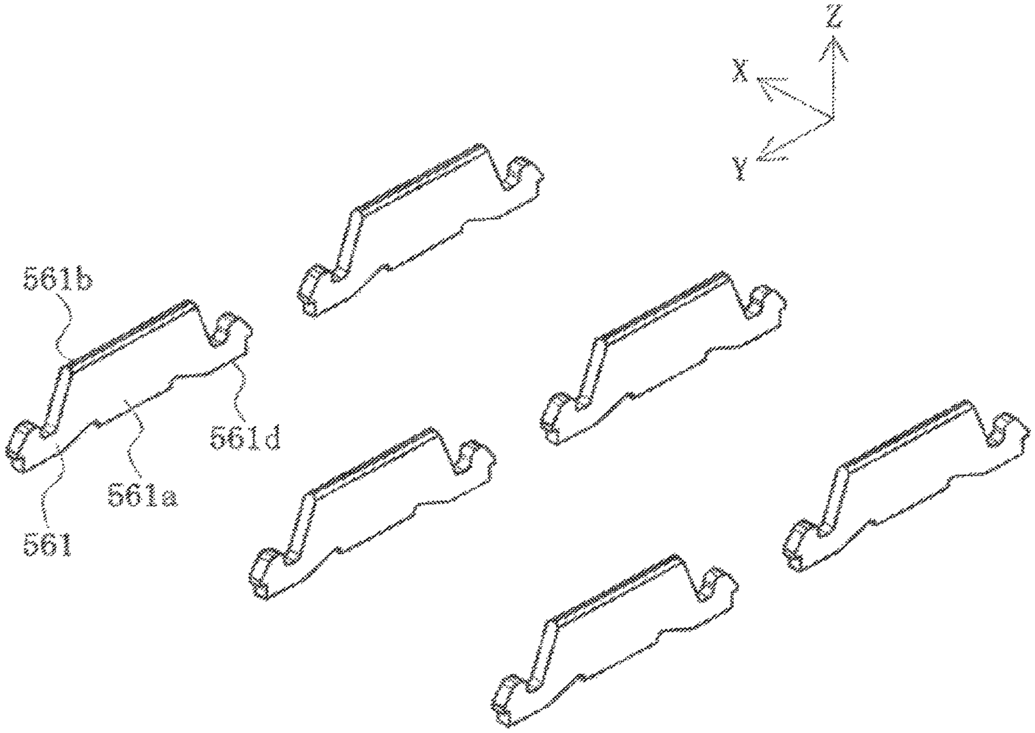
Figure 23:
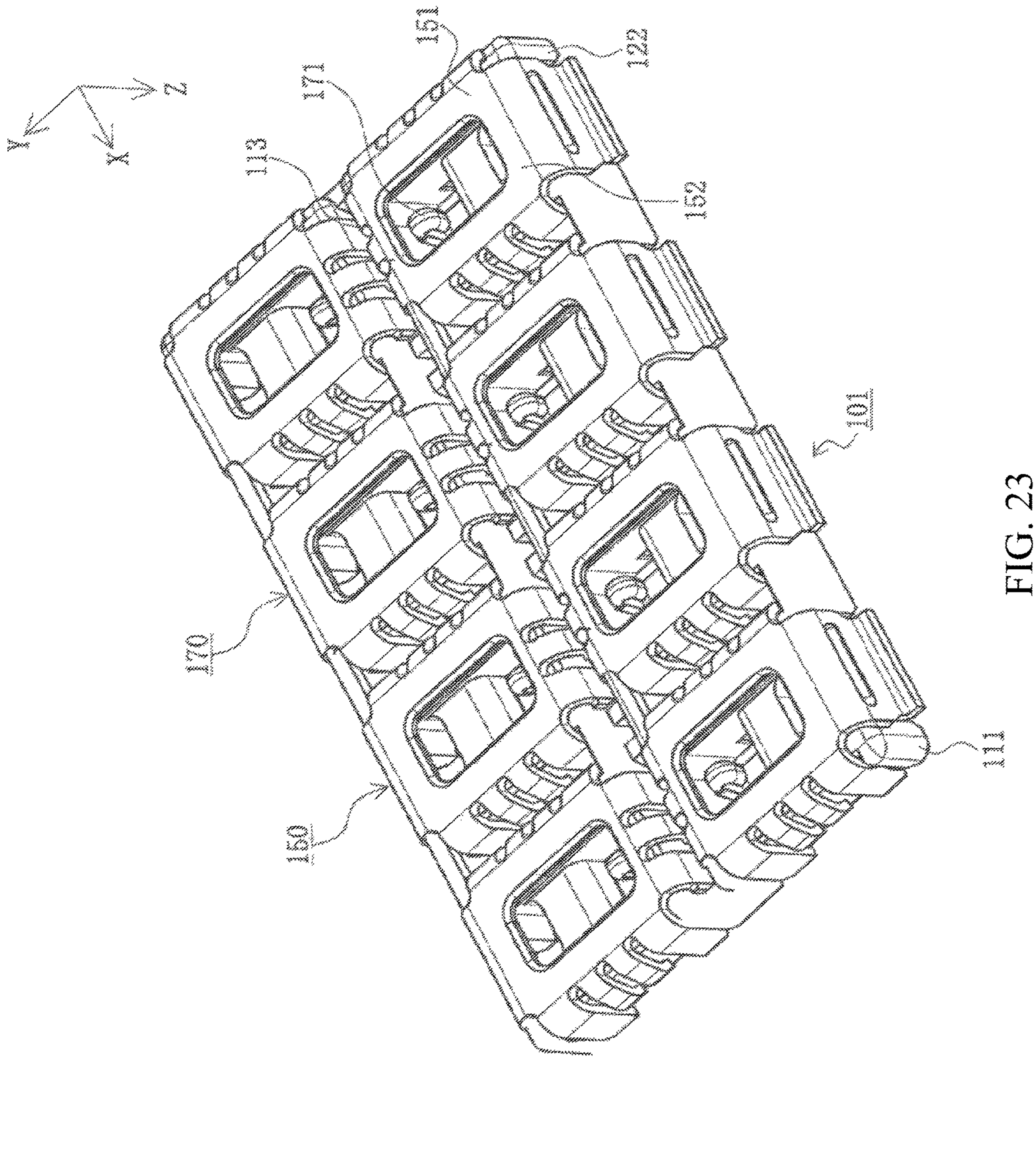
FIG. 23 is a perspective view of the second connector according to Embodiment 4.
Figure 24A:
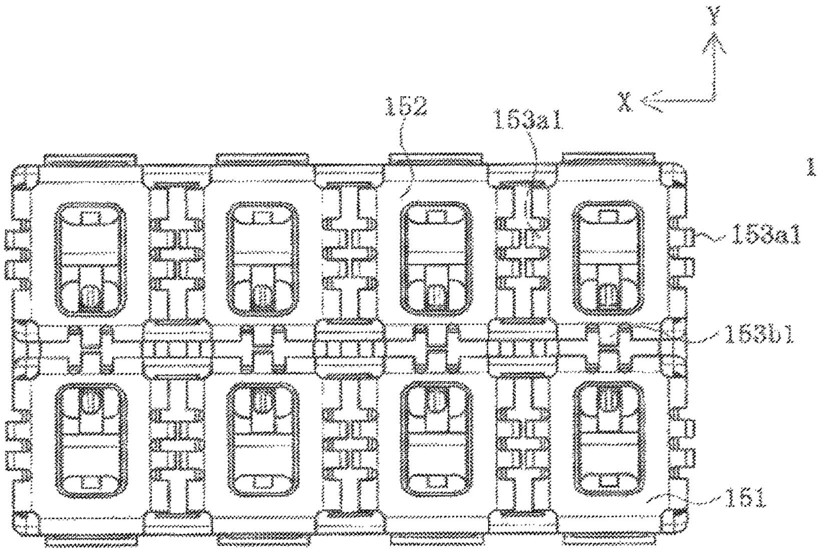
FIGS. 24A through 24D include four views of the second connector according to Embodiment 4, where
Figure 24D:
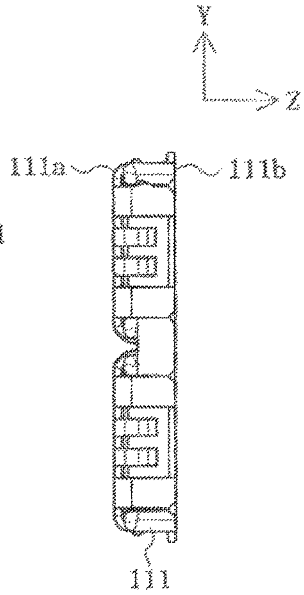
Figure 24B:
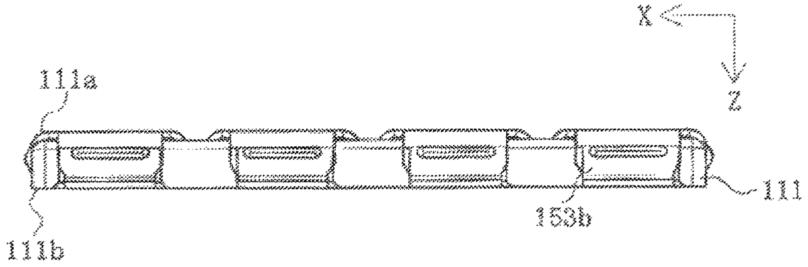
Figure 24C:
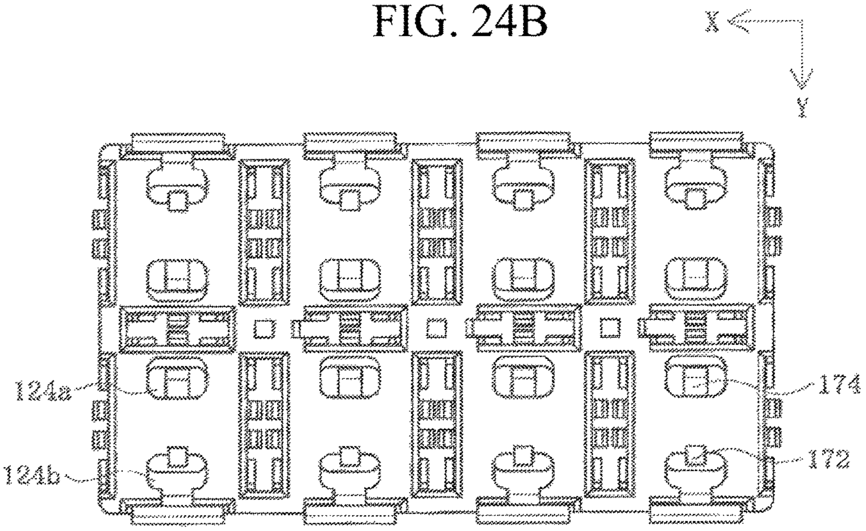
Figure 25:
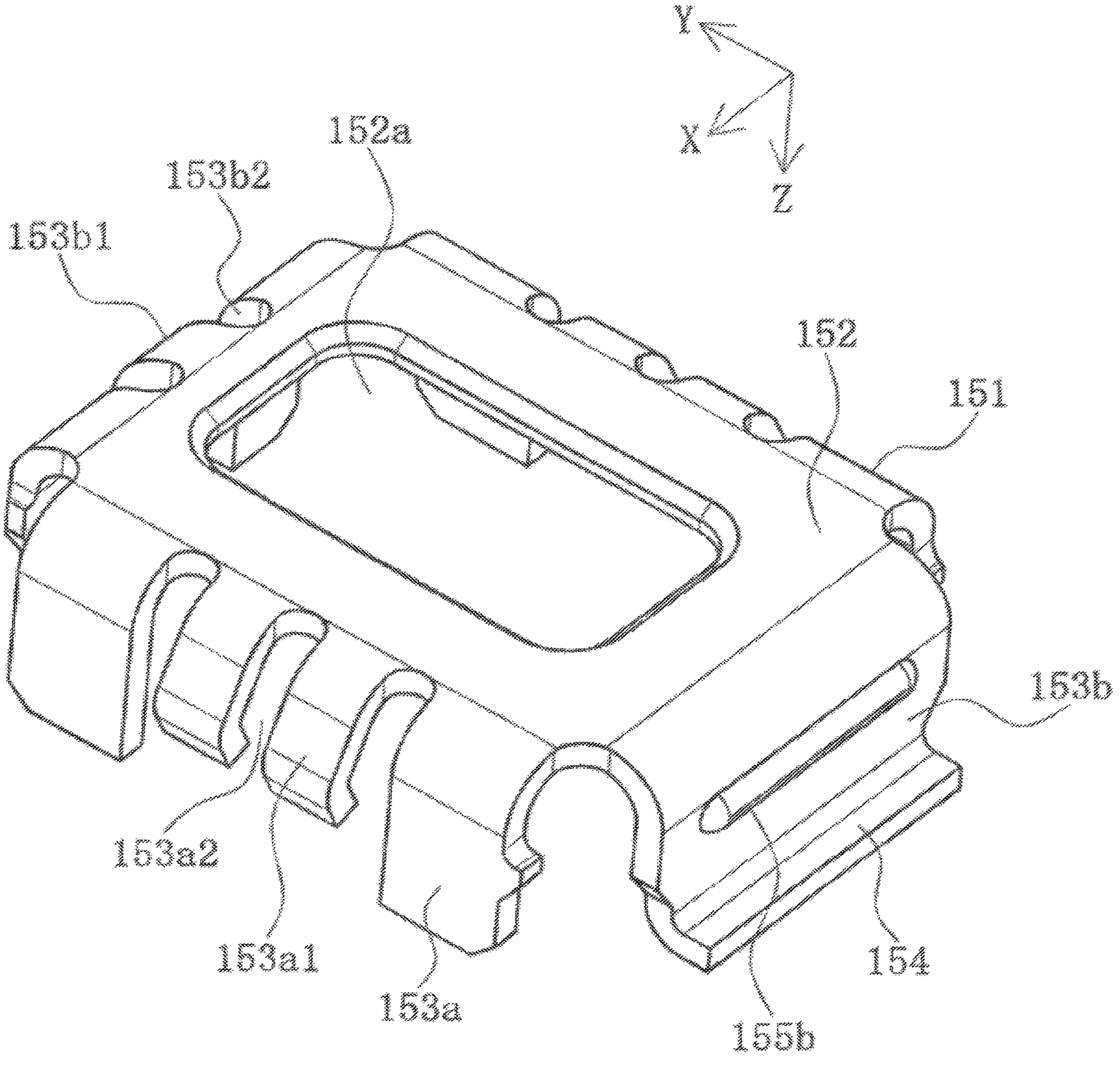
FIG. 25 is a perspective view of the second shield member according to Embodiment 4.

FIG. 20 is a perspective view of a first connector according to Embodiment 3. FIG. 21 includes four views of the first connector according to Embodiment 3. FIG. 22 is a perspective view illustrating the arrangement of a first intermediate shield member according to Embodiment 4. FIG. 23 is a perspective view of a second connector according to Embodiment 4. FIG. 24 includes four views of the second connector according to Embodiment 4. FIG. 25 is a perspective view of a second shield member according to Embodiment 4. Note that in FIG. 21, FIG. 21A is a top view, FIG. 21B is a side view, FIG. 21C is a bottom view, and FIG. 21D is a rear view. In FIG. 22, FIG. 22A is a perspective view illustrating the arrangement of a first longitudinal direction intermediate shield member, and FIG. 22B is a perspective view illustrating the arrangement of a first width direction intermediate shield member. In FIG. 24, FIG. 24A is a top view, FIG. 24B is a side view, FIG. 24C is a bottom view, and FIG. 24D is a rear view.

In this embodiment, as in Embodiments 2 and 3, a plurality of first high-frequency connection units 70 are disposed so as to be arranged in two rows in the longitudinal direction of the first housing 11, and the second high-frequency connection units 170 are also disposed so as to be arranged in two rows in the longitudinal direction of the second housing 111.

In addition, as in Embodiment 3, the first recess 12 of the first housing 11 does not include the central partition 13 of Embodiment 2 described above, and is divided in two in the width direction of the first housing 11 by a longitudinal direction intermediate support part 23*c*2 serving as an intermediate support part formed on the bottom plate 23 and extending in the longitudinal direction of the first housing 11. Each portion resulting from dividing the first recess 12 in two is divided for each first high-frequency connection unit 70 in the longitudinal direction of the first housing 11 by a width direction intermediate support part 23*c*1 serving as an intermediate support part formed on the bottom plate 23 and extending in the width direction of the first housing 11. A longitudinal direction intermediate support opening 23*b*2 and a width direction intermediate support opening 23*b*1 passing through the plate thickness direction of the bottom plate 23 are respectively formed in the longitudinal direction intermediate support part 23*c*2 and the width direction intermediate support part 23*c*1.

In addition, as in Embodiment 3 described above, a first longitudinal direction intermediate shield member 562 and a first width direction intermediate shield member 561, which serve as shield plates formed by processing such as punching or bending conductive metal plates and extending in the thickness direction and the width direction of the first housing 11, are housed and held in the longitudinal direction intermediate support part 23*c*2 and the width direction intermediate support part 23*c*1, respectively.

Further, as in Embodiment 3 described above, the first longitudinal direction intermediate shield member 562 includes a base part 562*b* extending in the longitudinal direction of the first housing 11, an engaging protrusion 562*b* projecting upward from the upper end of the base part 562*a*, and a pair of tail parts 562*d* extending in the longitudinal direction of the first housing 11 from both ends of the base part 562*a*, however, the engaging protrusion 562*b* in this embodiment is a single unit rather than a pair. In addition, as in Embodiment 3 described above, the first width direction intermediate shield member 561 also includes a base part 561*a* extending in the width direction of the first housing 11, an engaging protrusion 561*b* projecting upward from the upper end of the base part 561*a*, and a pair of tail parts 561*d* extending in the width direction from the first housing 11 from both ends of the base part 561*a*, however, the engaging protrusion 561*b* in this embodiment is a single unit rather than a pair.

Note that in comparison to the first connector 1 in Embodiments 1 to 3 described above, the first connector 1 in this embodiment has different dimensional ratios in each direction and different shapes of each of the parts, however, the connector has substantially the same structure in the other aspects described above, so descriptions thereof will be omitted.

In this embodiment, in the second shield member 151 of the second connector 101, as in Embodiments 1 and 3 described above, the second intermediate wall shield part 153*a* attached to the second intermediate wall part 121 and the second side wall shield part 153*b* attached to the second side wall part 114 are connected integrally to the four side edges of the second cover part 152.

However, in this embodiment, the second intermediate wall shield protrusion 155*a* is not formed on the second intermediate wall shield part 153*a*, and a second intermediate wall contact arm 153*a*1 having a cantilevered shape is formed. The second intermediate wall contact arm 153*a*1 is an elongated elastic piece extending downward from a side edge of the second cover part 152 and is a member in which the vicinity of the free end (tip) can be elastically displaced in the X-direction, and both sides thereof are defined by a slit-shaped second intermediate wall notch 153*a*2. Note that in the example illustrated in the drawings, two second intermediate wall contact arms 153*a*1 are formed on each of the second intermediate wall shield parts 153*a*, however, the number may also be one or three or more. Note that when used for the transmission of high-frequency signals, it is most preferable for the second side wall shield protrusion 155*b* to come into contact with the first side wall shield recess 55*b* and for the second intermediate wall contact arm 153*a*1 to come into contact with the first end wall shield recess 55*a* and the first intermediate shield recess 56*c*, however, it is not absolutely necessary for the second side wall shield protrusion 155*b* and the first side wall shield recess 55*b* to come into contact.

In addition, in this embodiment, of the pair of second side wall shield parts 153*b*, the second side wall shield protrusion 155*b* is not formed on the second side wall shield part 153*b* attached to the second side wall part 114 on the central partition recess 113 side, and a second side wall contact arm 153*b*1 having a cantilevered shape is formed. The second side wall contact arm 153*b*1 is a member similar to the second intermediate wall contact arm 153*a*1, and both sides thereof are defined by a slit-shaped second side wall notch 153*b*2. Note that in the example illustrated in the drawings, one second side wall contact arm 153*b*1 is formed on each of the second side wall shield parts 153*b*, however, the number may also be two or more. In addition, of the pair of second side wall shield parts 153*b*, the second side wall shield part 153*b* attached to the second side wall part 114 on the opposite side of the central partition recess 113 is the same as the second side wall shield part 153*b* in Embodiment 3.

Note that in comparison to the second connector 101 in Embodiments 1 to 3 described above, the second connector 101 in this embodiment has different dimensional ratios in each direction and different shapes of each of the parts, however, the connector has substantially the same structure in the other aspects described above, so descriptions thereof will be omitted.

In addition, when the first connector 1 and the second connector 101 are mated, the engaging protrusion 562*b* of the first longitudinal direction intermediate shield member 562 is inserted between the second side wall shield parts 153 of mutually adjacent second cover parts 152 in the width direction of the second housing 111 so as to come into contact and become conductive with the second side wall shield parts 153*b*, and the engaging protrusion 561*b* of the first width direction intermediate shield member 561 are inserted between the second intermediate wall shield parts 153*a* of mutually adjacent second cover parts 152 in the longitudinal direction of the second housing 111 so as to come into contact and become conductive with the second intermediate wall shield parts 153*a*. The second side wall contact arm 153*b*1 elastically abuts both sides of the engaging protrusion 562*b* of the first longitudinal direction intermediate shield member 562, and the second intermediate wall contact arm 153*a*1 elastically abuts both sides of the engaging protrusion 561*b* of the first width direction intermediate shield member 561, and the conduction between the first longitudinal direction intermediate shield member 562 and the first width direction intermediate shield member 562 and the second cover part 152 is reliably maintained thereby. Therefore, the first high-frequency terminals 71 and the second high-frequency terminals 171 connected to each other are in a state of redundancy based on an electromagnetic shield with the periphery thereof extending in the mating direction and having a rectangular cylindrical shape with a substantially rectangular cross section, and good SI characteristics can be obtained even when using the transmission line for transmitting high frequency signals.

Note that since the configurations, operations, and effects of the first connector 1 and the second connector 101 in this embodiment are in other respects the same as in Embodiments 1 to 3, descriptions thereof will be omitted.

Next, a fifth embodiment will be described. Note that elements having the same structure as those of Embodiments 1 to 4 are denoted by the same reference symbols, and descriptions thereof will be omitted. In addition, descriptions will also be omitted for operations and effects that are the same as those of Embodiments 1 to 4 described above.

Figure 26:
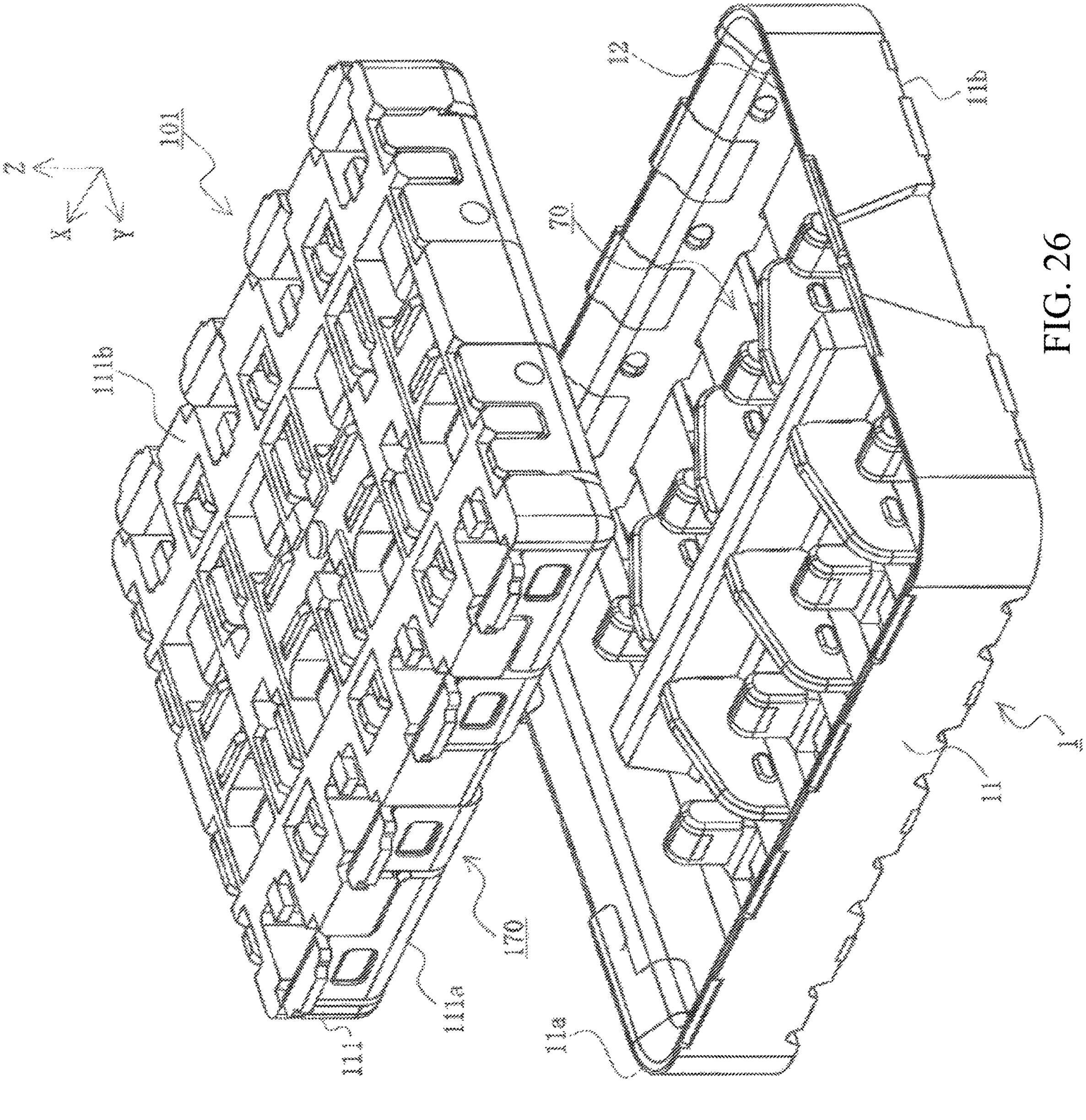
FIG. 26 is a perspective view of the first connector and the second connector according to Embodiment 5 prior to mating.
Figure 27:
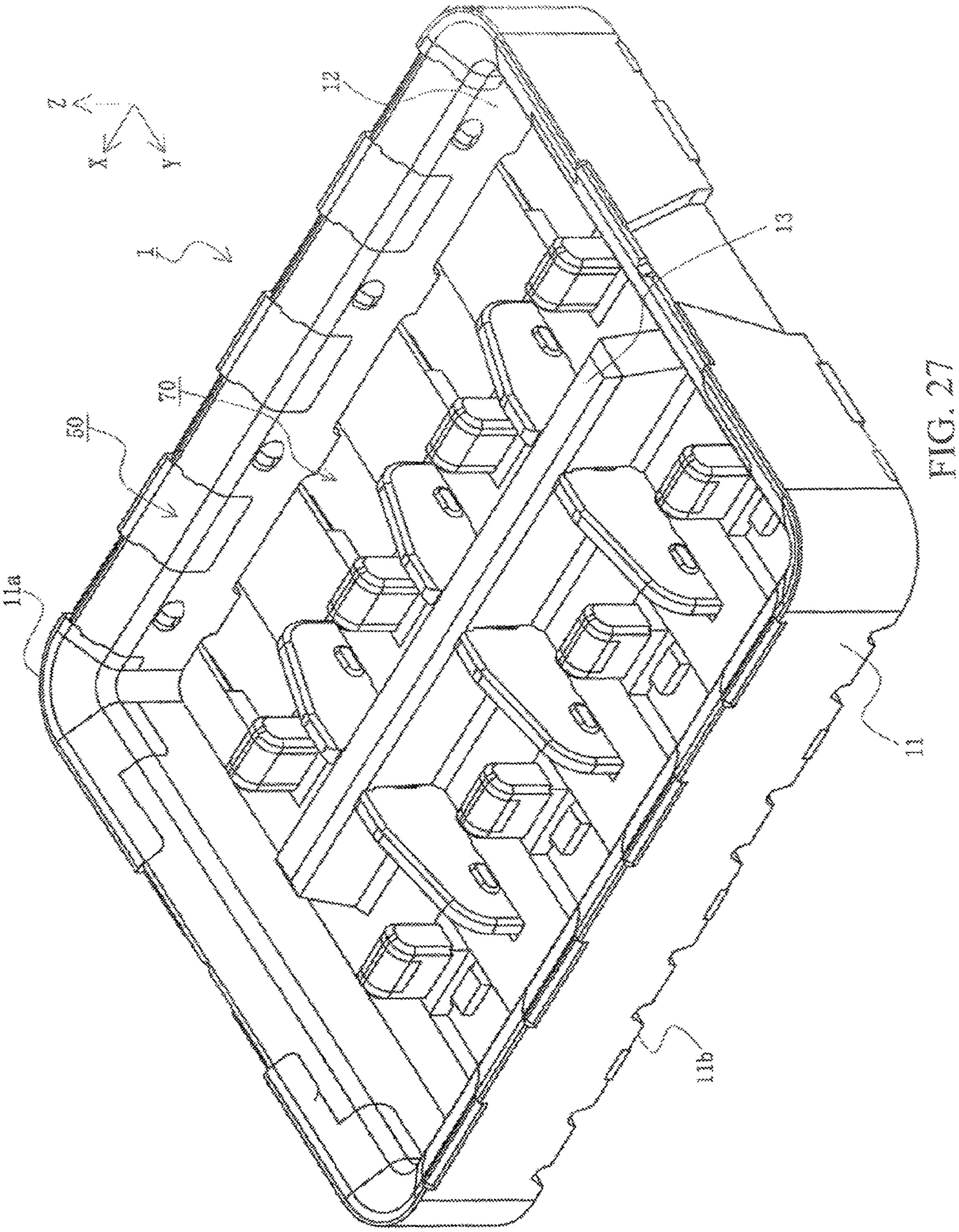
FIG. 27 is a perspective view of the first connector according to Embodiment 5.
Figure 28:
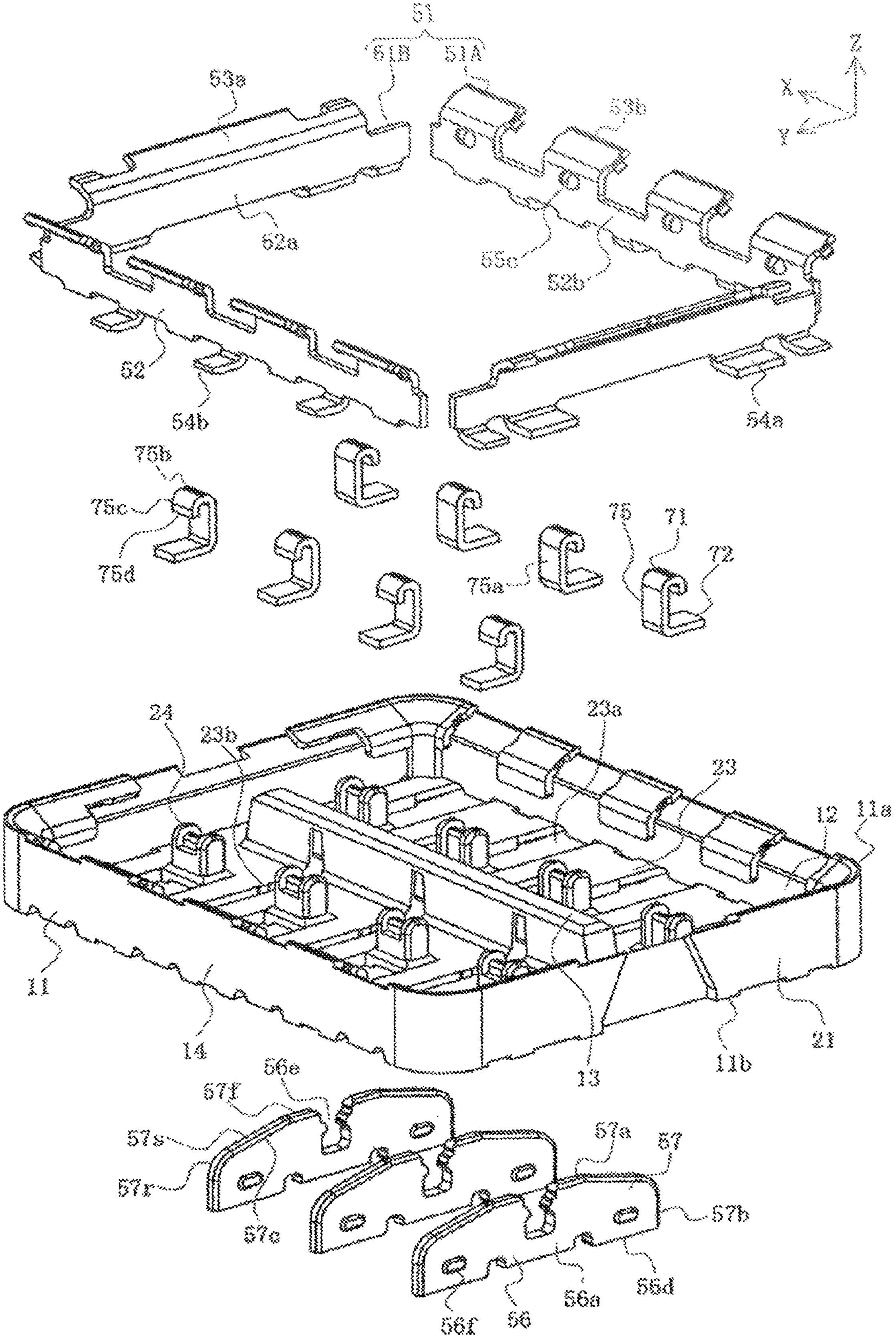
FIG. 28 is an exploded view of the first connector according to Embodiment 5.
Figure 29A:
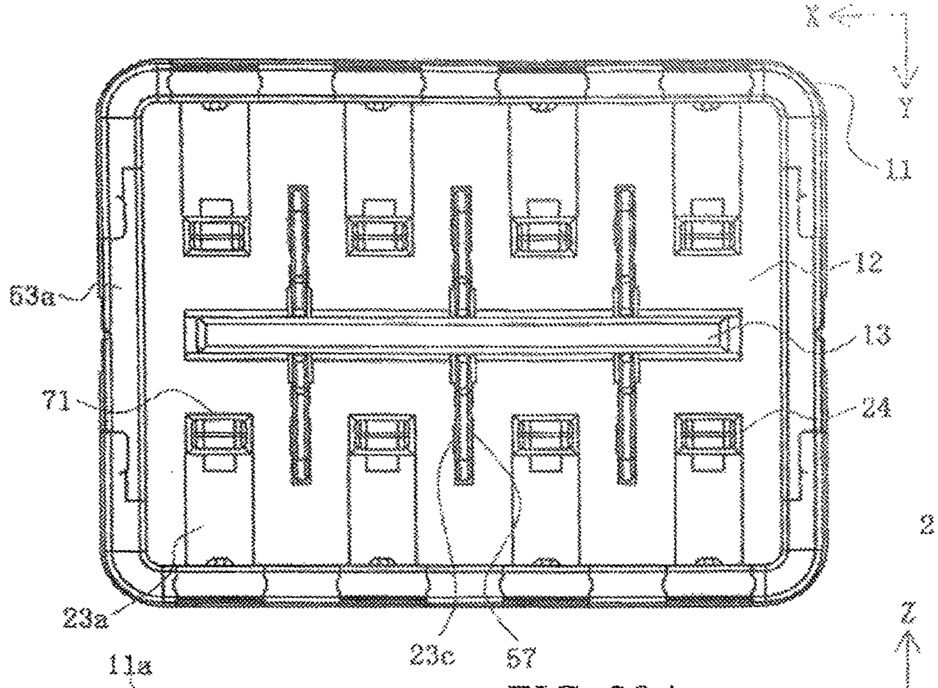
FIGS. 29A through 29D include four views of the first connector according to Embodiment 5, where
Figure 29D:
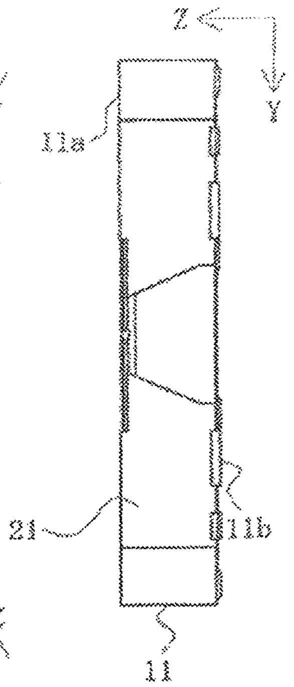
Figure 29B:
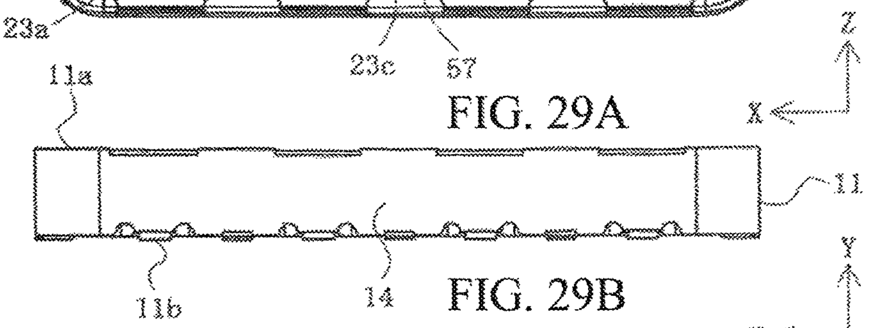
Figure 29C:
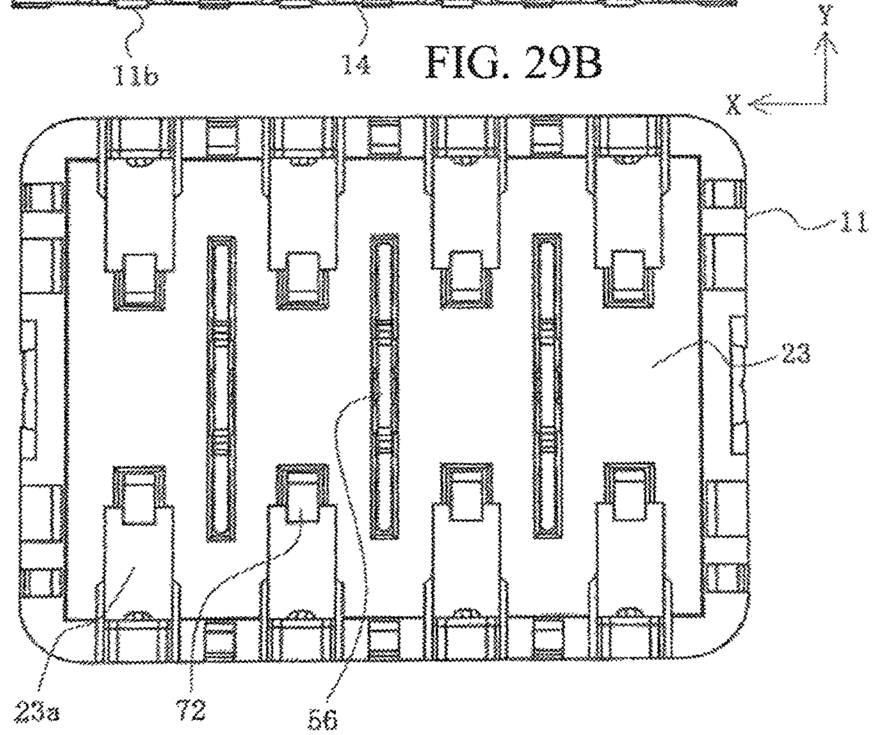

FIG. 26 is a perspective view of a first connector and a second connector according to Embodiment 5 prior to mating. FIG. 27 is a perspective view of the first connector according to Embodiment 5. FIG. 28 is an exploded view of the first connector according to Embodiment 5. FIG. 29 includes four views of the first connector according to Embodiment 5. Note that in FIG. 29, FIG. 29A is a top view, FIG. 29B is a side view, FIG. 29C is a bottom view, and FIG. 29D is a rear view.

In this embodiment, as in Embodiments 2 to 4, a plurality of first high-frequency connection units 70 are disposed so as to be arranged in two rows in the longitudinal direction of the first housing 11, and the second high-frequency connection units 170 are also disposed so as to be arranged in two rows in the longitudinal direction of the second housing 111. Note that a first shield right member 51A and a first shield left member 51B are not symmetrical with respect to the X-Z plane passing through the center in the width direction of the first recess 12, and each includes a first end wall shield part 52*a* and a first side wall shield part 52*b* and has a shape that is symmetrical with respect to a center point of the first recess 12 in the X-Y plane. In addition, a first side wall protrusion 55*c* serving as an engaging protrusion is formed so as to project from the inner surface of the first side wall shield part 52*b*.

In addition, as in Embodiment 2 described above, the first recess 12 of the first housing 11 is divided in two in the width direction of the first housing 11 by a central partition 13 extending in the longitudinal direction of the first housing 11. In addition, a plurality of first high-frequency terminal support parts 24 serving as first terminal support parts are disposed so as to be aligned in one row each in the longitudinal direction of the first housing 11 in the first recess 12 on both sides of the central partition 13. Each bottom plate opening 23*a* is disposed adjacent to the corresponding first high-frequency terminal support part 24 on the opposite side of the central partition 13.

Note that in this embodiment, the first recess 12 of the first housing 11 does not include the intermediate support part 23*c*. In addition, the intermediate support opening 23*b* in this embodiment is larger than the intermediate support opening 23*b* in Embodiment 2 and is formed to extend continuously in the width direction of the first housing 11 so as to traverse the central partition 13 and connect the first recesses 12 on both sides of the central partition 13. As a result, both ends of each intermediate support opening 23*b* are closer to the first side wall part 14 than the first high-frequency terminal support part 24. That is, when viewed from the longitudinal direction (X-axis direction) of the first housing 11, the first high-frequency terminal support parts 24 on both sides of the central partition 13 are positioned within a range from one end to the other end of the intermediate support opening 23*b* extending in the width direction of the first housing 11.

In addition, in this embodiment, the first intermediate shield member 56 is a conductive metal plate configured to be present across the first recesses 12 on both sides of the central partition 13, and includes a base part 56*a* extending in the width direction of the first housing 11, a pair of wall plate parts 57 projecting upward from the upper end of the base part 56*a*, a first intermediate shield protrusion 56*f* serving as a locking protrusion for the first housing 11 formed on the side surface of the wall plate part 57, and a tail part 56*d* on the lower end of the wall plate part 57. The first intermediate shield member 56 is inserted into the intermediate support opening 23*b* from the mounting surface 11*b* side, and each of the pair of wall plate parts 57 projects upward from the upper surface of the bottom plate 23 of the central partition 13 through the intermediate support opening 23*b* on both sides of the central partition 13. In addition, an engaging recess 56*e* formed between the wall plate parts 57 on both sides engages with the central partition 13 such that the first intermediate shield member 56 is reliably held in the first housing 11. Further, in comparison to the first connector 1 in Embodiment 2, it is unnecessary to provide space for housing the pair of tail parts 56*d* in each of the first recesses 12 on both sides of the central partition 13, and therefore, the dimensions in the width direction of the first housing 11 can be made smaller.

Each wall plate part 57 includes an upper edge 57*a* extending from the engaging recess 56*e* toward the distal end, and a side edge 57*b* which extends in the vertical direction (Z-axis direction) and is connected to the upper edge 57*a*. The upper edge 57*a* includes a horizontal part 57*f* which is adjacent to the engaging recess 56*e* and extends substantially parallel to the X-Y plane, an inclined part 57*s* which is connected to the horizontal part 57*f* and extends diagonally downward toward the distal end of the wall plate part 57, and a curved part 57*r* which couples the inclined part 57*s* and the side edge 57*b*. In addition, a chamfered part 57*c* is formed on both ends in the plate thickness direction (X-axis direction) of the upper edge 57*a* and the side edge 57*b*. The chamfered part 57*c* may be an inclined surface or a curved surface.

Each wall plate part 57 extends from the side surface of the central partition 13 to a position beyond the first high-frequency terminal 71 in the width direction of the first housing 11 in a state in which the first intermediate shield member 56 is attached to the first housing 11. The upper edge 57*a* extends from a position on both side surfaces of the central partition 13 toward the outside in the width direction of the first housing 11, and the upper surface of the horizontal part 57*f* is substantially flush with the upper surface of the central partition 13. That is, the height of the upper end of the upper edge 57*a* is substantially the same as the height of the upper end of the central partition 13. In addition, the side edge 57*b* is positioned at both ends of the intermediate support opening 23*b* extending in the width direction of the first housing 11, and therefore is closer to the first side wall part 14 than the first high-frequency terminal support part 24. Further, when viewed from the longitudinal direction (X-axis direction) of the first housing 11, the height of the upper part of the first high-frequency terminal support part 24 and the height of the upper part of the first high-frequency terminal 71 attached to the first high-frequency terminal support part 71 are equal to or less than the height of the upper part of the inclined part 57*s*.

Note that in comparison to the first connector 1 in Embodiment 2 described above, the first connector 1 in this embodiment has different dimensional ratios in each direction and different shapes of each of the parts, however, since the connector has substantially the same structure in the other aspects described above, descriptions thereof will be omitted.

Next, the configuration of the second connector 101 will be described.

Figure 30:
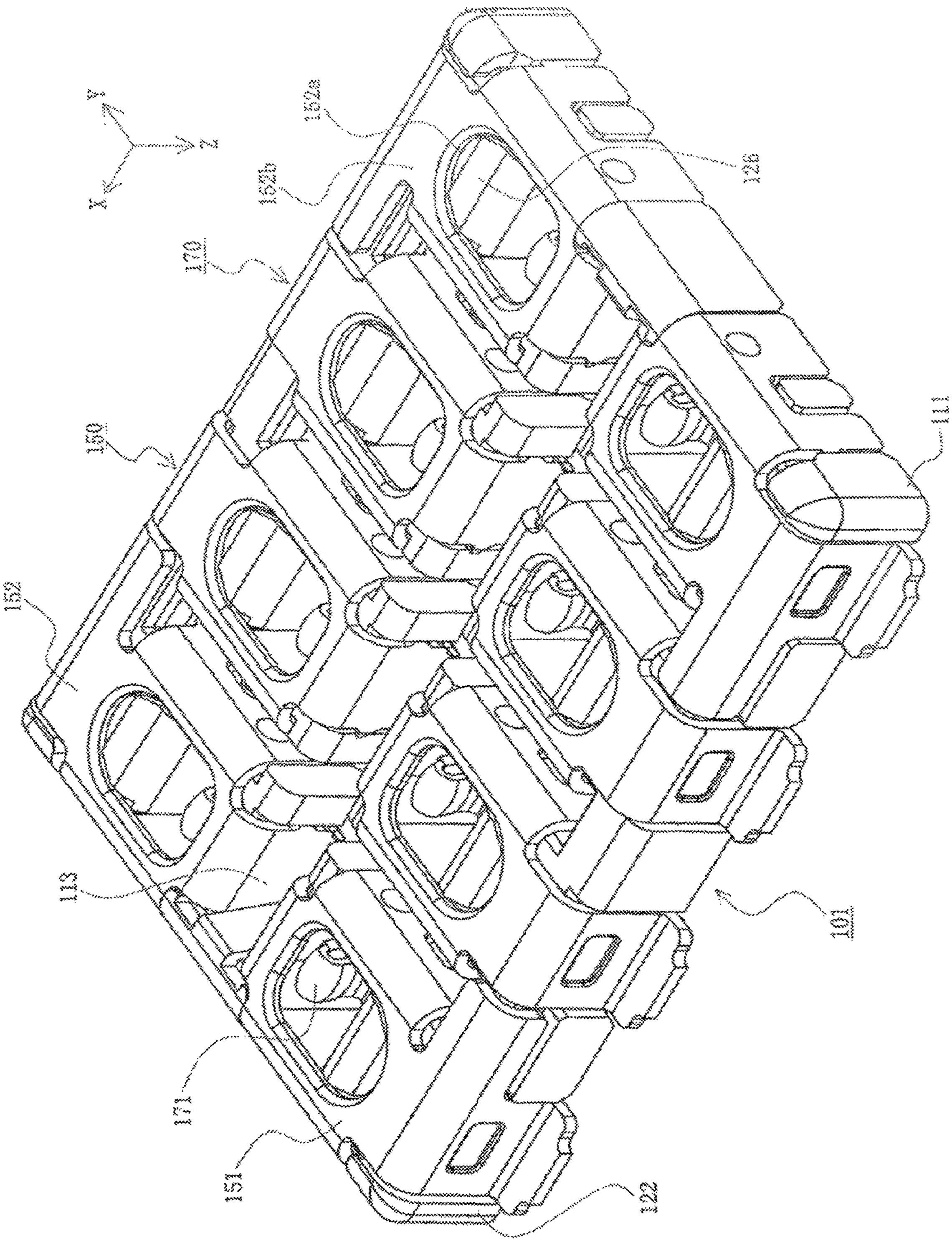
FIG. 30 is a perspective view of the second connector according to Embodiment 5.

FIG. 30 is a perspective view of a second connector according to Embodiment 5.

In this embodiment, the second shield member 151 of the second connector 101 includes a second normal shield member 151A and a second armor shield member 151B.

The second normal shield member 151A is a member that is substantially the same as the second shield member 151 in Embodiment 3, and differs from the second shield member 151 in Embodiment 3 only in that a second side wall shield recess 155*c* serving as an engaging recess is recessed in the outer surface of the second side wall shield part 153*b* instead of the second side wall shield protrusion 155*b*.

The second armor shield member 151B differs from the second normal shield member 151A in that it has an extension 152*c* extending toward the adjacent second normal shield member 151A. The extension 152*c* is a portion in which the canopy part 152*b* of the second cover part 152 and the second side wall shield part 153*b* of the side surface shield part 153 are extended to a position near the adjacent second normal shield member 151A together with a coupling portion between the canopy part 152*b* and the second side wall shield part 153*b*. As a result, in a state in which the second shield member 151 is attached to the second housing 111, from among the corner portions on the matting surface 111*a* side of the second side wall part 114 on both sides in the width direction of the second housing 111, at least a location between the second armor shield member 151B and the second normal shield member 151A is covered and protected by the extension 152*c* made of a metal plate.

Note that the configuration of other aspects of the second armor shield member 151B is the same as the second normal shield member 151A, and when the second armor shield member 151B and the second normal shield member 151A are described collectively, they will be described as the second shield member 151.

Further, in this embodiment, in comparison to the second housing 111 in Embodiment 2, the second housing 111 has different dimensional ratios in each direction and different shapes of each of the parts, however, the connector has substantially the same shape, and differs in that the upper surface of the second high-frequency terminal support part 126 is substantially flush with the mating surface 111*a*. As a result, in a state in which the second shield member 151 is attached to the second housing 111, the upper surface of the second high-frequency terminal support part 126 can be made substantially flush with the upper surface of the canopy part 152*b* of the second cover part 152.

Note that in comparison to the second connector 101 in Embodiments 2 and 3 described above, the second connector 101 in this embodiment has different dimensional ratios in each direction and different shapes of each of the parts, however, since the connector has substantially the same structure in the other aspects described above, descriptions thereof will be omitted.

The operation for mating the first connector 1 and the second connector 101 having the abovementioned configuration will be described next.

Figure 31A:
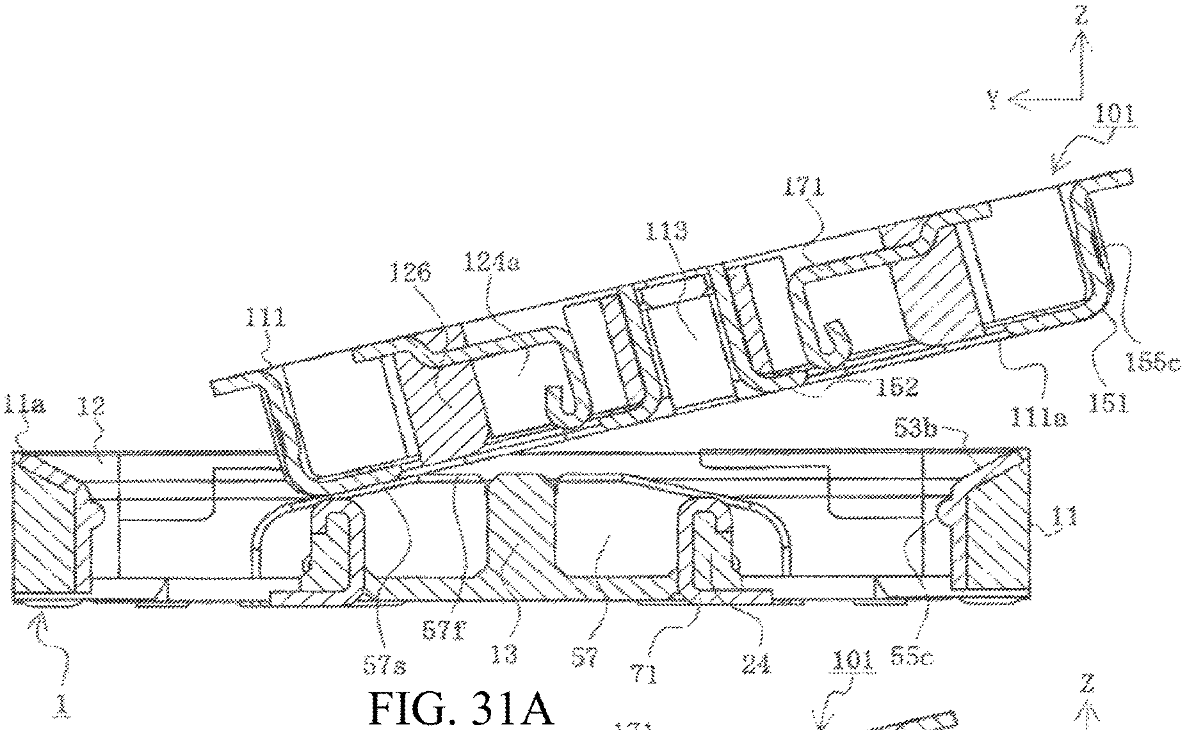
Figure 31B:
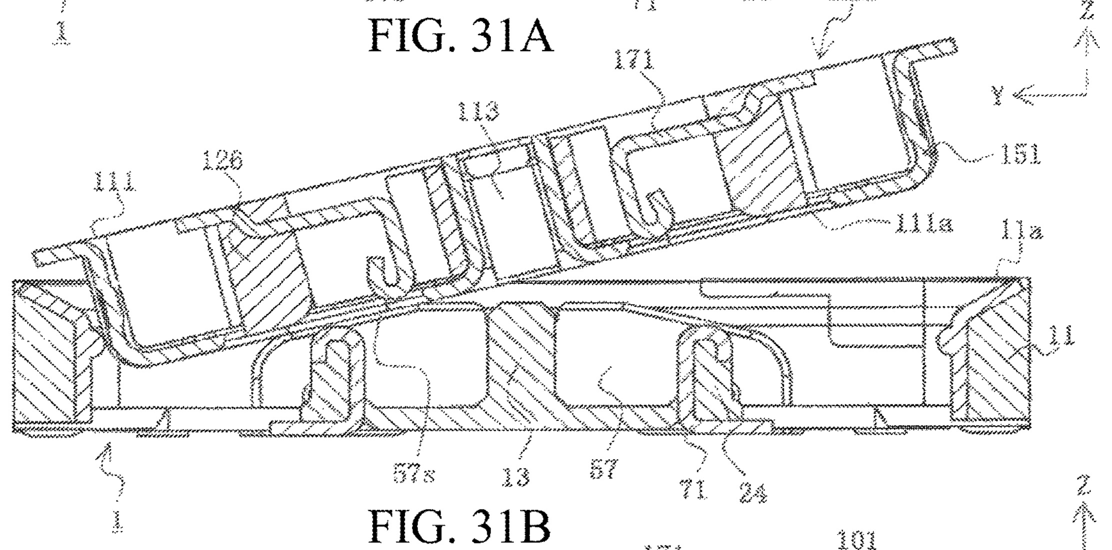
Figure 31C:
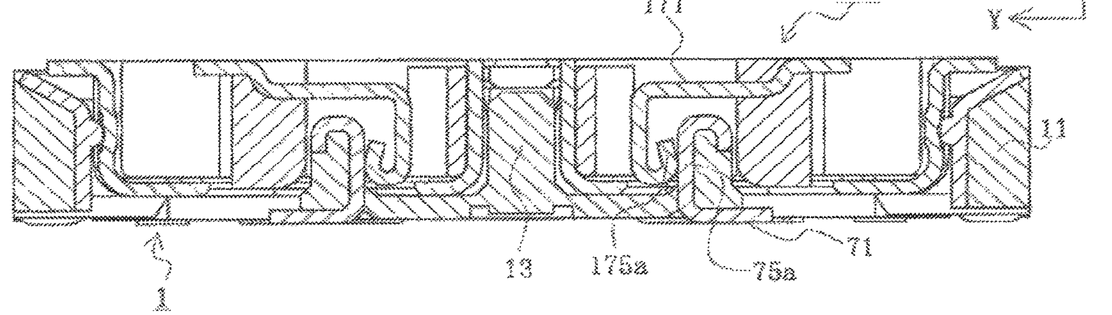
Figure 32A:
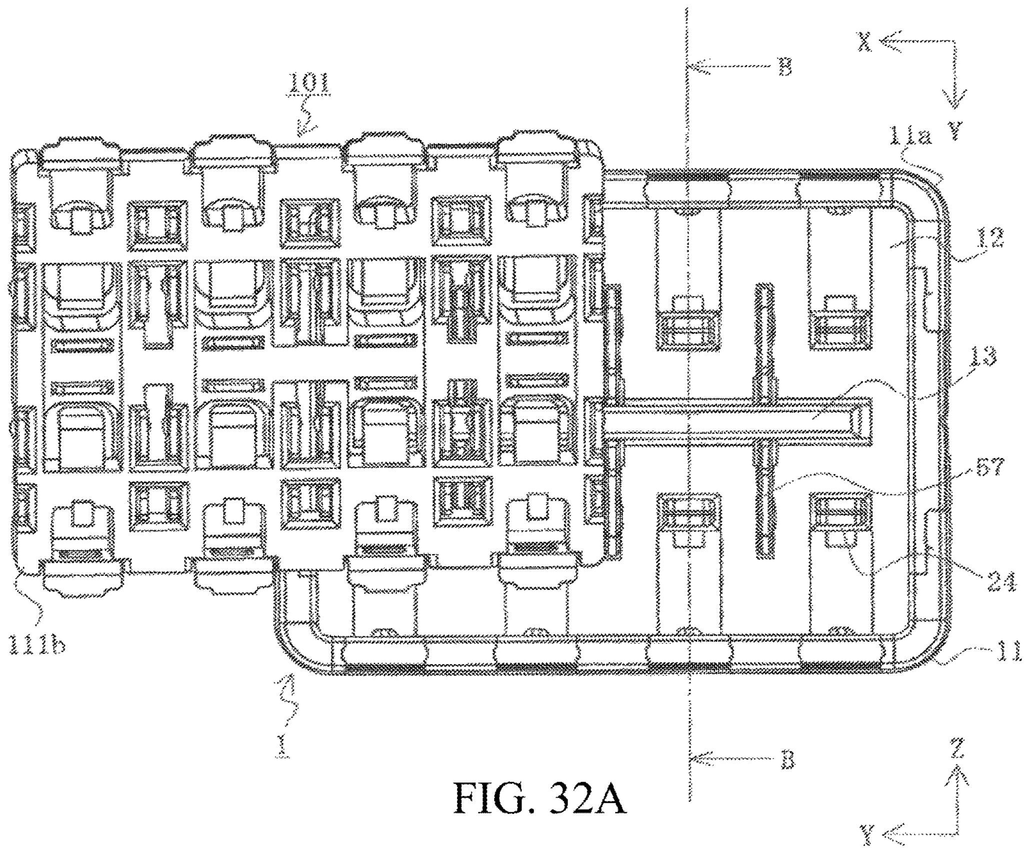
FIGS. 32A and 32B are views illustrating a case in which substantial misalignment occurs when the first connector and the second connector according to Embodiment 5 are mated, where
Figure 32B:
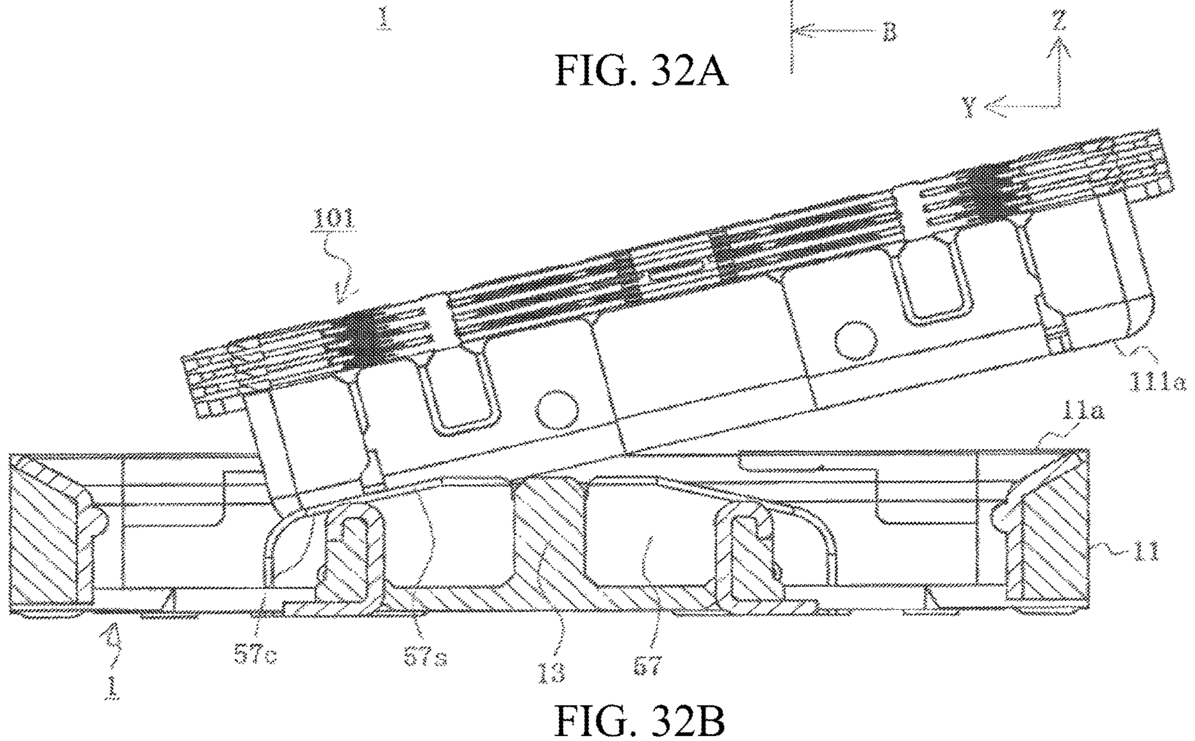

FIGS. 31A through 31C are cross-sectional views illustrating the operation of mating the first connector and the second connector according to Embodiment 5, and FIG. 32A is a cross-sectional view from the longitudinal direction of the first housing and the second housing. FIG. 32N is a cross-sectional view illustrating a case in which substantial misalignment occurs when the first connector and the second connector according to Embodiment 5 are mated. Note that in FIGS. 31A through 31C are views illustrating each stage of the operation of mating in a state in which the mating surfaces are not parallel due to misalignment occurring in the width direction of the first housing and the second housing. In FIG. 32A is a plan view and FIG. 32B is a cross-sectional view along arrow B-B in FIG. 32A.

Note that the operation of mating the first connector 1 and the second connector 101 in this embodiment is the same as in Embodiments 1 to 4. As described in Embodiment 2 above, the first connector 1 and the second connector 101 could be mated while the mating surface 11*a* of the first connector 1 and the mating surface 111*a* of the second connector 111 are in contact and slide in a state in which the first connector 1 and the second connector 101 are misaligned with one another in the X- or Y-axis direction or are inclined with respect to one another, but even in such a case, the first connector 1 and the second connector 101 can be mated smoothly while more reliably preventing damage or breakage in this embodiment.

In a state in which the first connector 1 and the second connector 101 illustrated in FIG. 26 are aligned, the mating surface 11*a* of the first housing 11 and the mating surface 111*a* of the second housing 111 may abut one another while not parallel and opposite one another; for example, in a state in which, when viewed from the X-axis direction, the mating surface 111*a* of the second connector 101 is misaligned in the Y-axis with respect to the mating surface 11*a* of the first connector 1 and inclined so as to rotate about the X-axis.

In such a case, as illustrated in FIG. 33A, a corner portion of one end in the width direction (left end in FIG. 33A) of the mating surface 111*a* of the second housing 111 first enters the first recess 12 of the first housing 11. However, in the first recess 12, the height of the central partition 13 and the wall plate part 57 of the first intermediate shield member 56 is greater than that of the first high-frequency terminal support part 24, and therefore the corner portion of the second housing 111 abuts against the upper end of the central partition 13 or the upper edge 57*a* of the wall plate part 57 without abutting against the first high-frequency terminal support part 24 and the first high-frequency terminal 71 attached to the first high-frequency terminal support part 24. Note that in the example illustrated in FIG. 33A, the corner portion of the second housing 111 abuts the upper end of the inclined part 57*s* at the upper edge 57*a* of the wall plate part 57, however, since the upper end of the inclined part 57*s* is also taller than the upper end of the first high-frequency terminal support part 24, the second housing 111 does not abut the first high-frequency terminal support part 24 and the first high-frequency terminal 71. Accordingly, the first high-frequency terminal support part 24 and the first high-frequency terminal 71 are not damaged or broken.

On the other hand, since the second housing 111 is also covered by the second shield member 151 in most of the corner portion on both ends in the width direction of the mating surface 111*a* due to the presence of the extension 152*c*, the corner portion is not damaged or broken even if it abuts the central partition 13 or the wall plate part 57.

Figure 33:
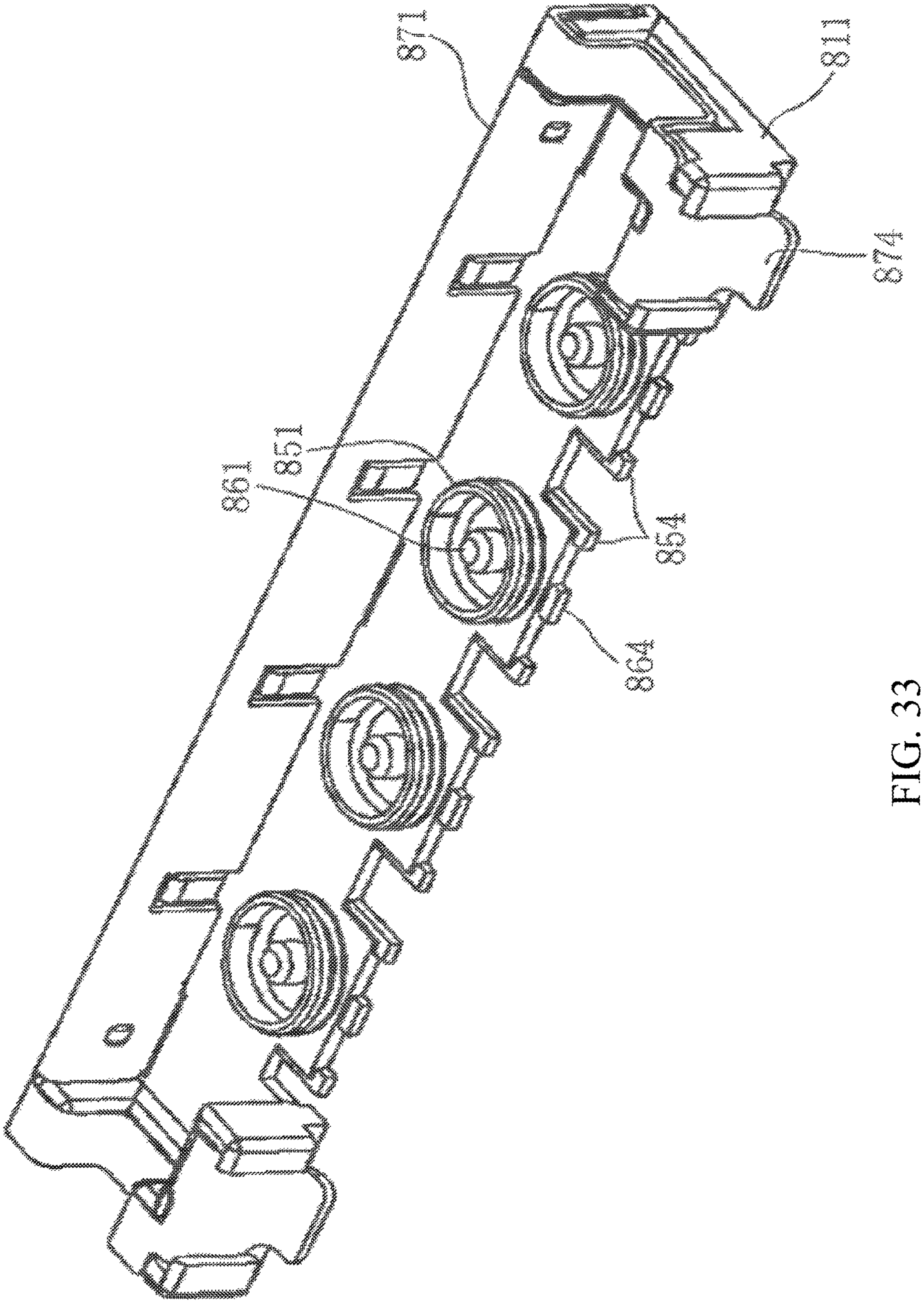
FIG. 33 Prior art
FIG. 33 is a perspective view illustrating a conventional connector.

Next, as illustrated in FIG. 33B, the second housing 111 slides in the width direction (left direction in FIG. 33) and is displaced in the mating direction (downward direction in FIG. 33) relative to the first housing 11 while in contact with the upper edge 57*a* of the wall plate part 57. At this time, the mating surface 111*a* of the second housing 111 slides along the upper end of the inclined part 57*s*, and can thereby slide smoothly and be displaced in the mating direction. In addition, as described above, the upper end of the inclined part 57*s* is also taller than the upper end of the first high-frequency terminal support part 24, and the second housing 111 does not abut the first high-frequency terminal support part 24 and the first high-frequency terminal 71. Therefore, the first high-frequency terminal support part 24 and the first high-frequency terminal 71 are not damaged or broken.

Further, when the sliding in the width direction ends, as illustrated in FIG. 33B, the second side wall shield part 153*b* of the second shield member 151 abuts the first side wall shield part 53*b* of the first shield member 51. Therefore, the second side wall part 114 of the second housing 111 and the first side wall part 14 of the first housing 11 are also not damaged or broken.

When the mating of the first connector 1 and the second connector 101 is complete, as illustrated in FIG. 3C, the central partition 13 of the first housing 11 is inserted into and housed in the central partition recess 113 of the second housing 111, resulting in a state in which the first high-frequency terminal 71 and the second high-frequency terminal 171 are in contact and conductive with one another. Note that when used for the transmission of high-frequency signals (for example, a frequency of 6 GHz or higher), it is most preferable for the second side wall shield recess 155*c* to come into contact with the first side wall protrusion 55*c* and for the second intermediate wall shield protrusion 155*a* to come into contact with the side surface of the first end wall shield part 52*a* and the side surface of the wall plate part 57, however, it is not absolutely necessary for the second side wall shield recess 155*c* and the first side wall protrusion 55*c* to come into contact.

In addition, for example, as illustrated in FIG. 34, the mating surface 111*a* of the second connector 101 may come into contact with one another in a state in which they are misaligned in both the X-axis direction and the Y-axis direction with respect to the mating surface 11*a* of the first connector 1 and are inclined so as to rotate about the X-axis.

In such a case, as illustrated in FIG. 32B, a comer portion of one end in the longitudinal direction and one end in the width direction of the mating surface 11 1*a* of the second housing 111 first enters the space between the mutually adjacent wall plate parts 57 in the first recess 12 of the first housing 11. When the second housing 111 is displaced in the longitudinal direction (right direction in FIG. 32A) relative to the first housing 11, the comer portion abuts one (left in FIG. 32A) side surface of the wall plate part 57 and then rides over the upper edge 57*a*. At this time, since the chamfered part 57*c* is formed at both ends in the plate thickness direction (X-axis direction) of the upper edge 57*a*, the corner portion can smoothly ride over the upper edge 57*a* and displaced in the longitudinal direction of the first housing 11.

In addition, when the second housing 111 is displaced in the longitudinal direction relative to the first housing 11, the upper edge 57*a* of the wall plate part 57 slides relatively over the top surface of the canopy part 152*b* of the second cover part 152 of the second shield member 151, and may therefore enter into the cover opening 152*a*. However, in this embodiment, the upper surface of the second high-frequency terminal support part 126 present in the cover opening 152*a* is substantially flush with the upper surface of the canopy part 152*b*, and therefore the upper edge 57*a* of the wall plate part 57 is prevented from entering too deeply into the cover opening 152*a*. As a result, the second contact part 175*a* of the second high-frequency terminal 171 present inside the cover opening 152*a* does not abut the upper edge 57*a* of the wall plate part 57 and is not damaged or broken. In addition, since the wall plate part 57 is not subjected to excessive force from the cover opening 152*a*, the wall plate part 57 is not damaged or broken. Moreover, the wall plate part 57 or the first high-frequency terminal support part 24 and the first high-frequency terminal 71 attached to the first high-frequency terminal support part 24 are damaged as a result of becoming caught on the step between the upper surface of the second high-frequency terminal support part 126 and the canopy part 152*b*.

Note that other aspects of the operation of mating the first connector 1 and the second connector 101 in this embodiment are the same as in Embodiments 1 and 2, so descriptions thereof will be omitted.

As described above, in this embodiment, the first connector 1 includes the first housing 11 and the plurality of first high-frequency connection units 70 filling the first housing 11, and the first connector 1 is mounted on the first substrate and mated with the second connector 101. The first housing 11 includes a first recess 12 into which the second housing 111 of the second connector 101 is inserted, which is a first recess 12 having a substantially rectangular shape in a planar view filled with the plurality of first high-frequency connection units 70 formed into closely aligned rows in the longitudinal direction of the first housing 11, and a central partition 13 extending in the longitudinal direction of the first housing 11 between rows of the first high-frequency connection units 70. Each first high-frequency connection unit 70 includes a first high-frequency shield 50 having a rectangular cylindrical shape with a substantially rectangular cross-section surrounding the periphery of the first high-frequency terminal 71 and extending in the mating direction. The first high-frequency shield 50 includes a first intermediate shield member 56 that is shared with a mutually adjacent first high-frequency shield 50 in the longitudinal direction of the first housing 11, and the first intermediate shield member 56 extends in the width direction of the first housing 111. The first intermediate shield member 56 includes a wall plate part 57 extending from the side surface of the central partition 13 to a position beyond the first high-frequency terminal 71 in the width direction of the first housing 11. The wall plate part 57 includes an inclined part 57*s* which inclines diagonally downward away from the central partition 13.

As a result, it is possible to load the first high-frequency connection units 70 with high space efficiency, to enable a plurality of signal lines to be connected while maintaining a small size and low profile, and to achieve a high shielding effect for the first high-frequency connection unit 70, which enhances reliability. Further, even if the first connector 1 and the second connector 101 are in contact and the first connector 1 and the second connector 101 are mated while being slid, the first connector 1 and the second connector 101 can be mated smoothly while more reliably preventing damage or breakage.

In addition, the upper end of the inclined part 57*s* is higher than the upper part of the first high-frequency terminal 71 when viewed in the longitudinal direction of the first housing 11. Further, a chamfered part 57*c* is formed at both ends in the plate thickness direction of the inclined part 57*s*. In addition, a second high-frequency terminal support part 126 for supporting the second high-frequency terminal 171 is disposed in the second high-frequency terminal housing recess 124 of the second high-frequency connection unit 170 of the second connector 101, and the upper surface of the second high-frequency terminal support part 126 is substantially flush with the upper surface of the second cover part 152. Further, at least a portion of the second high-frequency shield 150 includes an extension 152*c* extending a portion of the second cover part 152 and the side surface shield part 153, and the extension 152*c* extends in the longitudinal direction of the second housing 111 to a position near the second high-frequency shield 1150 of the adjacent second high-frequency connection unit 170.

Note that since the configurations, operations, and effects of the first connector 1 and the second connector 101 in this embodiment are in other respects the same as in Embodiments 1 to 4, descriptions thereof will be omitted.

Moreover, the disclosure of the present specification describes characteristics related to preferred and exemplary embodiments. Various other embodiments, modifications, and variations within the scope and spirit of the claims appended hereto could naturally be conceived of by persons skilled in the art by summarizing the disclosures of the present specification.

The present disclosure is applicable to a connector and a connector assembly.

The invention claimed is:

1. A second connector comprising:

a connector body being configured to mate with a first connector; and a plurality of connection units provided on the connector body, the connection units being arranged in close contact in a longitudinal direction of the connector body and are configured for insertion into a recess of the first connector, and each second connection unit comprising a single terminal and a shield member, each shield member having a flat plate-like second cover part extending orthogonal to a mating direction, a first side surface shield part connected to a first side edge of the second cover part and extending in the mating direction, and a second side surface shield part connected to a second, opposite side edge of the second cover part and extending in the mating direction, and an opening through the flat plate-like second cover part, wherein side surface shield parts of adjacent shield members in the longitudinal direction of the second connector body do not come into contact with one another.

2. The second connector according to claim 1, wherein the connection units are disposed in columns and rows.

3. The second connector according to claim 1, wherein the connector body includes a plurality of spaced apart terminal housing recesses, wherein respective ones of the terminals are seated within respective ones of the housing recesses, and each side surface shield part is attached to a side of a wall forming the respective terminal housing recess.

4. The second connector according to claim 1, wherein the terminal is disposed near the second cover part in each connection unit, and an impedance can be adjusted in each connection unit by adjusting a distance between the respective second terminal and the respective second cover part.

5. A first connector comprising:

a first connector body having a recess into which a second connector body of a second connector is configured to be inserted, the first connector being mounted on a first substrate;

a plurality of terminals provided within the recess;

an end shield provided at at least one end of each terminal; and a plurality of intermediate shield members, wherein a respective intermediate shield member is provided between each pair of adjacent terminals, each intermediate shield member extending along a width direction of the first connector body, such that a periphery of each terminal is surrounded on at least three sides by the respective end shield and the intermediate shield members adjacent to the respective terminal, each intermediate shield member including a pair of tail parts positioned on both ends thereof and configured to be directly connected to a ground line of the first substrate, each terminal being positioned between the pair of tail parts in the width direction of the first connector body.

6. The first connector according to claim 5, wherein an end shield is provided at each end of each terminal such that all four sides of the periphery of each terminal is surrounded.

7. The first connector according to claim 6, wherein the end shields are formed by a common part.

8. The first connector according to claim 6, wherein the respective end shield and intermediate shield members are not electrically coupled to each other prior to engagement with the second connector.

9. The first connector according to claim 5, wherein the terminals are disposed in columns and rows, wherein one of the intermediate shield members is provided between adjacent terminals in the columns.

10. The first connector according to claim 9, wherein a spacing between the adjacent terminals in the columns is less than a spacing between the adjacent terminals in the rows.

11. A connector assembly comprising:

a first connector comprising:

a first connector body having a recess, the first connector being mounted on a first substrate, a plurality of first terminals provided within the recess, an end shield provided at at least one end of each first terminal, and a plurality of intermediate shield members, wherein a respective intermediate shield member is provided between each pair of adjacent first terminals, each intermediate shield member extending along a width direction of the first connector body, such that a periphery of each first terminal is surrounded on at least three sides by the respective end shield and the intermediate shield members adjacent to the respective first terminal, each intermediate shield member including a pair of tail parts positioned on both ends thereof and configured to be directly connected to a ground line of the first substrate, each first terminal being positioned between the pair of tail parts in the width direction of the first connector body; and a second connector comprising:

a second connector body being configured to mate with the first connector, a plurality of connection units provided on the second connector body, the connection units being arranged in close contact in a longitudinal direction of the second connector body and are configured for insertion into the recess of the first connector, and each second connection unit comprising a single terminal and a second shield member, each second shield member having a flat plate-like second cover part extending orthogonal to a mating direction, a first side surface shield part connected to a first side edge of the second cover part and extending in the mating direction, and a second side surface shield part connected to a second, opposite side edge of the second cover part and extending in the mating direction, and an opening through the flat plate-like second cover part, wherein side surface shield parts of adjacent second shield members in the longitudinal direction of the second connector body do not come into contact with one another.

12. The connector assembly according to claim 11, wherein an end shield is provided at each end of each first terminal such that all four sides of the periphery of each first terminal is surrounded.

13. The connector assembly according to claim 12, wherein the end shields are formed by a common part.

14. The connector assembly according to claim 13, wherein the respective end shield and intermediate shield members are not electrically coupled to each other prior to engagement with the second connector.

15. The connector assembly according to claim 12, wherein the first terminals are disposed in columns and rows, wherein one of the intermediate shield members is provided between adjacent first terminals in the columns.

16. The connector assembly according to claim 15, wherein a spacing between the adjacent first terminals in the columns is less than a spacing between the adjacent first terminals in the rows.

17. The second connector according to claim 15, wherein the connection units are disposed in columns and rows.

18. The connector assembly according to claim 17, wherein the connector body includes a plurality of spaced apart terminal housing recesses, wherein respective ones of the terminals are seated within respective ones of the housing recesses, and each side surface shield part is attached to a side of a wall forming the respective terminal housing recess.

19. The connector assembly according to claim 11, wherein the single terminal is disposed near the second cover part in each connection unit, and an impedance can be adjusted in each connection unit by adjusting a distance between the respective second terminal and the respective second cover part.

* * * * *